(12) United States Patent
Vasylyev et al.

(10) Patent No.: US 11,204,458 B2
(45) Date of Patent: Dec. 21, 2021

(54) WIDE-AREA SOLID-STATE ILLUMINATION DEVICES AND SYSTEMS EMPLOYING SHEET-FORM LIGHT GUIDES AND METHOD OF MAKING THE SAME

(71) Applicants: Sergiy Vasylyev, Elk Grove, CA (US); Mykola Masalitin, Sacramento, CA (US)

(72) Inventors: Sergiy Vasylyev, Elk Grove, CA (US); Mykola Masalitin, Sacramento, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 109 days.

(21) Appl. No.: 16/679,147

(22) Filed: Nov. 8, 2019

(65) Prior Publication Data
US 2020/0150333 A1 May 14, 2020

Related U.S. Application Data

(60) Provisional application No. 62/760,006, filed on Nov. 12, 2018.

(51) Int. Cl.
*F21V 8/00* (2006.01)

(52) U.S. Cl.
CPC ......... *G02B 6/0041* (2013.01); *G02B 6/0055* (2013.01); *G02B 6/0065* (2013.01); *G02B 6/0003* (2013.01); *G02B 6/0056* (2013.01)

(58) Field of Classification Search
CPC .. G02B 6/0041; G02B 6/0055; G02B 6/0065; G02B 6/0003; G02B 6/0056
See application file for complete search history.

(56) References Cited

U.S. PATENT DOCUMENTS

| | | | |
|---|---|---|---|
| 2,971,083 A | 2/1961 | Phillips | |
| 3,096,684 A | 7/1963 | Kegg | |
| 3,940,896 A | 3/1976 | Steel | |
| 4,509,825 A | 4/1985 | Otto et al. | |
| 4,557,565 A | 12/1985 | Ruck et al. | |
| 4,699,467 A | 10/1987 | Bartenbach et al. | |
| 4,989,952 A | 2/1991 | Edmonds | |
| 5,008,791 A | 4/1991 | Caferro | |
| 5,149,191 A * | 9/1992 | Lewin | F21V 11/06 362/290 |
| 5,206,746 A | 4/1993 | Ooi et al. | |
| 5,285,315 A | 2/1994 | Stiles | |
| 5,295,051 A | 3/1994 | Cowling | |
| 5,528,478 A | 6/1996 | Degelmann | |
| 5,584,556 A | 12/1996 | Yokoyama et al. | |

(Continued)

*Primary Examiner* — Andrew J Coughlin
*Assistant Examiner* — Jessica M Apenteng

(57) ABSTRACT

Wide-area solid-state illumination devices and systems, including one or more linear arrays of compact solid-state light sources, such as LEDs, a light guiding sheet of an optically transmissive material optically coupled to the light sources, and an optically opaque grid panel defining a series of openings for light passage. The light guiding sheet includes a light extraction surface pattern having a series of light extraction areas alternating with separation areas. The light guiding sheet is positioned over the grid panel such that the light extraction areas are disposed in registration with the openings in the grid panel.

24 Claims, 23 Drawing Sheets

(56) References Cited

U.S. PATENT DOCUMENTS

| | | |
|---|---|---|
| 5,650,875 A | 7/1997 | Kanada et al. |
| 5,662,403 A * | 9/1997 | Akashi ................... F21V 7/24 362/558 |
| 5,775,791 A | 7/1998 | Yoshikawa et al. |
| 5,802,784 A | 9/1998 | Federmann |
| 5,880,886 A | 3/1999 | Milner |
| 5,983,581 A | 11/1999 | DeBlock et al. |
| 6,239,910 B1 | 5/2001 | Digert |
| 6,259,854 B1 | 7/2001 | Shinji et al. |
| 6,311,437 B1 | 11/2001 | Lorenz |
| 6,327,083 B1 | 12/2001 | Goldenberg et al. |
| 6,367,937 B2 | 4/2002 | Koster |
| 6,417,966 B1 | 7/2002 | Moshrefzadeh et al. |
| 6,424,406 B1 | 7/2002 | Mueller et al. |
| 6,437,921 B1 | 8/2002 | Whitehead |
| 6,542,303 B1 | 4/2003 | Oyama |
| 6,580,559 B2 | 6/2003 | Doll et al. |
| 6,616,285 B2 | 9/2003 | Milner |
| 6,669,350 B2 | 12/2003 | Yamashita et al. |
| 6,700,716 B2 | 3/2004 | Sejkora |
| 6,714,352 B2 | 3/2004 | Rogers et al. |
| 6,980,728 B2 | 12/2005 | Ladstatter et al. |
| 7,070,314 B2 | 7/2006 | Edmonds |
| 7,246,924 B2 | 7/2007 | Pfund |
| 7,410,284 B2 | 8/2008 | Edmonds |
| 7,416,315 B2 | 8/2008 | Blumel |
| 7,513,674 B1 | 4/2009 | Donahue |
| 7,872,801 B2 | 1/2011 | Kojima et al. |
| 8,040,610 B2 | 10/2011 | Ko et al. |
| 8,083,363 B2 | 12/2011 | Jaster |
| 8,107,164 B2 | 1/2012 | Tsai |
| 8,264,622 B2 | 9/2012 | Gourlay |
| 8,601,757 B2 | 12/2013 | Jaster et al. |
| 8,602,629 B2 | 12/2013 | Mi |
| 8,619,363 B1 | 12/2013 | Coleman |
| 9,086,516 B2 | 7/2015 | Gourlay |
| 9,897,289 B2 | 2/2018 | Biron et al. |
| 10,273,906 B2 | 4/2019 | McQuillen et al. |
| 2001/0048599 A1 | 12/2001 | Hess |
| 2002/0080484 A1 | 6/2002 | Moshrefzadeh et al. |
| 2002/0080598 A1 | 6/2002 | Parker et al. |
| 2004/0136667 A1 | 7/2004 | Leu et al. |
| 2006/0083019 A1 | 4/2006 | Hahm et al. |
| 2006/0133088 A1 | 6/2006 | Caferro |
| 2006/0146573 A1 | 7/2006 | Iwauchi et al. |
| 2007/0035680 A1 * | 2/2007 | Watanuki ............ G02B 6/0061 349/61 |
| 2007/0279935 A1 | 12/2007 | Gardiner et al. |
| 2008/0291541 A1 | 11/2008 | Padiyath et al. |
| 2009/0147353 A1 | 6/2009 | Yang et al. |
| 2010/0007818 A1 * | 1/2010 | Saitoh ................ G02B 6/0038 349/61 |
| 2010/0278480 A1 | 11/2010 | Vasylyev |
| 2012/0033302 A1 | 2/2012 | Suzuki et al. |
| 2012/0195072 A1 | 8/2012 | Minami |
| 2012/0268940 A1 | 10/2012 | Sahlin et al. |
| 2013/0038928 A1 | 2/2013 | Padiyath et al. |
| 2013/0083554 A1 | 4/2013 | Jaster |
| 2014/0104689 A1 | 4/2014 | Padiyath et al. |
| 2014/0226361 A1 | 8/2014 | Vasylyev |
| 2014/0307466 A1 | 10/2014 | Hikmet et al. |
| 2015/0070769 A1 | 3/2015 | Maxey |
| 2016/0178829 A1 | 6/2016 | Hayashihara et al. |
| 2016/0267851 A1 | 9/2016 | Pirtskhlava et al. |
| 2017/0356611 A1 * | 12/2017 | Vasylyev ............ G02B 5/0268 |
| 2018/0106947 A1 | 4/2018 | Wong |

* cited by examiner

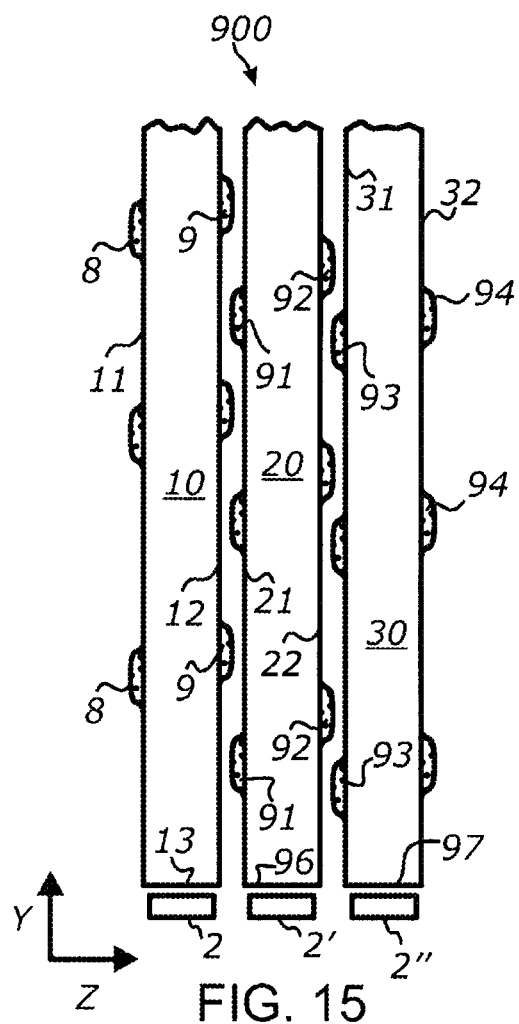
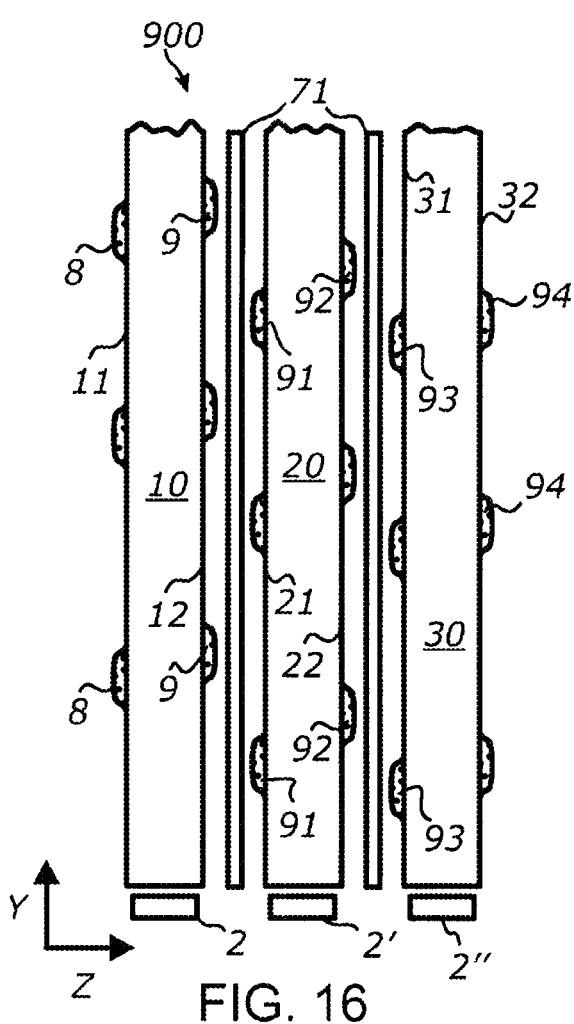
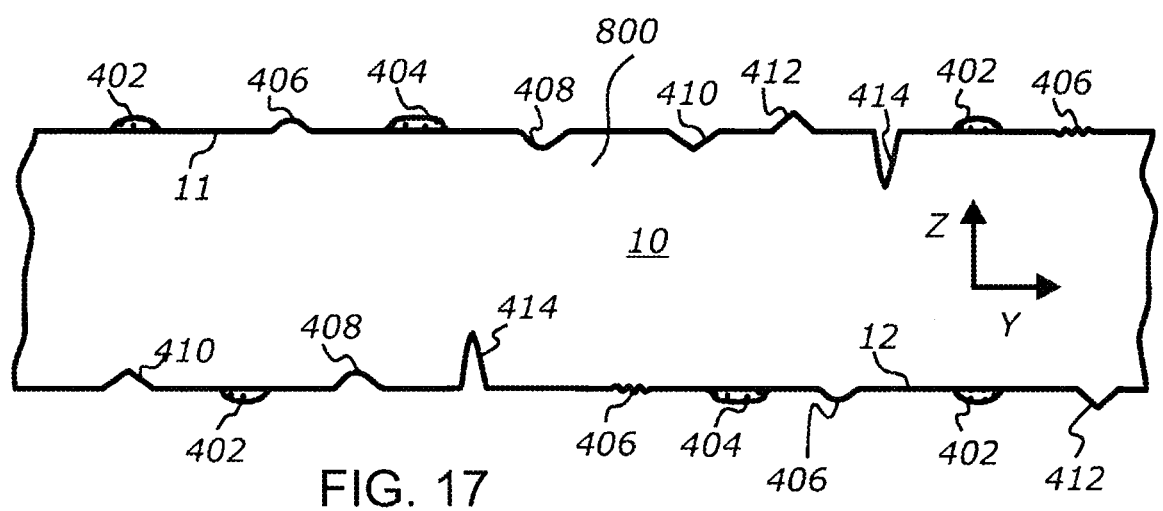

WIDE-AREA SOLID-STATE ILLUMINATION DEVICES AND SYSTEMS EMPLOYING SHEET-FORM LIGHT GUIDES AND METHOD OF MAKING THE SAME

CROSS-REFERENCE TO RELATED APPLICATIONS

This application claims priority from U.S. provisional application Ser. No. 62/760,006 filed on Nov. 12, 2018, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to wide-area illumination devices employing planar light guides and compact solid-state light emitting devices such as light emitting diodes (LEDs) or laser diodes. More particularly, this invention relates to wide-area LED illumination devices such as those employed in lighting panels, lighting luminaires, lighting luminaire retrofits, illuminated panel signs, electronic displays, front lights, backlights, backlit display screens, advertising displays, road signs, decorative broad-area lights, as well as to a method for redistributing light from a variety of light sources in such devices. The invention further relates to illumination devices in which planar-type light guides are retained in bent or curved state.

2. Description of Background Art

Conventionally, wide-area light emitting devices employ planar light guides, also commonly referred to as "waveguides", which are illuminated from one or more edges using Light Emitting Diodes (LEDs) or other types of compact light sources. The conventional edge-lit illumination systems may exhibit certain limitations such as difficulty to efficiently couple, decouple and/or distribute light. Additionally, configuring the edge-lit illumination systems for a desired angular distribution and uniformity of the emission may be associated with optical losses and lead to energy waste and suboptimal performance.

U.S. Patent Applications Publications No. US-2014-0226361-A1 (the '361 Publication) and US-2017-0045666-A1 (the '666 Publication), the disclosures of which are incorporated herein by reference in their entirety, disclose face-lit waveguide illumination systems formed by a planar waveguide and optical coupling elements attached to a face of the waveguide. U.S. Pat. Nos. 9,256,007, 9,097,826, 8,290,318, and U.S. Patent Applications Publication No. US20140140091, the disclosures of which are incorporated herein by reference in their entirety, disclose various configurations of waveguides (light guides) and light deflecting/light extraction elements.

U.S. patent application Ser. No. 15/996,865 (the '865 application), published as U.S. Patent Applications Publication No. US20180348423, the disclosure of which is incorporated herein by reference in its entirety, discloses various configurations of stepped light guides and light guide illumination systems, as well as different arrangements of solid-state light sources and light extraction features.

U.S. patent application Ser. No. 16/125,686 (the '686 application), published as U.S. Patent Applications Publication No. US20190079239, the disclosure of which is incorporated herein by reference in its entirety, discloses various configurations of wide-area solid-state illumination devices and systems employing waveguides, as well as different arrangements and compositions of light extraction features associated with the waveguides and methods of making such wide-area solid-state illumination devices.

U.S. Pat. Nos. D777972, D776331, D799738, D814101, D824085, D824086, D824087, and D829969, the disclosures of which are incorporated herein by reference in their entirety, disclose exemplary light emitting patterns associated with light emitting sheet-form structures.

It is noted that, where a definition or use of a term in a reference, which is incorporated by reference herein is inconsistent or contrary to the definition of that term provided herein, the definition of that term provided herein applies and the definition of that term in the reference does not apply.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

According to one embodiment, a wide-area solid-state illumination device or system is exemplified by a light guiding sheet of an optically transmissive material illuminated by a plurality of compact solid-state sources such as LEDs or lasers. The light guiding sheet is configured for guiding light between opposing edges using optical transmission and a total internal reflection. According to one implementation, at least one broad-area surface defining of the light guiding sheet is patterned for light extraction using a plurality of discrete surface microstructures that are distributed over the surface according to a predetermined two-dimensional pattern. According to one implementation, at least one of the discrete surface microstructures is formed by a microdrop of a non-absorbing light scattering material that forms a thin, semi-opaque layer on the respective broad-area surface (a "microdot"). The light scattering material is disposed in optical contact with the surface and configured for extracting light from the light guiding sheet. According to one implementation, the non-absorbing light scattering material comprises a UV curable ink having light-scattering particles suspended in a transparent or translucent binder material according to a predefined concentration. The discrete surface microstructures are so dimensioned and the properties of the non-absorbing light scattering material are so selected that light extracted by the microstructures can be output from both opposing broad-area surfaces of the light guiding sheet.

According to one embodiment, a light extraction pattern formed in the light guiding sheet includes a plurality of light extraction areas alternating with separation areas. According to one implementation, the separation areas are generally free from light extraction features or have a substantially lower area coverage by light extraction features compared to the light extraction areas. According to one implementation, the light extraction areas may have variables shapes, sizes and/or density across the area of the light guiding sheet.

According to one embodiment, the wide-area solid-state illumination device or system further includes a grid of optically opaque members such as louvers of baffles, for example, defining a plurality of openings. In one implementation, the optically opaque members have reflective surfaces. In one implementation, the optically opaque members have optically absorptive surfaces.

According to one embodiment, the light guiding sheet is positioned over the grid such that at least one of the light extraction areas of the light guiding sheet is disposed in registration with at least one of the openings in the grid. In different implementations, light extraction areas may be sized about the same or differently compared to the sizes of the openings.

According to one embodiment, a method of making a wide-area solid-state illumination device, consistent with the present invention, includes providing a grid panel having a plurality of optically opaque walls oriented transversely with respect to a prevalent plane of the panel and defining a plurality of openings in the panel, providing an optically transmissive sheet configured for guiding light using optical transmission and a total internal reflection, providing a linear array of compact solid-state light sources, a step of patterning optically transmissive sheet with light extraction surface features so as to form a plurality of light extraction areas alternating with separation areas, a step of optical coupling the linear array of compact solid-state light sources to the optically transmissive sheet, and a step of positioning the optically transmissive sheet over the grid panel such that at least one of the plurality of light extraction areas is disposed in registration with respect to at least one of the plurality of openings. In one implementation, the method may further include positioning a sheet of a reflective material over the optically transmissive sheet. In one implementation, the method may further include positioning the optically transmissive sheet, the linear array of compact solid-state light sources and the grid panel within a shallow rectangular housing having at least one wide-area opening.

The above summary does not include an exhaustive list of all aspects of the present invention. Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 15 is a schematic section view of a portion of a wide-area light guide illumination system having multiple stacked light guiding sheets, each including light extraction patterns on both opposing broad-area surfaces, according to at least one embodiment of the present invention.

FIG. 16 is a schematic section view of a portion of a wide-area light guide illumination system having multiple stacked light guiding sheets, showing light diffusing sheets positioned between the light guiding sheets, according to at least one embodiment of the present invention.

FIG. 17 is a schematic section view of a portion of a wide-area light guide illumination system having different types of light extraction features formed in opposing broad-area surfaces of a light guiding sheet, according to at least one embodiment of the present invention.

Figure 40:
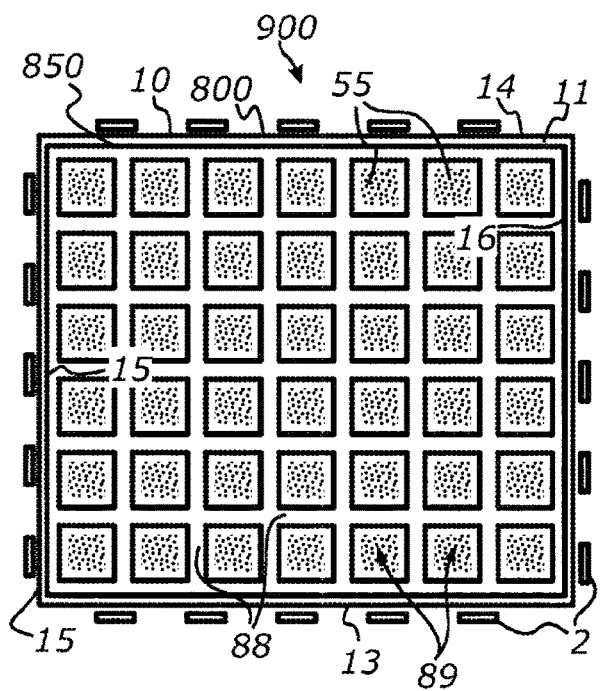

FIG. 40 is a schematic view illustrating a step of disposing a reflective grid panel over a patterned light guiding sheet such that openings in the reflective grid panel are disposed in registration with light extraction areas of the light guiding sheet and further illustrating a step of optical coupling of LED sources to edges of the light guiding sheet, according to at least one embodiment of the present invention.

Figure 41:
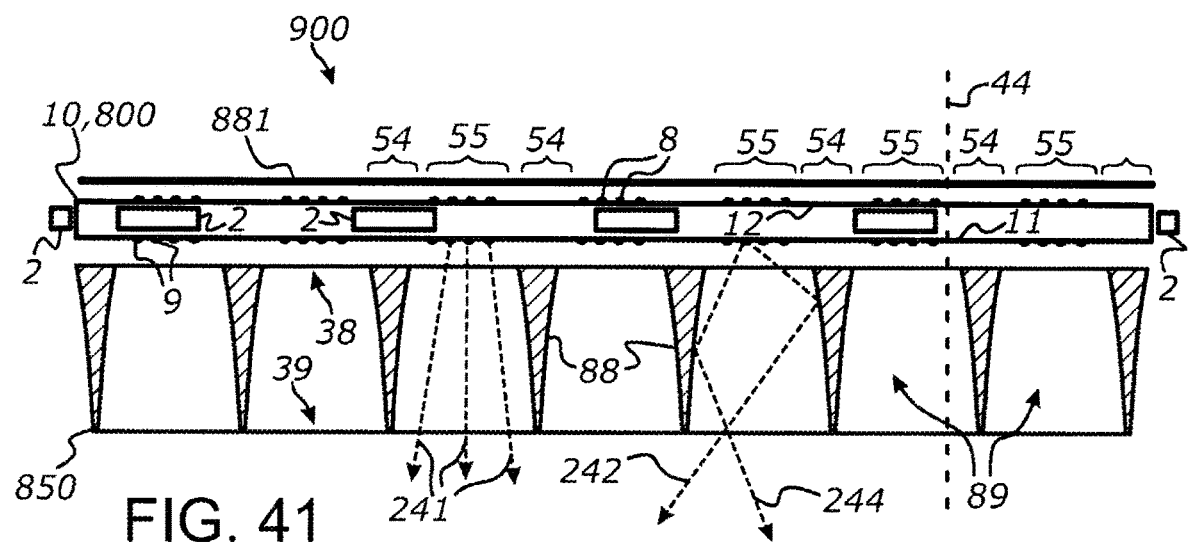

FIG. 41 is a schematic section view of a wide-area solid-state light guide illumination system including a light guiding sheet and a reflective grid, according to at least one embodiment of the present invention.

Figure 42:
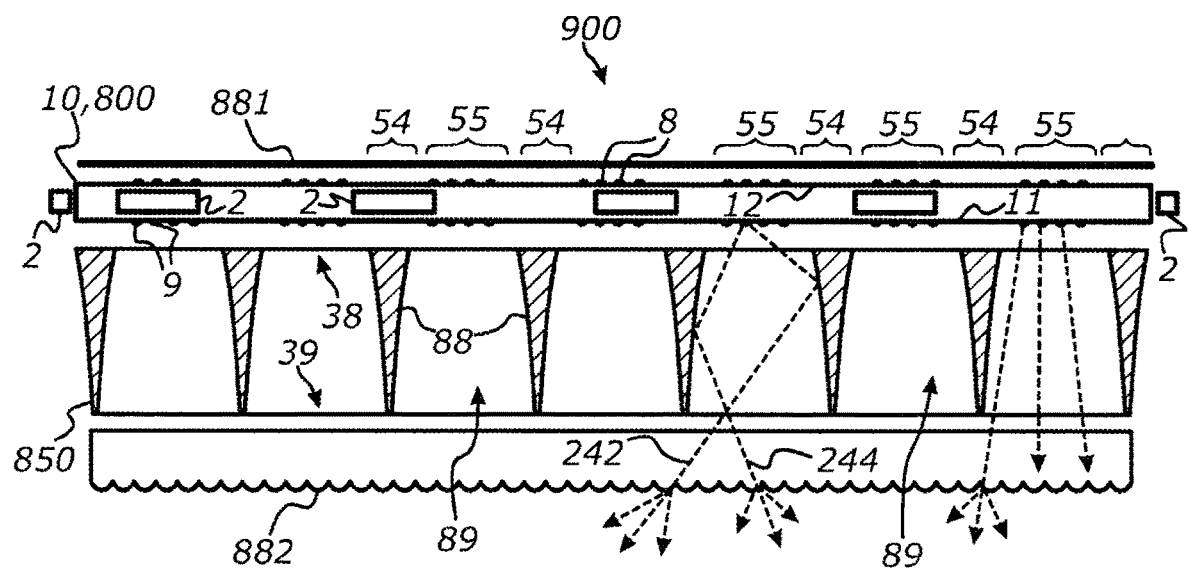

FIG. 42 is a schematic section view of a wide-area solid-state light guide illumination system, showing a reflective grid and an optically transmissive light diffusing sheet disposed in energy receiving relationship with respect to an edge-lit light guiding sheet.

Figure 43:
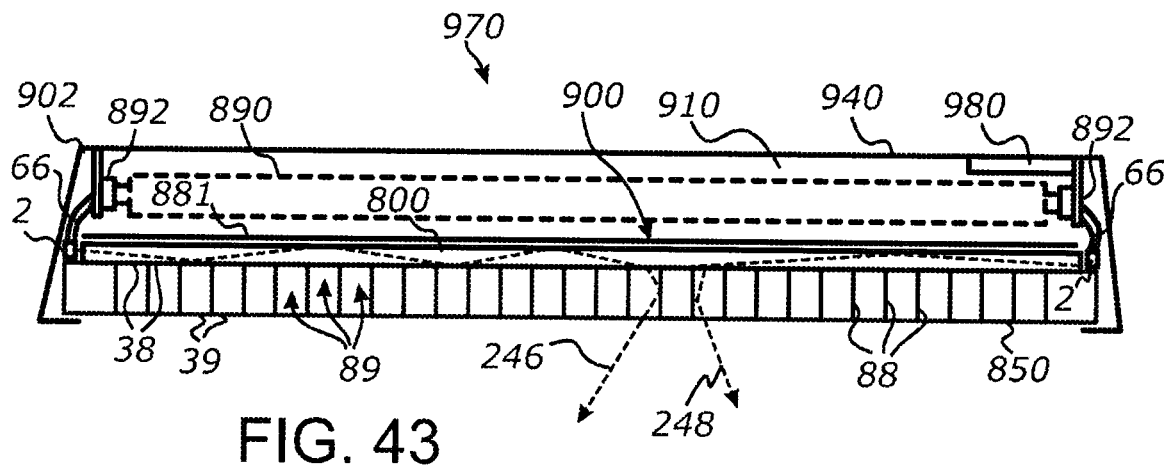

FIG. 43 is a schematic section view and raytracing of a lighting fixture employing a wide-area solid-state guide illumination system, showing a housing defining a hollow space above a light guiding sheet and a reflective grid disposed below the light guiding sheet, according to at least one embodiment of the present invention.

Figure 44:
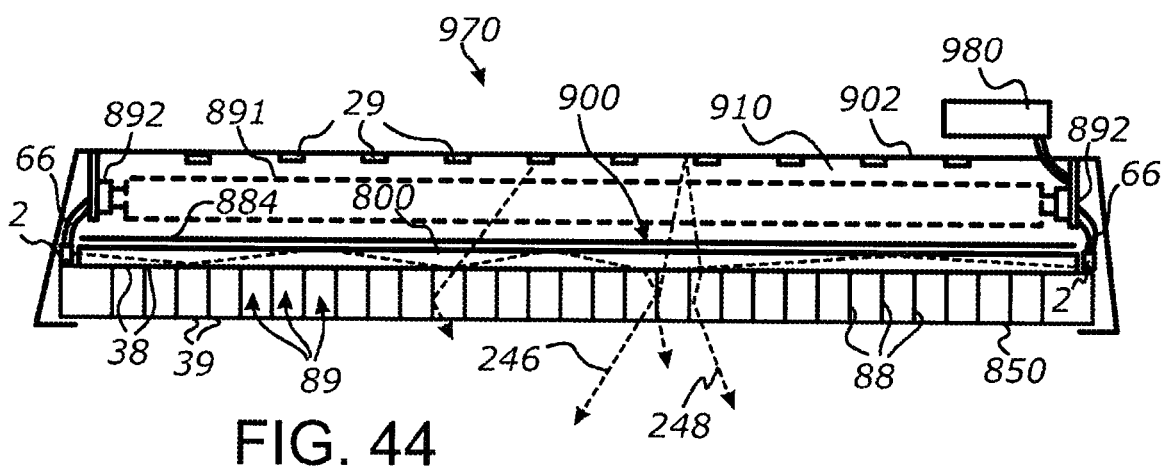

FIG. 44 is a schematic section view and raytracing of a lighting fixture employing a wide-area solid-state guide illumination system, showing a plurality of LED sources distributed within a hollow space defined by a voluminous housing enclosing an edge-lit light guiding sheet and a reflective grid, according to at least one embodiment of the present invention.

Figure 45:
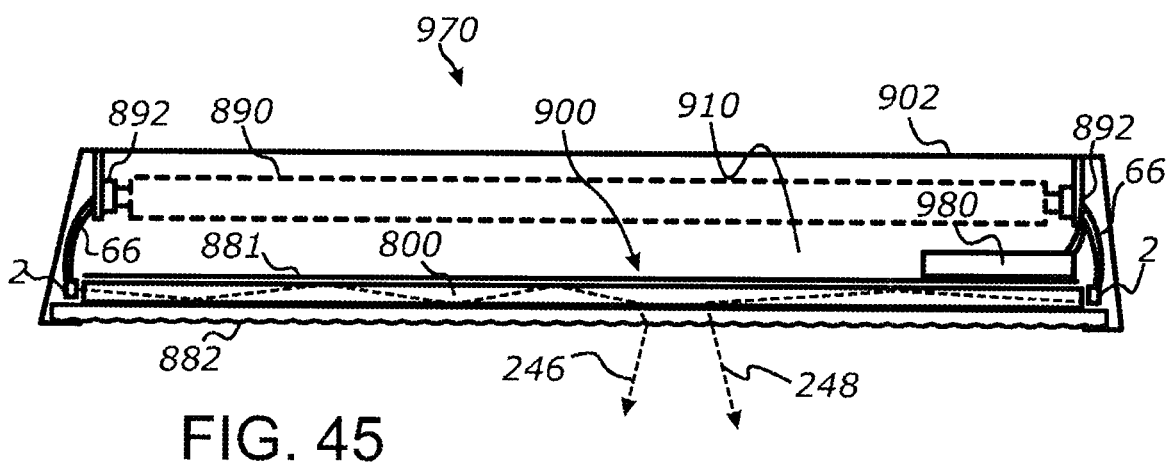

FIG. 45 is a schematic section view and raytracing of a lighting fixture employing a wide-area solid-state guide illumination system, showing a housing defining a hollow space above a light guiding sheet and an optically transmissive diffuser sheet disposed below the light guiding sheet, according to at least one embodiment of the present invention.

Figure 46:
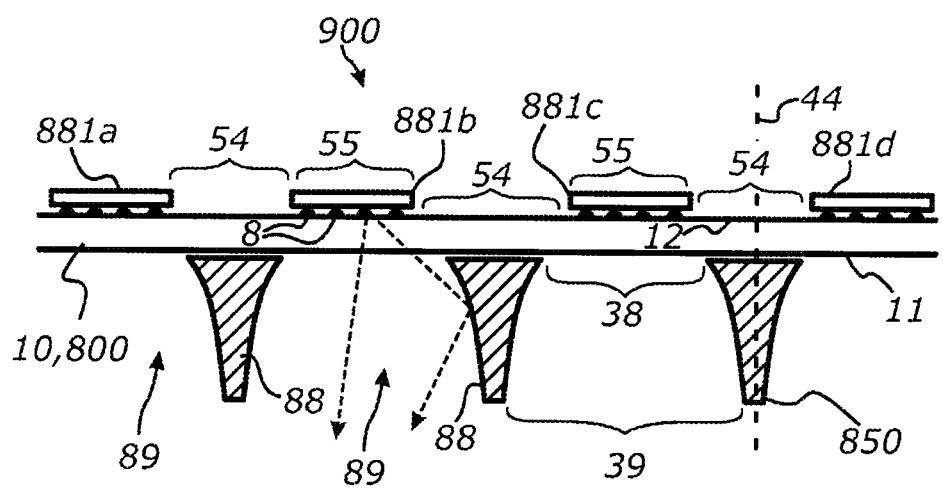

FIG. 46 is a schematic section view and raytracing of a wide-area solid-state light guide illumination system, showing several discrete reflectors positioned adjacent to light extraction areas, according to at least one embodiment of the present invention.

DETAILED DESCRIPTION OF THE INVENTION

Referring more specifically to the drawings, for illustrative purposes, the present invention is embodied in the systems generally shown in the preceding figures. It will be appreciated that the systems may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

Furthermore, many applications exist for the present invention in relation to distributing light by means of a planar optical light guide which hereinafter may also be referenced to as a waveguide. The planar optical light guide (waveguide) refers to a broad class of objects employing an optically transmissive material confined between two opposing broad-area surfaces that extend substantially parallel to each other. The term "substantially parallel" generally includes cases when the opposing surfaces are parallel within a reasonable accuracy. It also includes cases when the body of the material defined by the broad-area surfaces has a slightly tapered shape or has a slightly varying thickness across the surface. It yet further includes cases when a generally planar body of the light guide includes limited areas where its thickness is different compared to the rest of the light guide.

According to a preferred embodiment of the present invention, the planar light guide may be exemplified by a transparent plate, sheet, slab, panel, pane, light-transmitting substrate or any suitable sheet-form of an optically transmissive material, including film thicknesses and rigid and flexible sheet forms. This invention is also applicable to any two-dimensional shape variations of the sheet forms, including but not limited to a square, rectangle, a polygon, a circle, a strip, a freeform, or any combination therein. This invention is further applicable to any three-dimensional shapes that can be obtained by bending the sheet forms accordingly, including but not limited to cylindrical or partial cylindrical shapes, conical shapes, corrugated shapes, and the like. Opposite ends or edges of such three-dimensional shapes may be also be connected together to form a continuous surface or surfaces. For example, a strip of a light guiding strip material can be bent and its edges connected so as to form a loop.

It is also noted that terms such as "top", "bottom", "side", "front" and "back" and similar directional terms are used herein with reference to the orientation of the Figures being described and should not be regarded as limiting this invention in any way. It should be understood that different elements of embodiments of the present invention can be positioned in a number of different orientations without departing from the scope of the present invention. In the context of the description of a planar light guide and its elements, the term "top" is being generally used to refer to a primary light emitting side of the light guide and the term "bottom" is being generally used to refer to the opposite side (which may be emitting or non-emitting) for the sake of convenience of description and not in a limiting sense.

Any numerical range recited herein is intended to include all sub-ranges subsumed therein. For example, a range of 1 to 10 is intended to include all sub-ranges between and including the recited minimum value of 1 and the recited maximum value of 10, that is, having a minimum value equal to or greater than 1 and a maximum value of equal to or less than 10, such as, for example, 3 to 6 or 2.5 to 8.5. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112, first paragraph, and 35 U.S.C. § 132(a). Also, unless otherwise indicated, all numerical parameters are to be understood as being prefaced and modified in all instances by the term "about", in which the numerical parameters possess the inherent variability characteristic of the underlying measurement techniques used to determine the numerical value of the parameter.

According to some preferred embodiments of the present invention, there is provided an illumination system employing an optical light guide exemplified by an optically transmissive, broad-area sheet or panel, which may also hereinafter be referred to as a "light guiding sheet", "light guiding panel" or "LGP". The LGP is made from a material which has a refractive index greater than that of the outside medium and is capable of guiding light within the panel by means of a Total Internal Reflection (TIR) from its opposing broad-area surfaces, provided that the internal incidence angles onto either of the surfaces are greater than a critical angle of TIR characterizing the broad-area surfaces.

For the purpose of this discussion, the term "incidence angle" of a light ray in relation to a surface generally refers to an angle that such ray makes with respect to a normal to the surface. It will be appreciated by those skilled in the art of optics that, when referring to light or other forms of electromagnetic waves passing through a boundary formed between two different refractive media, such as air and glass, for example, the ratio of the sines of the angles of incidence and of refraction is a constant that depends on the ratio of refractive indices of the media (the Snell's law of refraction). The following relationship can describe a light bending property of an interface between two refractive media: $n_I \sin \phi_I = n_R \sin \phi_R$, where $n_I$ and $n_R$ are the respective refractive indices of the materials forming the optical interface and $\phi_I$ and $\phi_R$ are the angle of incidence and the angle of refraction, respectively. It will be further appreciated that such optical interface can also be characterized by a critical TIR angle which is the value of $\phi_I$ for which $\phi_R$ equals 90°. Accordingly, for a surface characterized by a stepped drop in refractive index along the propagation path of a ray, the incidence angle may be less than, equal to, or greater than the TIR angle at the given surface.

A TIR angle $\phi_{TIR}$ can be found from the following expression:

$$\phi_{TIR} = \arcsin(n_R/n_I \sin 90°) = \arcsin(n_R) \qquad \text{(Equation 1)}$$

In an exemplary case of the interface between glass with the reflective index $n_I$ of about 1.51 and air with $n_R$ of about 1, $\phi_{TIR}$ is approximately equal to 41.5°.

It will be appreciated that, once light is input into the LGP and its propagation angles permit for TIR to occur at LGP's longitudinal walls, the light becomes trapped in the LGP and can propagate considerable distances until it is extracted, absorbed or reaches an edge of the panel, for example.

The present invention will now be described by way of example with reference to the accompanying drawings.

Figure 1:
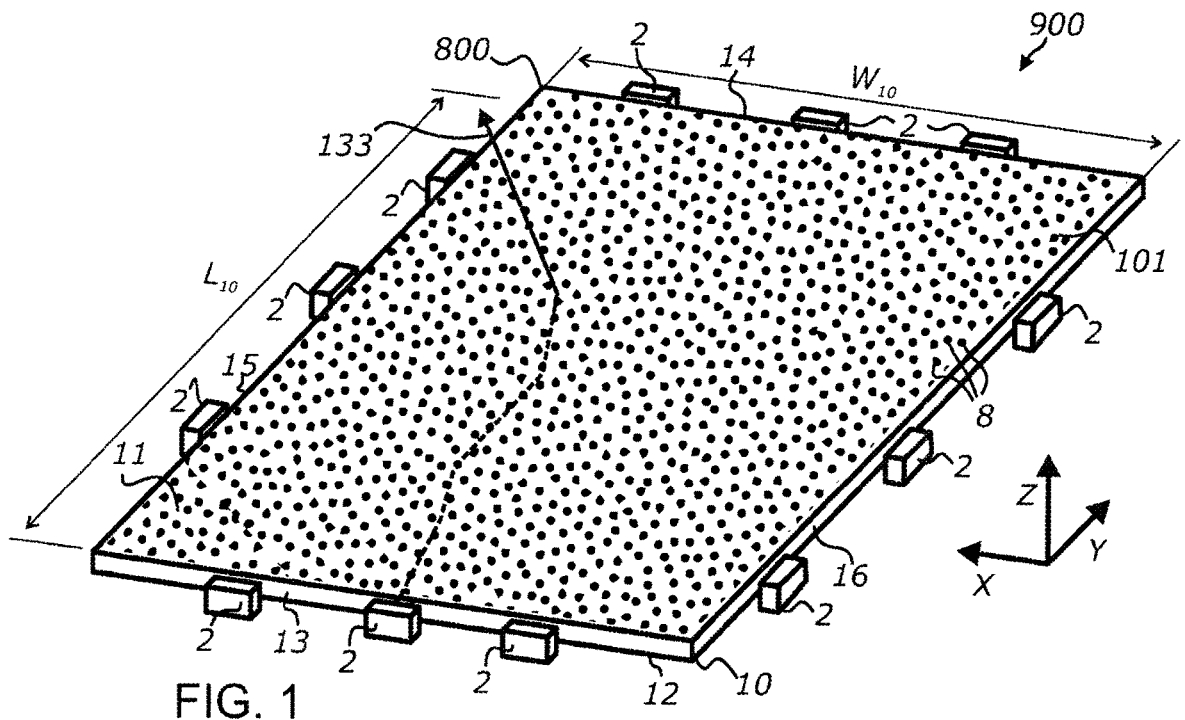
FIG. 1 is a schematic perspective view and raytracing of a wide-area solid-state light guide illumination system, according to at least one embodiment of the present invention.

FIG. 1 depicts an embodiment of a wide-area light guide illumination system 900 in accordance with the invention. Light guide illumination system 900 includes a generally planar light guide 800 that is formed by a substantially planar light guiding sheet 10 of an optically transmissive material. Light guide 800 may also have a plurality of second sheets of an optically transmissive material (not shown) attached to sheet 10 (such as, for example, sheets 20 described in reference to FIGS. 1-2 of the '865 application). The orientation of planar light guide 800 and its components in three-dimensional space may be conveniently described using orthogonal reference axes X, Y, and Z (see FIG. 1) which also define orthogonal reference planes XY, XZ, and YZ.

Sheet 10 has a rectangular configuration and is defined by opposing broad-area surfaces 11 and 12 and four edge surfaces 13, 14, 15 and 16. Surfaces 11 and 12 extend parallel to each other and extend broadly both longitudinally and laterally along the X and Y axes so as to form a planar sheet form that is parallel to the XY plane. Opposing edge surfaces 13, 14 are parallel to each other, extending parallel to the XZ plane, and opposing edge surfaces 15, 16 are likewise parallel to each other, extending parallel to the YZ plane. Sheet 10 has a non-zero thickness which may be conventionally measured along the Z axis or coordinate.

Sheet 10 is preferably formed from a highly transmissive, solid dielectric material and is configured to guide light both longitudinally and laterally using optical transmission through the material and a total internal reflection (TIR) from opposing surfaces 11 and 12. Surfaces 11 and 12 are preferably optically smooth and polished to high gloss. Edge surfaces 13, 14, 15 and 16 may also be polished and configured for reflecting light by means of TIR with high efficiency. One or more edge surfaces 13, 14, 15 and 16 may also be covered with a specularly reflective mirror or a diffuse reflector. For example, any of the edge surfaces may be coated with a metallic layer (e.g., aluminized or silvered). In another example, strips of highly reflective material, such as a metallized film or foil may be applied to any of the edge surfaces 13, 14, 15 and 16. Another suitable exemplary type of the reflective materials may also be a white, light diffusing tape.

Suitable materials for making sheet 10 may include various dielectric materials in the form of a wide-area, highly transparent sheet or film. Materials that may be particularly suited for making sheet 10 include but are not limited to water-clear (low-iron) glass, Poly(methyl methacrylate) (PMMA or acrylic), polycarbonate, styrene, cured urethane, polyester, silicone, and the like.

Sheet 10 has a length $L_{10}$ and a width $W_{10}$ that can be considerably less than length $L_{10}$. According to different embodiments, width $W_{10}$ is less than length $L_{10}$ by at least 1.5 times, at least 2 times, at least 3 times, at least 5 times, and at least 10 times. The thickness of sheet 10 can be make sufficiently low to make it flexible. According to one embodiment, the thickness of flexible sheet 10 can be in the range of 0.3 mm to 2.5 mm and more preferably from 0.5 mm to 1.5 mm so that the sheet could be flexed and handled with relative ease without breaking or affecting its structural integrity.

Light guide illumination system 900 further includes a plurality of compact solid-state light sources exemplified by LEDs 2. LEDs 2 are provided in four linear arrays or strips where each array or strip is configured to illuminate the respective edge of sheet 10 (edge surfaces 13, 14, 15 and 16). In other words, all of the edges of sheet 10 are configured as light input edges. Within each array or strip, LEDs 2 are positioned adjacent and optically coupled to the respective edge surface such that the amount of light that is not coupled to light guide 800 (light spillage) is minimized. According to an aspect, light guide 800 is optically coupled to LEDs 2 to intercept as much light emitted by LEDs 2 as possible (e.g., more than 70%, more than 75%, more than 80%, or about 90% or more). According to alternative embodiments, LEDs 2 may be arranged into a single linear array which is optically coupled to one of the edges of light guiding sheet 10, into two linear arrays which are optically coupled to two adjacent (e.g., edge surfaces 13 and 15) or two opposite (e.g., edge surfaces 13 and 14) edges of light guiding sheet 10, or into three linear arrays which are optically coupled to three adjacent edges (e.g., edge surfaces 13, 15 and 14).

According to one embodiment, in order to enhance optical coupling between light guiding sheet 10 and LEDs 2, an air gap between LEDs 2 and respective edge surfaces may be filled with an optically transmissive filler material (e.g., silicone). The filler material may index matched the material of light guiding sheet or to a material that may be used to encapsulate LED chips within LEDs 2.

Surface 11 of sheet 10 includes a plurality of discrete light extraction features 8 forming a two-dimensional light extraction pattern 101 and configured to extract light from light guide 800. According to one embodiment, light extraction pattern 101 may occupy substantially the entire exposed area of light guide 800. It may also extend all the way longitudinally between opposing edge surfaces 13 and 14 and laterally between opposing edge surfaces 15 and 16.

According to one embodiments, light extraction features 8 are formed only in surface 11 while opposite surface 12 can be substantially free from light extraction features 8. According to one embodiments, light extraction features 8 are formed only in surface 12 while surface 11 can be substantially free from light extraction features 8. According to one embodiments, light extraction features 8 are formed in both opposing surfaces 11 and 12.

While some of the paragraphs below may describe embodiments of illumination system 900 primarily referring to light extraction features 8 being formed in surface 11, it should be understood that this invention is not limited to this and that the same description can be applied to the cases when light extraction features 8 are formed in surface 12 or in both surfaces 11 and 12. Furthermore, it should be understood that these embodiments are amenable to various modifications and alternative forms, for example, in which light extraction features 8 are formed in other surfaces that are parallel or near-parallel to surfaces 11 and 12, especially when light guide 800 includes two or more layer of optical transparent materials. According to some embodiments, light guide 800 may be formed by two sheets of optically transmissive materials that are attached (and optionally bonded) to each other. At least some of light extraction features 8 may be formed in or on the inside broad-area surface of one or both of the sheets, so that light extraction features 8 become embedded into the material of light guide 800 when the sheets are bonded together.

In operation, an exemplary light ray 133 emitted by one of LEDs 2 optically coupled to light input edge surface 13 is propagated within sheet 10 in a waveguide mode until it is extracted by one of light extraction features 8 and is directed out and away from light guide 800. Depending on the location, configuration and optical properties of extraction features 8, as well as probability, ray 133 may exit from either surface 11 or 12. Depending on the same factors, ray 133 may exit from surface 11 or 12 at a right angle or at an oblique angle with respect to the surface plane.

According to one embodiment, light extraction pattern 101 may have a uniform average areal density or coverage with a randomized spacing between individual light extraction features 8, for example, as illustrated in FIG. 1. The spacing may be randomized, for example, such that adjacent individual light extraction features 8 are spaced from each other by spacing distances that deviate from an average spacing within a sampling area by no less than a minimum spacing distance and no more than a maximum spacing distance.

Figure 2:
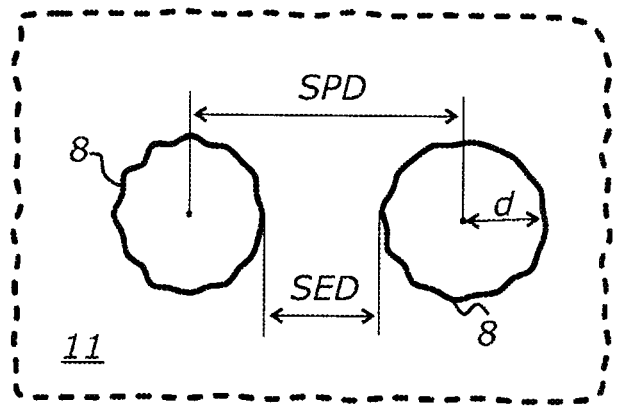
FIG. 2 is a schematic view of an adjacent pair of spaced-apart light extracting features formed on a surface of a light guiding sheet, illustrating exemplary definitions of a spacing distance and a separation distance, according to at least one embodiment of the present invention.

A spacing distance (SPD) may be ordinarily defined as a distance between geometrical centers of individual light extraction features 8, e.g., as schematically illustrated in FIG. 2. According to different embodiments, a minimum spacing distance $SPD_{MIN}$ characterizing a particular sampling area of light extraction pattern 101 may be 0.1, 0.25, 0.5, 0.75, or 0.9 times an average spacing distance ($SPD_{AVG}$) characterizing the same sampling area. According to different embodiments, a maximum spacing distance $SPD_{MAX}$ characterizing a particular sampling area of light extraction pattern 101 may be 1.2, 1.5, 2, 2.5, 3, 5 or 10 times the average spacing distance $SPD_{AVG}$.

A separation distance (SED) in relation to a pair of adjacent individual light extraction features 8 may be defined as the shortest distance connecting the respective outlines or boundaries of such adjacent light extraction features (FIG. 2). In an exemplary case of two adjacent light extraction features 8 each having a round outline or aperture with a diameter d, separation distance SED may be defined as the spacing distance SPD minus diameter d. Accordingly, depending on the values of the spacing distance and diameter d, the separation distance may have negative and positive values, and may also be zero when SPD=d.

The definition of separation distance SED may also be generalized to the cases where light extraction features 8 have shapes other than round. For example, an average size or an average diameter of light extraction features 8 may be used in place of diameter d to define separation distance SED. The average diameter or size of individual light extraction feature 8 may be defined as an average length of diameters measured at predefined angular intervals around a centroid of the shape representing such light extraction feature 8. For example, the angular intervals can be 1°, 2° 5°, 10°, 20°, 30° or 45°.

Figure 3:
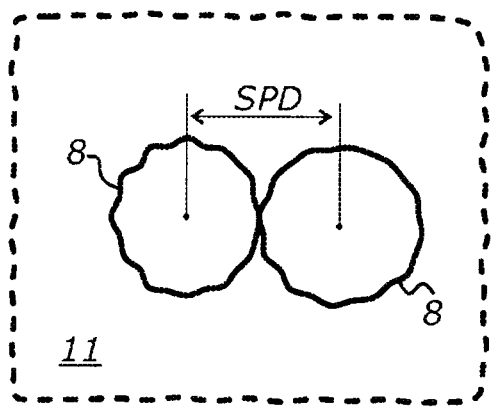
FIG. 3 is a schematic view of contacting light extracting features, according to at least one embodiment of the present invention.
Figure 4:
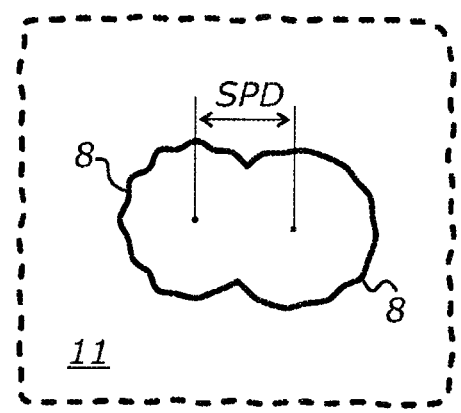
FIG. 4 is a schematic view of substantially overlapping light extracting features, according to at least one embodiment of the present invention.

According to one embodiment, separation distance SED characterizing a pair of adjacent light extraction features 8 having round or non-round shapes may be considered negative when these adjacent light extraction features 8 (or their apertures or outlines) substantially overlap (FIG. 4), zero when they (or their apertures or outlines) are disposed in contact or extremely close to each other (FIG. 3), and positive when their outlines or apertures neither overlap nor contact each other (FIG. 2).

According to one embodiment, separation distance SED between at least some adjacent light extraction features 8 is negative, e.g., light extraction features 8 are substantially overlapping. According to different embodiments, the overlapping light extraction features 8 may overlap by 10% or more, 20% or more, 30% or more, 50% or more, 75% or more, or 80% or more. According to an aspect of the embodiments in which two or more light extraction features 8 overlap, such overlapping light extraction features 8 may be cumulatively considered a larger single light extraction feature 8. In an exemplary case where each of the overlapping light extraction features 8 is formed by an individual drop of light scattering ink, the resulting, larger light extraction feature may ordinarily have a total volume that is a whole multiple of the volume of the individual drops forming individual light extraction features 8. For example, individual microdrops having a volume of 4 picoliters may form larger drops having volumes of 8 picoliters, 12 picoliters, 20 picoliters, 40 picoliters and so on.

According to one embodiment, individual light extraction features 8 may be formed by depositing two or more microdrops of a light scattering ink to the same location of surface 11. According to one embodiment, individual light extraction features 8 may be formed by depositing two or more microdrops with slight offset with respect to each other. It is preferred that each microdrop deposited to surface 11 is at least partially or completely cured to a high-viscosity or substantially solid state before depositing a next microdrop on top of it. The droplet deposition process can be repeated to gradually build up a prescribed thickness and/or size of the respective microdot in stepped increments based on the volume of individual droplets.

According to one embodiment, separation distance SED between at least some adjacent light extraction features 8 is zero or near zero. In other words, the light extraction features 8 are contacting each other or their apertures are very close to each other or have a very small overlap (e.g., within less than 10% of the average diameter of each of the adjacent light extraction features 8).

According to different embodiments, separation distance SED between at least some adjacent light extraction features 8 is greater than 25%, greater than 50%, greater than 100%, greater than 150%, or equal to or greater than 200% of diameter d or the average diameter characterizing the light extraction features 8. According to different embodiments, separation distance SED between at least some adjacent light extraction features 8 is less than 0.9, less than 0.75, less than 0.5, or less than 30% of diameter d (in case of round-apertures) or the average diameter (in case of non-round-apertures) characterizing light extraction features 8.

For the purpose of measuring average values of the spacing distances SPD and/or separation distances SED, a suitable sampling area may be defined as a relatively small-size area of surface 11, at a particular location of the surface, which includes at least 100 individual light extraction features 8. According to different embodiments, an average separation distance $SED_{AVG}$ between adjacent light extraction features 8 within the sampling area is greater than 25%, greater than 50%, greater than 100%, greater than 150%, or equal to or greater than 200% of diameter d or the average diameter characterizing the light extraction features 8. According to different embodiments, an average separation distance between adjacent light extraction features 8 within the sampling area is less than 0.9, less than 0.75, less than 0.5, or less than 30% of diameter d (in case of round-apertures) or the average diameter (in case of non-round-apertures) characterizing light extraction features 8.

According to one embodiment, light extraction features 8 may be formed by repeatedly depositing a number of individual droplets with a slight offset from each other. The offset can be selected to be less than the prevalent diameter of the individual microdots formed by each droplet, creating at least partial overlap for the resulting micro- or macro-dots. According to one embodiment, the direction of the offset can be maintained for depositing a series of individual droplets such that a single elongated light extraction feature 8 in the form of a straight line can be formed. According to one embodiment, the direction of the offset can be varied so as to produce continuous curved lines or a combination of straight and curved lines or line segments. The width of the lines or line segments produced by this method may be controlled, for example, by the volume and viscosity of each droplet, wettability of surface 11, temperature of the ink or the substrate (sheet 10), number of drops, amount of the offset, as well as depositing some of the microdots with a perpendicular offset from the intended center of the line or line segment. Multiple straight and/or curved lines may be branched at one or multiple locations, e.g., to produce a tree-like structure.

Light extracting features 8 may include any suitable two- or three-dimensional optical elements or surface features configured for intercepting and extracting light from sheet 10. Light extracting features 8 may be configured to extract light by means of scattering, reflection, refraction, deflection, diffraction, absorption with the subsequent re-emission, or any combination thereof.

Light extracting features 8 may be further configured to extract light while changing one or more properties of light. Exemplary properties of light that may be changed by light extracting features 8 include but are not limited to a wavelength, polarization, spectral distribution, angular and/or spatial distribution, and dispersion. For example, each light extracting features 8 may include a color pigment that receives white color and either filters out certain wavelengths or converts the received light to a different color. For example, each light extracting features 8 may include a color pigment that is configured for converting a white color to a different color, e.g. red, green or blue. In a further example, each light extracting features 8 may include a fluorescent material (e.g., a phosphor) that that is configured to receive a blue color light and convert it to a white light. In a further example, light extracting features 8 may include a light-scattering material that disperses the incident light over a wide angular range. A fluorescent material can be combined or mixed with a light scattering material. For example, particles of a phosphor material may be mixed together with light-scattering particles into the ink used to produce light extraction features 8.

According to one embodiment, light extraction pattern 101 may have a non-uniform average areal density (or coverage) of individual light extraction features 8 at different locations of surface 11. The spacing between individual light extraction features 8 may be varied according to a regular or irregular pattern. Furthermore, light extraction pattern 101 may be segmented into multiple smaller-area light extraction patterns that are either separated from each other or have different optical properties or distribution densities of light extraction features. These smaller-area light extraction patterns may have distinct boundaries. They can also be separated from each other by spacing or separation areas that are generally free from light extraction features 8. According to one embodiment, the spacing or separation areas may be distributed over the area of surface 11 according to an ordered geometrical pattern, such as for example, an array of parallel bands.

Figure 5:
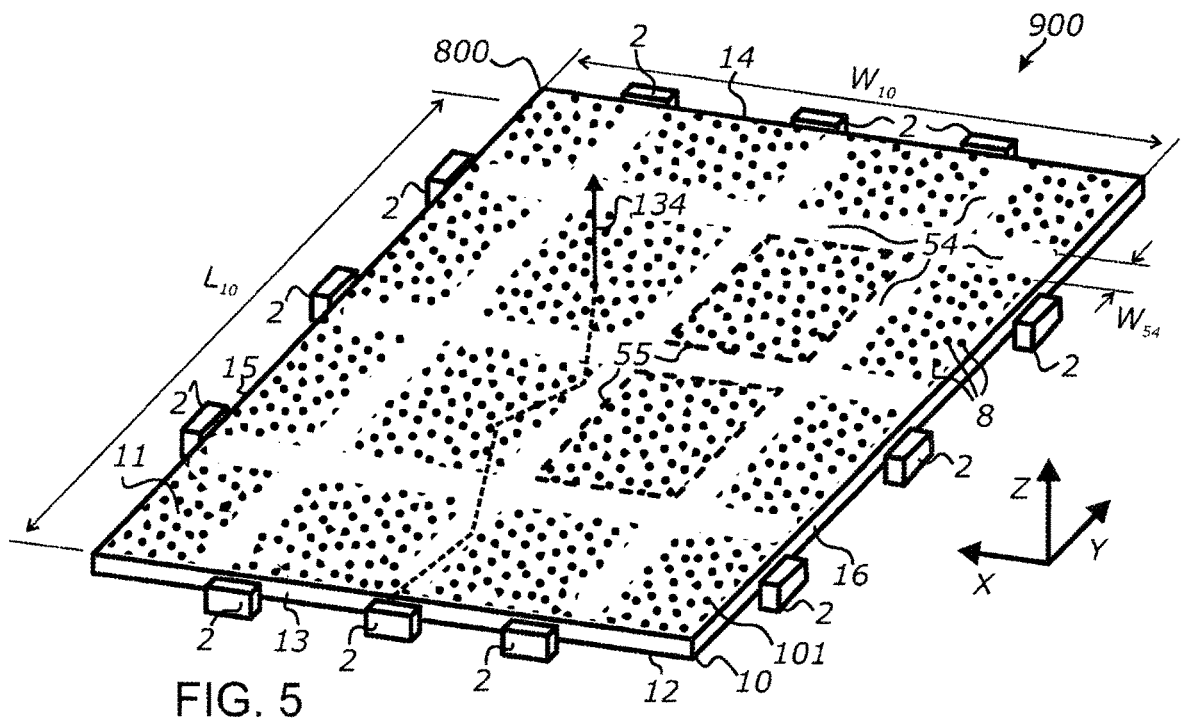
FIG. 5 is a schematic perspective view of a wide-area light guide illumination system having a segmented light extraction pattern, according to at least one embodiment of the present invention.

FIG. 5 illustrates an embodiment of system 900 in which light extraction pattern 101 is segmented into multiple sub-patterns, as indicated by areas 55. Those sub-patterns (areas 55) are separated from each other by separation areas 54 that are generally free from light extraction features 8. Separation areas 54 are configured in the form of a perpendicular grid of narrow bands that extend all the way between opposing edge surfaces 13 and 14 and 15 and 16. More specifically, the bands representing separation areas 54 are arranged into two parallel arrays that intersect with each other at a right angle. The parallel bands of the first array extend perpendicular to light input edge surfaces 13 and 14 and the parallel bands of the second array extend parallel to light input edge surfaces 13 and 14. Each band or strip representing an individual separation area 54 may have a width $W_{54}$ that is less than the length or width of patterned areas 55.

According to some embodiments, it may be preferred that width $W_{54}$ of each separation area 54 is at least several times greater than prevalent spacing distances SPD between light extraction features 8 in areas immediately adjacent to the respective separation area 54. According to some exemplary embodiments, width $W_{54}$ can be at least 3 times, 5 times, 10 times, 20 times, 50 times, and 100 times greater than an average SPD characterizing the distances between light extraction features 8 in an adjacent patterned area 55. According to some embodiments, it may be preferred that the size of each area 54 is at least several times greater than a prevalent or average spacing distances SPD between light extraction features 8 within such area, e.g., at least 3 times, 5 times, 10 times, 20 times, 50 times, 100 times, or 1000 times.

The operation of light guide illumination system 900 of FIG. 2 is illustrated by the example of an exemplary light ray 134. Ray 134 is emitted by one of the LEDs 2, propagated through light guide 800 (sheet 10) and extracted using individual light extraction feature 8 of light extraction pattern 101 such that ray 134 further propagates towards a prescribed direction (e.g., towards a viewer or an object to be illuminated).

According to one embodiment, separation areas 54 may be configured to suppress or otherwise significantly limit the rate of light extraction in those areas such that the guided light can only be extracted from one of areas 55. This may be useful, for example, in order to create a visually distinct appearance of light guide 800 when illuminated by LEDs 2. In a further non-limiting example, separation areas 54 may be configured to provide some visual transparency of light guide 800 even when it is illuminated, regardless of the density and/or light-blocking operation of patterned areas 55.

In a yet further non-limiting example, separation areas 54 may be positioned in areas of sheet 10 which are covered by an opaque material. For instance, light guide 800 may be associated with a grid or reflective or light absorbing members. Such a grid may be exemplified by an egg-crate lighting diffuser or a grid of parabolic louvers and the opaque members may be represented by the louvers or the walls of the egg-crate diffuser structure. Since extracting and emitting light in the areas where the opaque grid members are located could result in a loss of efficiency (e.g., due to light absorption or reflection by the grid members) suppressing the light emission in those areas by providing separation areas 54 may help enhance the overall efficiency of the lighting device (illumination system 900).

According to some embodiments, separation areas 54 may also be used for attaching other optical elements to light guide 800, such as, for example, light coupling elements disclosed in the '361 and '666 Publications or light guiding elements disclosed in the '865 application.

According to one embodiment, the arrangements and optical properties of individual light extraction features 8 may generally be the same or similar for each area 55. According to one embodiment, the arrangements and/or optical properties of individual light extraction features 8 may be the different for different areas 55. For example, the areal density, spatial distribution, color properties, sizes and/or shapes of light extraction features 8 may be made variable from one area 55 to another.

According to an aspect of the embodiment of FIG. 5, surface 11 has light extracting areas (areas 55) that are alternating with spacing or separation areas (areas 54) in a repeating pattern. According to one embodiment, width $W_{54}$ is constant along the entire length of each individual separation area 54. According to one embodiment, width $W_{54}$ is variable along the length of the individual separation area 54. According to one embodiment, width $W_{54}$ may also differ from one separation area 54 to another.

According to one embodiment, each light extracting feature 8 is formed by a relatively small dot (a microdot) of a highly diffusely reflective, light scattering material deposited to surface 11. The microdots may be distributed over surface 11 according to an ordered or random two-dimensional pattern. Suitable materials for light extracting features 8 may include white inks or paints having a reflectance of at least 80% in the visual spectrum, preferably having at least 85% reflectance, even more preferably at least 90% reflectance, and still even more preferably at least 95% reflectance. Light scattering dots may be formed by white inks that are radiation-curable (in particular, UV-curable), aqueous (water-based) or solvent-based. When LEDs 2 are configured to emit light in a particular wavelength range, the ink material should preferably have a reflectance greater than 85%, 90% or 95% in that wavelength range.

According to one embodiment, individual light extraction features 8 may have a volume between 1 picoliter and 10 picoliters. According to one embodiment, each or at least some of individual light extraction features 8 may have a volume of about 1 picoliter. According to one embodiment, individual light extraction features 8 have a volume of about 3 picoliters. According to one embodiment, individual light extraction features 8 have a volume of about 4 picoliters. According to one embodiment, individual light extraction features 8 have a volume of about 5 picoliters. According to one embodiment, individual light extraction features 8 have a volume of about 10 picoliters.

The microdots can be printed on surface 11 using a flatbed or roll-to-roll material deposition printer, a UV printer, an ink-jet printer, a sublimation printer, or a screen printer, for example. According to one embodiment, the white ink may include nanoparticles of titanium dioxide, strontium sulfide, zinc sulphide, zink oxide, or other type of white, high-reflectance powder suspended in a liquid resin or suspension which viscosity is suitable for the selected type of surface deposition technique (e.g., UV printing). The nanoparticles may be formed by any type of a high-refractive-index material (which be transparent) and may be configured to scatter light primarily using diffraction, at least in one preselected wavelength range. According to one embodiment, light extraction features 8 may include materials with specific color-filtering properties (e.g., pigmented inks or fluorescent inks) and can change the color of light.

According to one embodiment, the light-scattering microdots are formed by a UV-curable ink that includes nanoparticles of optically transmissive, high-refractive-index material suspended in a translucent or, more preferably, highly transparent polymerizable binder material that has a significantly lower refractive index than that of the nanoparticles. Examples of the transparent polymerizable binder material binder materials include various acrylates and their derivatives (e.g., epoxy acrylates, polyurethane acrylates and polyester acrylates) obtained by reacting an acrylate with a suitable epoxide, urethane or polyester resins. In one embodiment, the binder material may also include a polyester resin or polyurethane resin mixed with a UV-polymerizable reagent. According to one embodiment, the binder material may include acryl acid ester (e.g., 40-60% by weight) and 1,6-Hexanediol diacrylate (e.g., 20-30% by weight).

According to one embodiment, at the time of printing (or otherwise deposition to a surface of light guide 800), the uncured ink should preferably have a viscosity in the range of 10 to 150 centipoise (cP). If the ink has a higher viscosity at room temperature (25° C.), it may be heated before surface deposition to bring the viscosity down to the prescribed range. According to one embodiment, the viscosity of the uncured ink at room temperature is between 10 cP and 30 cP. According to one embodiment, the viscosity of the uncured ink at room temperature is between 5 cP and 15 cP. According to one embodiment, the viscosity of the uncured ink at room temperature is from 5 cP to 25 cP.

According to one embodiment, light extracting features 8 may have phosphorescent or fluorescent properties. For example, the resin or suspension used to print light extraction features 8 on surface 11 may include a fluorescent material or phosphor that converts a shorter wavelength of light in the ultraviolet (UV) or visible spectrum into one or more longer wavelengths in the visible range. Such phosphorescent material can be configured to absorb light in a first wavelength and re-emit light in a second wavelength which is different than the first wavelength. According to one embodiment, it is preferred that the second wavelength is greater than the first wavelength. By way of example, the material may be configured to absorb at least a portion of blue light emitted by some types of LEDs and re-emit the energy of such blue light in the form of perceptibly white light. By way of example and not limitation, the fluorescent material may be configured to convert 350 nm-400 nm UV light from a "black light" into visible wavelengths (e.g., 500 nm-600 nm).

Light extracting features 8 may be distributed over the designated area(s), e.g., areas 55, according to an ordered or random pattern. According to one embodiment, such pattern may be formed by a two dimensional array of rows and columns. In one implementation, every other row or every other column may be shifted relatively to the adjacent rows or columns so as to form a staggered array or rows or columns. According to one embodiment, the positions of individual light extracting features 8 may be randomized within an otherwise ordered pattern. According to one embodiment, light extraction features 8 are distributed according to a high-density pattern and have a cumulative area that approximates the exposed area of surface 11. According to one embodiment, substantially the entire exposed area of surface 11 may be coated by a continuous layer of a semi-opaque light diffusing material, such as non-absorbing white ink or bulk scattering particles suspended in a polymeric material, for example. According to one embodiment, one or more areas 55 may be substantially covered with a continuous layer of a semi-opaque light diffusing material.

According to one embodiment, light extraction features 8 are formed by a light scattering or light diffusing film that is attached to surface 11 in the respective areas (e.g., light extraction areas 55). Such film should preferably have a hemispherical reflectance of at least 85%, more preferably at least 90%, and still more preferably at least 95%.

LED chips employed in LEDs 2 may be configured to emit a blue light. Light extracting features 8 may be configured to change the light emission spectrum upon interaction with blue light propagating in light guide 800. For example, a YAG phosphor may be employed in light extracting features 8 to convert such blue light to a white light. The phosphor material may be mixed with silicone or other encapsulation material. Light extraction features 8 may be deposited directly to surface 11 in a liquid form, for example, by printing, spraying, dispensing, coating or other suitable liquid material deposition methods.

According to one embodiment, light extraction features 8 are formed by light-deflecting or light-diffusing surface microstructures formed in or on surface 11. The microstructures may include ordered or random surface relief features formed, for example, by means of etching, embossing, laser ablation, sanding, micromachining, micro-replication and any other method suitable for producing the desired surface texture or relief.

According to some embodiments, light extraction features 8 may be formed by micro-cavities formed in surface 11. Each micro-cavity may have the shape of a lens, a prism, a blind hole, or can be simply a microscopic discontinuity in surface 11 allowing some light to escape from light guide 800 in the respective location. The size of individual light extraction features may range from submicron sizes up to several millimeters. According to one embodiment, the size of individual light extraction features 8 is between 1 micrometer and 25 micrometers. According to one embodiment, the size of individual light extraction features 8 is between 20 micrometers and 100 micrometers. According to one embodiment, the size of individual light extraction features 8 is between 40 micrometers and 100 micrometers. According to one embodiment, the size of individual light extraction features 8 is between 40 micrometers and 200 micrometers. According to one embodiment, the size of individual light extraction features 8 is sufficiently small and the spacing between individual features is sufficiently large so that light guide 800 has a substantially transparent appearance at least when viewed from a normal viewing direction.

According to one embodiment, light extraction features 8 are formed in a separate film or thin-sheet material which is then applied to surface 11 with a good optical contact and preferably with refractive index matching. According to one embodiment, light extraction features 8 may be formed in surface 12. According to one embodiment, light extraction features 8 may be formed in both surfaces 11 and 12, for example, to enhance the light extraction rate without allowing individual light extraction features 8 to be too close to each other.

According to some embodiments, referring to FIG. 5, certain characteristics of light extraction features 8 or their two-dimensional pattern in one area 55 may be different from those of another (e.g., adjacent) area 55. For example, the geometric patterns, relative areas occupied by light extraction features 8, the spacing between adjacent light extraction features 8, the size, thickness, reflectance, absorption, color or fluorescent properties of various light extraction features 8 can be different in different parts of surface 11.

The properties of light extraction features 8 may also vary gradually across surfaces 11 and/or 12. According to one embodiment, light extraction features 8 of surface 11 may be formed by one type of light deflecting elements (e.g., inkjet-printed microdots) while light extraction features 8 of surface 12 may be formed by a different type of light deflecting elements (e.g., surface microstructures formed by microimprinting or hot embossing).

Light extraction features 8 are configured to progressively extract light propagating in sheet 10 and result in a substantially uniform light emission from either one or both surfaces 11 and 12. In order to achieve a uniform emission, the two-dimensional pattern of light extraction features 8 can have a variable spatial density in different areas. According to one embodiment, the density should increase with the distance from LEDs 2. Such a variable spatial density can be a function of the size and thickness of sheet 10 and can be determined from optical raytracing or actual experiments with different-density patterns.

According to one embodiment, areas 54 may include light extraction features 8 having a much lower areal density compared to adjacent areas 55. According to different implementations, the areal density of light extraction features 8 in areas 54 may be at least 2 times, at least 4 times, at least 5 times or at least 10 times less than the areal density of light extraction features 8 in areas 55. The areal density of light extraction features may also vary within each of the areas 54 and 55.

According to one embodiment, areas 55 having a first areal density of light extraction features 8 and areas 54 having a different second areal density of light extraction features 8 may be alternated to form a visually distinct geometrical pattern encoded by different levels of brightness. According to one embodiment, the areal density of light extraction features 8 in areas 54 and 55 may be configured to encode bitonal or gray-scale images or patterns which can be made particularly conspicuous to a viewer when illuminated by LEDs 2. The bitonal or gray-scale images or patterns may also be configured to have a comparatively lower conspicuity when non-illuminated. According to one embodiment, the patterns of light extraction features 8 in areas 54 and 55 may be configured to maintain a generally transparent or translucent overall appearance of light guiding sheet when it is in a non-illuminated state and make light guiding sheet 10 appear substantially opaque (and optionally displaying bitonal or gray-scale images or patterns) when illuminated by LEDs 2 to at full brightness.

A uniformity U of luminance of a broad-area surface of sheet 10 (e.g., surface 11 or surface 12) may be defined by the following relationship: $U=1-(L_{PEAK}-L_{AVG})/L_{AVG}$, where $L_{PEAK}$ is a peak luminance and $L_{AVG}$ is an average luminance characterizing the surface. The peak luminance may be measured using spot measurements at different locations of the broad-area surface using a spot luminance meter. The sampling area for spot measurements may be defined by a circular area characterized by a radius that is much smaller than the X and Y dimensions of light guide 800. A preferred size of the sampling area may also be defined by the characteristics of the measurement tool, the overall size of the panel or the intended application (for example, the anticipated viewing distance). In other words, the spot measurements should preferably have sufficient granularity to measure surface luminance variations across the light-emitting surface of light guide 800.

According to one embodiment, luminance uniformity U of light guide 800 (as measured at either one of surfaces 11 and 12) is at least 70%, more preferably at least 80%, even more preferably at least 85%, and yet even more preferably at least 90%. According to one embodiment, a difference between an average luminance of different areas 55 is less than 30%, more preferably is less than 25%, even more preferably is less than 20%, even more preferably is less than 15%, and still even more preferably is less than 10%.

According to one embodiment, light guide 800 may be formed by two distinct light guiding layers which represent different optically transmissive sheets. According to different implementations, light extraction features 8 may be formed in one or both of the sheets (light guiding layers).

It should be understood that light sources illuminating the light input edges (such as opposing edge surfaces 13 and 14) are not limited to light emitting diodes (LEDs) and may include any suitable individual or multiple light sources of any known type, including but not limited to: fluorescent lamps, incandescent lamps, cold-cathode or compact fluorescent lamps, halogen, mercury-vapor, sodium-vapor, metal halide, electroluminescent lamps or sources, field emission devices, lasers, etc. Each individual light source may have a linear configuration and include a single linear light-emitting element or a relatively small number of linear light-emitting elements. Each light source may also have two or more compact light emitting elements incorporated into a linear array. When the light source includes multiple light emitting elements, each of the light emitting elements may have a compact shape or an extended two-dimensional or one-dimensional (elongated) shape.

According to one embodiment, at least one of the light sources optically coupled to sheet 10 includes a laser source emitting a highly collimated beam of light. Suitable examples of a highly collimated beam include light beams having a full width at half-maximum (FWHM) divergence angle of less than 30°, less than 25° degrees, less than 20° degrees, less than 15° degrees, less than 10° degrees, and less than 5° degrees. According to one embodiment, at least one of the light sources optically coupled to sheet 10 includes an LED or laser source emitting a moderately collimated beam of light having a FWHM divergence angle of less than 60°, less than 50° or less than 45°. According to some embodiments, the above-referenced FWHM divergence angles may be defined and measured in a plane that is perpendicular to a prevalent plane of sheet 10 (e.g., in the YZ plane when light is input through edge surface 13).

LEDs 2 may be further associated with integrated or external optics such as collimating or light-redistributing lenses, mirrors, lens arrays, mirror arrays, light diffusers, waveguides, or optical fibers. When multiple light emitting elements are employed, each of the light emitting elements may be provided with individual optics. Alternatively, a single linear optic may be provided for the entire array to collimate light or otherwise shape the emitted beam in a plane which is perpendicular to the longitudinal axis of the array.

Light guide illumination system 900 may include a cover of housing configured to encase LEDs 2 and optionally portions of sheet 10 adjacent to the light input edge(s). Such housing may have different functions including but not limited to structural, protective (from dust, moisture, elements, impact, etc.) and/or aesthetic.

The overall dimensions of wide-area light guide illumination system 900, the size and shape of sheet 10, the types of LEDs 2 as well as their number, spacing and nominal power may be selected based on the target application. According to one embodiment, light guide illumination system 900 may be configured as a flat-panel lighting luminaire. According to another embodiment, it may be configured as a backlight of an LCD display. According to a yet another embodiment, it may be configured as a backlight for an illuminated sign, artwork or image print. According to a yet another embodiment, it may be configured as an illumination system (e.g., backlight or planar-panel light) for a planar panel photobioreactor.

Figure 6:
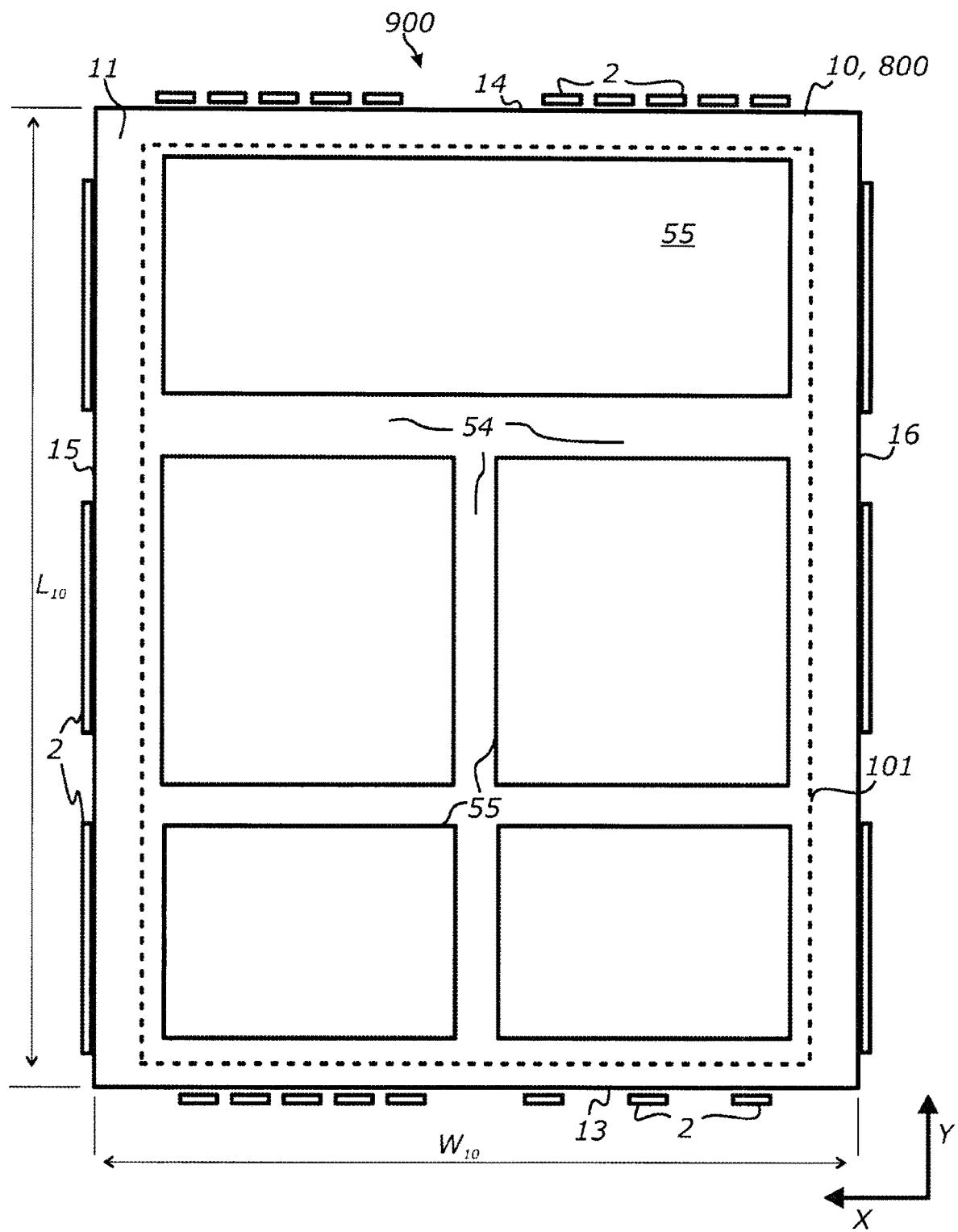
FIG. 6 is a schematic plan view of a wide-area light guide illumination system, showing an exemplary alternative arrangement of individual light extraction areas and separation areas of a light extraction pattern, according to at least one embodiment of the present invention.

Areas 55 may have different rectangular shapes and arranged on surface 11 according to a different pattern compared to those of FIG. 5. Furthermore, light extraction pattern 101 may include a mix of different shapes and sizes of areas 54 and 55. This is further illustrated in FIG. 6, which schematically depicts other geometrical configurations of areas 55 within light extraction pattern 101 and also schematically depicts other dimensions and arrangements of LEDs 2.

Figure 7:
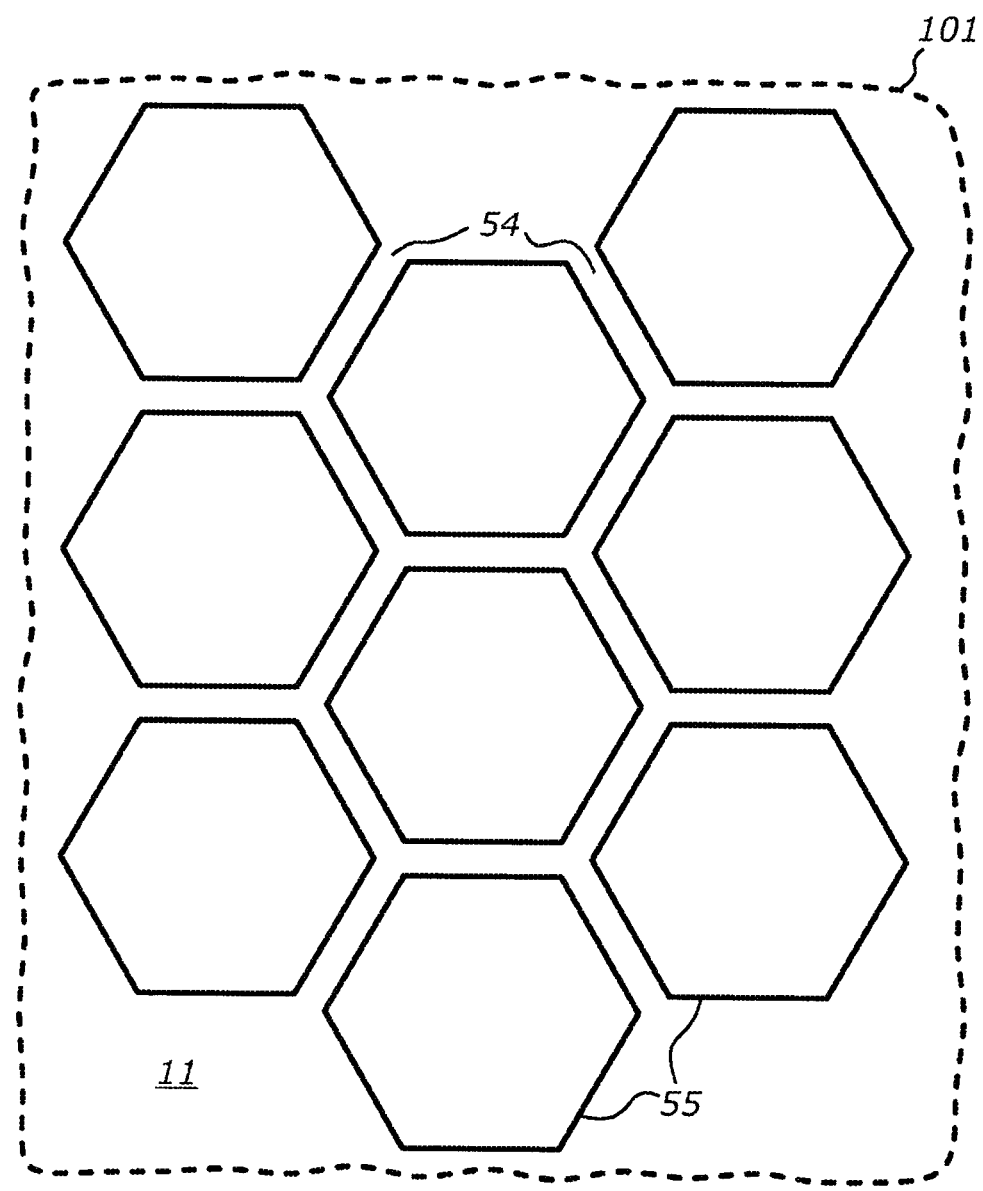
FIG. 7 is a schematic view of portion of a wide-area light guide illumination system, showing a two-dimensional array of hexagonal light extracting sections distributed over an area of a light guiding sheet, according to at least one embodiment of the present invention.

According to one embodiment, each of area 55 may have a hexagonal shape. An exemplary arrangement of such hexagonal areas 55 within light extraction pattern is schematically shown in FIG. 7. It should be understood that such pattern of hexagonal light extraction areas 55 may extend continuously over broad-area surface 11 both longitudinally and laterally (along the X and Y directions) to cover sufficiently large areas. The sizes and density of light extraction features 8 within each hexagonal area 55 may be selected such that an average luminance of different parts of pattern 101 is about the same or similar, e.g., within 20% of the average luminance produced by the entire patterned surface of sheet 10.

According to one embodiment, LEDs 2 may include individually digitally addressable RGB LEDs. Such individually digitally addressable RGB LEDs 2 may be selectively turned on and off or dimmed to illuminate select areas of illumination system 900 in different brightness and/or color.

According to one embodiment, individual light extraction features 8 or groups of light extraction features 8 are individually controllable and can change their color or light extraction properties in response to an external factor (e.g., supplied voltage, magnetic field, electric field, static electricity, illumination by an external source of light, mechanical or optical contact with an external object, etc.). Such individually controllable light extraction features 8 or groups may be selectively turned on and off or dimmed to illuminate select areas of light guide illumination system 900 in different brightness and/or color.

According to one embodiment, individual areas 55 may be configured and individually controlled as individual "pixels" within a large illuminated LED display. Such LED display may incorporate hundreds and thousands of areas 55. For example, each pixel including a single individually controllable area 55 may have a size from 0.5 mm to 5 mm or from 1 mm to 10 mm.

Figure 8:
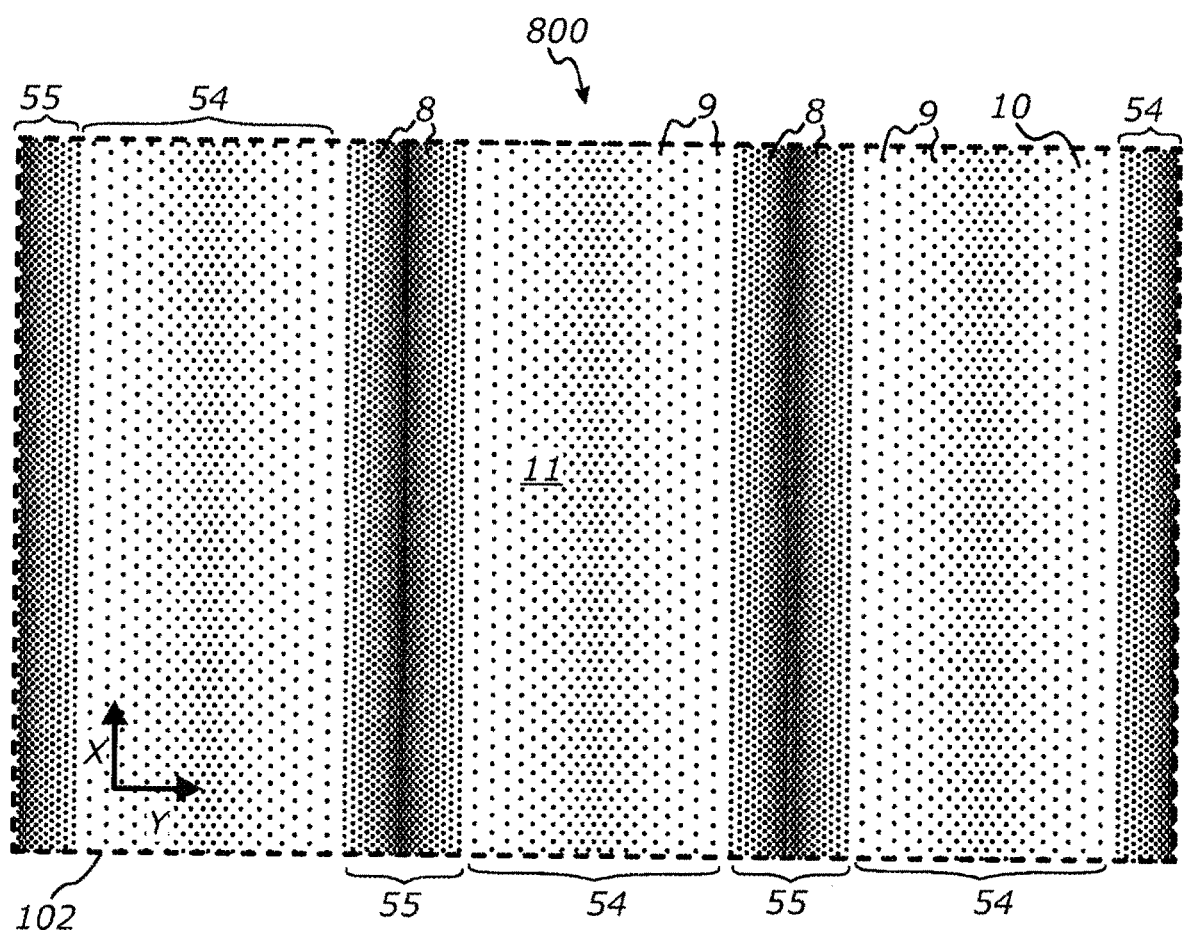
FIG. 8 is a schematic view showing an exemplary variable-density distribution pattern of light extraction features for a portion of a wide-area light guide illumination system, according to at least one embodiment of the present invention.

FIG. 8 schematically illustrates an exemplary light extraction pattern 102 including light extraction features 8 formed in areas 55 and light extraction features 9 formed in areas 54 that are alternating with areas 55 along the Y axis. The areal density of light extraction features 9 within areas 54 of pattern 102 is much lower than the areal density of light extraction features 8 within areas 55 of the pattern. The spatial distributions of light extraction features 8 within each area 55 has a variable density. At least some areas 55 have a positive gradient of the areal density towards a central axis. Similarly, the spatial distributions of light extraction features 9 within each area 54 has a variable density with a positive gradient of the areal density towards a central axis. The areal density of light extraction features 8 and/or 9 may be expressed, for example, in terms of the number of respective light extraction features per unit area. According to an aspect, light extraction pattern 102 includes alternating bands having different areal densities of light extraction features 8 and 9. Furthermore, the areal density is variable within each band.

A relative surface area of light extraction features 8 and/or 9 at any particular location of surface 11 and/or surface 12 may be defined as a sum of the individual areas of light extraction features 8 and/or 9 within a selected sampling area divided by the total area of the sampling area. For example, a relative surface area of 0.5 correspond to one-half of the sampling area being occupied by the light extraction features (50% areal coverage). A relative surface area equal to one means that the light extraction features occupy 100% of the sampling area, with no spaces. Depending on the size and shape of individual light extraction features, the spatial density and relative surface area may be bound by various predefined relationships.

According to one embodiment, light extraction patterns of features 8 and/or 9 are characterized by spacing distances SPD which progressively decrease with a distance from LEDs 2 at least within some sampling areas. According to one embodiment, spacing distances SPD progressively increase with a distance from LEDs 2 within at least some sampling areas. According to one embodiment, the light extraction patterns of light extraction features 8 and/or 9 are characterized by spacing distances SPD which progressively increase with a distance from LEDs 2 within at least a first sampling area and progressively increase with a distance from LEDs 2 within at least a second sampling area that is different from the first sampling area.

FIG. 8 illustrates varying the spatial density of light extraction features 8 and 9 (and, hence, varying the relative area occupied by light extraction features 8 and 9) by varying the spacing between individual light extraction features. However, it should be understood than the relative area may also be varied by varying the size of individual features 8 and/or 9, even at a constant spacing. For example, increasing the area of each light extraction feature 8 or 9 by two times within a particular sampling area will increase the relative area of such features within the sampling area by two times.

According to one embodiment, LEDs 2 may be side-emitting LEDs. In some implementations, the side-emitting LEDs may be attached directly to surface 11 or 12 of sheet 10 (e.g. glued using a two-sided adhesive transfer tape). Examples of side emitting LEDs that may be suitable for LEDs 2 include but are not limited to Micro SIDELED product series commercially available from OSRAM (e.g., LW Y87C, CUW Y3SH.B1 and LW Y1SG models of white LEDs or LB Y8SG model of blue LEDs) or models NS2W364G and NS2W266G of white side-emitting LEDs manufactured by Nichia.

It is noted, however, that the embodiments of wide-area light guide illumination system 900 described herein may also be adapted to using other types and form factors of side-emitting LEDs and may further be adapted to many different types and configurations of LEDs, including square, round or rectangular top-emitting LEDs of various architectures. Furthermore, non-LED light sources can be used in place of LEDs 2, such as, for example, lasers, fluorescent lamps, incandescent lamps, gas-discharge lamps, and OLEDs. LEDs 2 may incorporate LED arrays or arrays of LED die assembled within a single package. Suitable examples of such LEDs as well as related methods of LED coupling to light guides (waveguides) are disclosed, for example, in the '666 Publication. Additional exemplary embodiments of LEDs and light coupling structures that can be used to input light into light guide 800 are disclosed in the '865 application. For instance, "Example 1" in the '865 application further discloses an exemplary configuration of light extraction patterns for obtaining a substantially uniform light emission from the entire light emitting area of a planar-type light guide, which can be applied for patterning light guide 800 of this invention, according to at least some embodiments.

Figure 9:
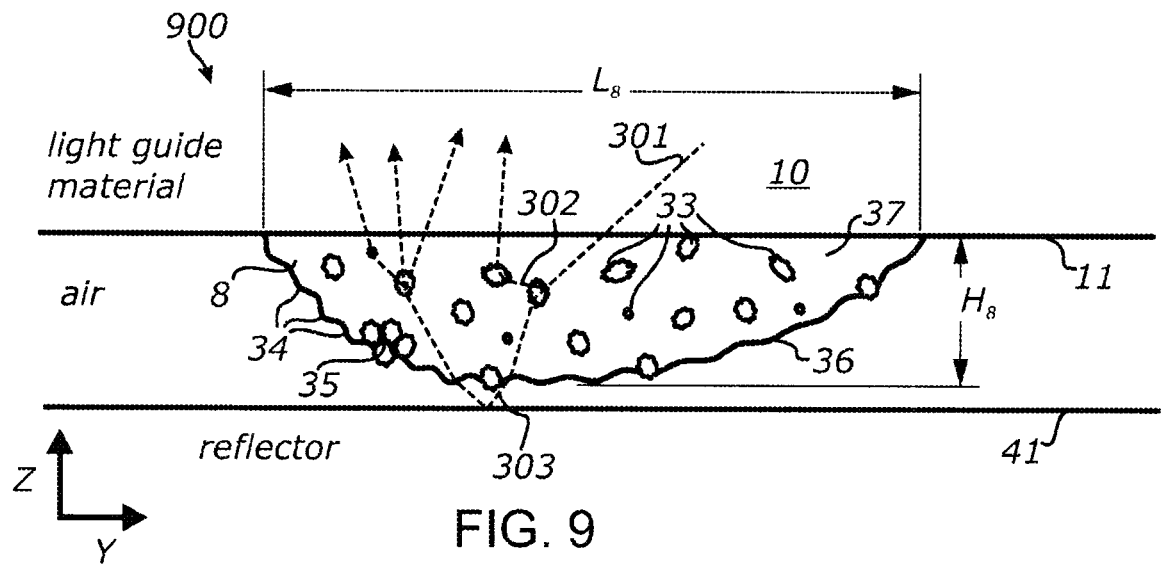
FIG. 9 is a schematic section view of a portion of a wide-area light guide illumination system, showing an irregularly shaped light extraction feature deposited to a surface of a light guide, according to at least one embodiment of the present invention.

FIG. 9 schematically depicts a portion of light guiding sheet 10 and individual light extraction feature 8 exemplified by a fully-cured, solidified drop (microdot) of a UV-curable ink deposited to surface 11. It is noted that the illustrative example of FIG. 9 may also be applied to configuring light extraction features 9 above and may further be applied to embodiments in which light extraction features 8 and/or 9 are formed in surface 12.

Referring FIG. 9, the UV-curable ink forming light extraction feature 8 includes a highly transparent, UV-reactive binder 37 and a suspension of high-refractive-index, light-scattering particles 33. A suitable example of light-scattering particles 33 having a high refractive index is submicron-sized particles of titanium dioxide.

Particles 33 are about evenly distributed throughout the volume of UV-reactive binder 37 and provide volumetric bulk scattering properties for light extraction feature 8. Some particles 33 may form agglomerates 35 in which a number of particles 33 may be disposed in contact with each other or at a very close distance to one another. Such distance can be much smaller than the average distance between individual particles 33 in binder 37. Agglomerates

35 may form two- or three-dimensional structures that have sizes from a fraction of the micrometer to several micrometers.

According to one embodiment, light extraction feature 8 of FIG. 9 may have an irregular elongated shape having a length $L_8$ and a maximum height $H_8$. Maximum height $H_8$ may also be referred to as a maximum thickness of light extraction feature 8. A transverse width of the elongated light extraction feature 8 may be 1.2 times, 1.5 times, 2 times, 2.5 times, 3 times, 5 times or 10 times less than length $L_8$. An aspect ratio (length to width ratio) may vary randomly from one light extraction feature 8 to another. In one embodiment, elongated light extraction features 8 may be arranged in groups having generally the same orientation of a longitudinal axis. In one embodiment, the orientations of elongated light extraction features 8 may be random within a predefined angular range. The angular range may be 10 degrees, 30 degrees, 45 degrees, 60 degrees, 90 degrees, 180 degrees, and 360 degrees (e.g., with a completely random orientation).

A surface 36 of light extraction feature 8 that is exposed to air has a microstructured surface including random microstructures 34. Microstructures 34 produce a non-negligible surface roughness that is much greater than the roughness of surface 11 and that contributes to refractive or diffractive light scattering or dispersion produced by light extraction feature 8. The surface roughness may be characterized according to an American National Standard ASME B46.1-2009.

According to different embodiments, an RMS surface roughness parameter $R_q$ of surface 36 is greater than 30 nanometers, greater than 40 nanometers, greater than 60 nanometers, approximately equal to or greater than 100 nanometers, and approximately equal to or greater than 200 nanometers. At the same time, it may be preferred that the RMS surface roughness parameter $R_q$ of surface 36 measured along the same sampling length is one of the following: less than 1 micrometer, less than 0.5 micrometers, and less than or equal to 0.3 micrometers.

Figure 10:
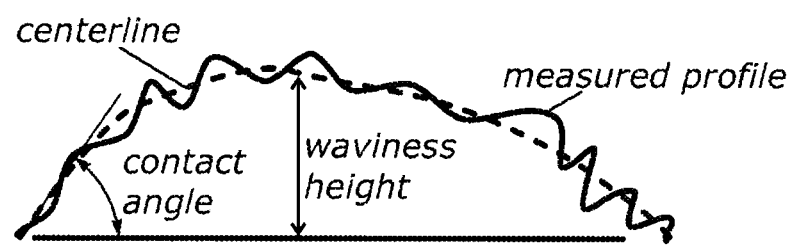
FIG. 10 is a schematic surface profile illustrating exemplary measurements of a surface waviness and a contact angle, according to at least one embodiment of the present invention.

According to different embodiments, the parameter $R_q$ can be measured along one of the following sampling lengths: 10 micrometers to 20 micrometers, 20 micrometers and 40 micrometers, 20 micrometers to 100 micrometers, and 5 micrometers to 200 micrometers. When measuring the roughness of surface 36, the profile waviness that characterizes the shape of surface 36 should normally be subtracted before evaluating $R_q$. The definition of surface waviness is illustrated in FIG. 10 which shows a surface profile (as it may be measured by a surface profilometer, for example) and a centerline characterizing the overall shape of the object and which should be subtracted from the measured profile to determine parameter $R_q$.

The waviness may be customarily subtracted by high-pass filtering with a cut-off wavelength $\lambda_f$ (see e.g., ASME B46.1-2009). The cut-off wavelength $\lambda_f$ should be at least 5 to 10 times less than the sampling length. On the other hand, the cut-off wavelength $\lambda_f$ should be at least several micrometers, for example, 2 to 5 micrometers or 5 to 20 micrometers. The upper limits for cut-off wavelength $\lambda_f$ may also be defined by the size of light extraction feature 8. For example, cut-off wavelength $\lambda_f$ may be set to at most the length $L_8$ or one-half of the length $L_8$.

According to one embodiment, the parameter $R_q$ of surface 11 should be less than 25 nanometers, more preferably less than 20 nanometers, even more preferably less than 15 nanometers and still even more preferably less than or equal to 10 nanometers. The measurements of parameter $R_q$ of surface 11 may be performed in a vicinity of light extraction feature 8. The measurements should preferably utilize the same or similar sampling length as that used for measuring $R_q$ of surface 36. According to one embodiment, the parameter $R_q$ of surface 11 should be performed along a direction that is perpendicular to a light input edge (e.g., perpendicular to edge surface 13).

According to one embodiment, the size of light extraction feature 8 may range from 10 micrometers to 200 micrometers in the longest dimension. A preferred size range is 30-150 micrometers in the longest dimension. An even more preferred size range may be 30-80 micrometers in the longest dimension.

According to different embodiments, the volume of at least some of printed microdots forming individual light extraction feature 8 may range from 1,000 cubic micrometers to 10,000 cubic micrometers, from 1,000 cubic micrometers to 100,000 cubic micrometers, from 10,000 cubic micrometers to 100,000 cubic micrometers, from 20,000 cubic micrometers to 80,000 cubic micrometers, and from 30,000 cubic micrometers to 60,000 cubic micrometers. According to one embodiment, the volume of at least some of individual printed microdots is about 4,000 cubic micrometers. According to one embodiment, the volume of each light extraction feature 8 formed by one or more printed microdots is between 2,000 cubic micrometers and 6,000 cubic micrometers.

The size of individual random surface microstructures 34 may range from several nanometers to several micrometers. According to a preferred embodiment, microstructures 34 have sizes less than 0.5 microns. According to one embodiment, at least some microstructures 34 may have top portions that can be approximated by spherical shapes having a radius of curvature between 50 nanometers to 200 nanometers.

According to one embodiment, each light extraction feature 8 includes a generally opaque material (e.g., white pigment) but at such a low thickness that the light extraction feature 8 is semi-opaque, non-absorbing and transmits at least a portion of light impinging on it. The term "non-absorbing", in reference to opaque or semi-opaque layers of various materials used for making light extraction features 8 or 9, such as white pigment inks, for example, is directed to mean that the respective layer(s) do not perceptibly absorb light. For instance, an exemplary non-absorbing layer may be formed by an optically clear resin loaded with submicron $TiO_2$ particles at 10-20% concentration (by weight). The non-absorbing layer may have a relatively low thickness between about 1 micrometer and 10 micrometers. Due to the low thickness and the presence of submicron $TiO_2$ particles, the layer can be configured to partially reflect light and partially transmit light without perceptible absorption. Accordingly, the sum of a total reflected light energy $E_R$ and a total transmitted light energy $E_T$ can be equal (preferably within 1%-5% error) to a total light energy $E_0$ incident onto the non-absorbing layer ($E_0 = E_R + E_T$). According to different embodiments, the absorption within the semi-opaque material at a thickness equivalent to the average thickness of light extraction features 8 and/or 9 is less than 5%, more preferably less than 3%, even more preferably less than 2% and still even more preferably less than 1%.

As employed in the present specification and claims, the term "opacity" refers to the extent to which a surface, an object or a layer of a material impedes the transmission of light through it. For example, a layer or surface that completely prevents light passage is considered completely opaque and having a 100% opacity. In contrast, a layer or surface that transmits essentially all of the incident light is considered having a 0% opacity. Accordingly, a layer or surface that transmits one-half of the incident light is considered having a 50% opacity.

For a partially opaque (semi-opaque) surface or layer which is also reflective and non-absorbing, the opacity may be defined and measured as a ratio of the reflectance of the surface or layer against a light absorbing background surface to its reflectance against a highly reflective background surface, at least according to some embodiments. The light absorbing background surface should preferably have <5% reflectance and even more preferably <3% reflectance. The highly reflective backing surface should preferably have a hemispherical reflectance of at least 89%, more preferably at least 95% and even more preferably 98-99%. The highly reflective backing surface may be specularly reflecting, diffusely reflecting or reflect light both specularly and diffusely.

In an alternative, according to some embodiments, the opacity may be measured using standard techniques, such as those described in ASTM D1746-15 or ASTM D589-97 documents and using a suitable standardized opacity meter. When it is impossible to directly measure the opacity of individual semi-opaque light extraction features 8 or 9 (e.g., due to their small size), the measurements may be performed indirectly using a broad-area layer of the same semi-opaque material deposited to a transparent substrate with a uniform thickness corresponding to a weighted average thickness of the material in the individual light extraction features 8 and/or 9. For example, if a weighted average thickness of the semi-opaque light extraction features is 8 micrometers (as measured, for instance, by a 3D microscope or a profilometer), a transparent substrate may be coated with a uniform 8-micrometer-thick layer of the same material, and the opacity measurements of may be performed for that layer in order to characterize the opacity of the light extraction feature.

In a further alternative, the opacity may be expressed and measured in terms of light attenuation by the material of light extraction features 8 and/or 9. More specifically, the opacity may be defined by the following expression: 100% $(1-I_T/I_0)$, where $I_0$ is the intensity of light incident onto the semi-opaque layer of light extraction feature and $I_T$ is the intensity of light that is transmitted through the semi-opaque layer.

According to one embodiment, the opacity and/or reflectivity of the semi-opaque layers may be measured and/or compared in accordance with one or more other applicable standards, such as, for example, ISO 2814, ISO 6504, BS 3900-D4, BS 3900-D7, ASTM E97, ASTM E1347, ASTM D4214, ASTM D2805, and ASTM D589.

For the purpose of characterizing light extraction features 8 and/or 9, the opacity may provide a useful measure of the fraction of light impinging onto such light extraction features from the side of light guiding sheet 10 that can be emitted from the other side of the light extraction features (e.g., away from surface 11 when features 8 and/or 9 are formed in that surface).

According to a preferred embodiment, referring to FIG. 9, the prescribed opacity of light extraction feature 8 is provided by scattering visible light in all directions in a tree-dimensional space using relatively transparent particles 33 volumetrically distributed within the bulk of binder material 37. Preferred mechanisms for scattering light using such particles and without perceptible absorption include refraction, diffraction or a combination thereof.

According to one embodiment, light scattering particles 33 suspended in binder material 37 may be formed by spherically shaped nanoparticles of a relatively transparent material having a very high index of refraction (n≥2). Suitable exemplary materials particularly include but are not limited to inorganic white pigments such as rutile or Anatase titanium dioxide (n=2.5-2.8), antimony oxide (n=2.1-2.3), Zinc Oxide (n≈2), white lead (basic lead carbonate, n=1.9-2.1), and lithopone (n=1.8). Alternatively, other inorganic materials or polymers having moderately high refractive indices (about 1.6 or greater) may also be used, including particularly magnesium silicate, baryte, calcium carbonate, calcium carbonate, polystyrene, or polycarbonate.

The sizes of particles 33 may be selected to maximize light scattering in a particular range of wavelengths (e.g., visible wavelengths centered around 0.5 micrometers). Suitable sizes of particles 33 to maximize diffraction can be calculated, for example, using Mie theory of light scattering.

According to one embodiment, an average size of particles 33 is about 200 nanometers. According to one embodiment, an average size of particles 33 is about 250 nanometers. According to one embodiment, an average size of particles 33 is between 100 nanometers and 400 nanometers. According to one embodiment, the size of particles 33 is between 150 nanometers and 350 nanometers.

Two or more different sizes (or size distributions) of particles 33 can also be mixed within the material of the ink used to produce light extraction features 8. Such mixing may be directed to maximize light scattering at two or more different wavelength ranges. These different wavelength ranges may be non-overlapping (e.g., 400-450 nm and 570-590 nm) or overlapping (e.g., 400-550 nm and 450-600 nm).

The concentration of particles 33 in binder material 37 may vary in a broad range. According to preferred embodiment, the concentration of particles 33 (pigment loading) is between 5% and 35% by weight or volume in the respective ink material used to produce light extraction features 8. According to one embodiment, the concentration is between 30% and 50% by weight. According to one embodiment, the concentration is between 5% and 25% by weight. According to one embodiment, the concentration is between 10% and 20% by weight.

According to some embodiments, light extraction features 8 and/or 9 are substantially non-absorbing and have the opacity of at least 10%, at least 20%, at least 30%, at least 40% or at least 50%. According to some embodiments, the opacity of at least some individual light extraction features 8 and/or 9 is less than 90%, approximately equal to or less than 80%, approximately equal to or less than 70%, or approximately equal to or less than 50%. According to one embodiment, the opacity of individual light extraction features 8 is between 30% and 70%. According to one embodiment, the optical transmittance of non-absorbing, semi-opaque light extraction features 8 is one of the following: greater than 10%, greater than 20%, greater than 30%, greater than 40% and equal to or greater than 50%.

According to one embodiment, the opacity of the material forming light extraction features 8 (e.g., white or fluorescent UV-curable ink) is between 40% and 70% when measured at a layer thickness of 10 micrometers or less. According to alternative embodiments, the opacity is between 30% and 50% when measured at a layer thickness of 0.5 micrometers to 5 micrometers, 1 micrometer to 2 micrometers, or 1 micrometer to 6 micrometers.

A further useful measure of the opacity of light extraction features 8 and/or 9 and the ability of light guiding sheet 10 to emit light from both sides (e.g., from both opposing surfaces 11 and 12 is a luminance ratio between the respective opposing surfaces. For example, let's consider an embodiments of wide-area illumination system 900 in which light extraction features 8 are formed by printing microscopic opaque or semi-opaque white-ink dots on surface 11. In an illustrative, non-limiting example, when light guiding sheet 10 is patterned with light extraction features 8 and illuminated from one or two edges by LEDs 2, an average measured surface brightness of surface 11 may be about 4,500 cd/m$^2$ while an average measured surface luminance of surface 12 may be about 1,500 cd/m$^2$, thus giving a 3 to 1 ratio. In other words, light guiding sheet 10 will emit about 75% of light from surface 11 and about 25% from opposing surface 12. For the purpose of determining the opacity of light extraction features 8 and/or 9, the surface luminance should preferably be measured from a perpendicular direction with respect to surfaces 11 and/or 12.

According to one embodiment, the opacity and light scattering properties of light extraction features 8 are configured such each of surfaces 11 and 12 outputs 30% to 70% of the total light emitted by sheet 10 through surfaces 11 and 12. In other words, surface 11 may be configured to output no less than 30% of the total light energy emitted from sheet 10 as a result of light extraction by light extraction features 8, and, at the same time, surface 12 may also be configured to output no less than 30% of the total light energy emitted from sheet 10 as a result of such light extraction. According to different embodiments, the approximately proportions between light output from surfaces 11 and 12 (or between surfaces 12 and 11) may be 30%: 70%, 35%:65%, 40%: 60%, 45%: 55%, 50%: 50%, 55%: 45%, 60%: 40%, 65%: 35%, or 70%: 30%. According to one embodiment, 10 may also be flipped upside down.

According to some embodiments, the opacity of light extraction features 8 may be selected such that the ratios between the measured luminance of surfaces 11 and 12 are about 1:1 (about equal surface luminance of surfaces 11 and 12), 1.1:1, 1.2:1, 1.3:1, 1.5:1, 2:1, 3:1, 3.5:1, 4:1, 4.5:1, and 5:1. According to some embodiments, the opacity of light extraction features 8 may be selected such that the ratios between the measured total output from surface 11 and surface 12 are about 1:1 (about equal amounts of light are emitted from both surfaces), 1.1:1, 1.2:1, 1.3:1, 1.5:1, 2:1, 3:1, 3.5:1, 4:1, 4.5:1, and 5:1. Such configurations with two-sided light output may be advantageously selected, for example, for applications that will benefit from direct/indirect illumination. Furthermore, configurations of systems 900 with semi-opaque light extraction features 8 may be advantageously selected for applications that will benefit from the smallest size and/or thickness of the light extraction features and require that the light extraction pattern is virtually invisible to a naked eye at relatively close viewing distances.

It is noted that the use of semi-opaque light extraction features is not limited to the cases of two-sided illumination. FIG. 9 further illustrates the operation of system 900 when semi-opaque, substantially non-absorbing light extraction feature 8 is used together with a reflective sheet 41 (back sheet). Reflective sheet 41 (reflector) should preferably have a highly reflective surface with a specular or diffuse hemispherical reflectance of at least 85-95%.

In operation, a light ray 301 exemplifies light that is extracted-decoupled from light guiding sheet 10 and distributed/emitted from wide-area illumination system 900 using a multi-stage process. Ray 301 initially propagates in light guiding sheet 10 in a waveguide mode. Subsequently, ray 301 enters semi-opaque light extraction feature 8 and encounters one of light scattering particles 33 which splits the energy of ray 301 into two distinct portions propagating toward different directions. A first portion of ray 301 is forward scattered by particle 33, forming a ray segment 303. A second portion of ray 301 is forward scattered by the same particle 33, forming a ray segment 302.

Ray segment 302 is further forward-scattered by an adjacent particle 33 and is directed towards surface 12 (not shown) at an angle below the critical TIR angle characterizing surfaces 11 and 12, so it can be finally extracted from sheet 10 and emitted from surface 12. Ray segment 303 is further emitted from surface 36 and reflected back towards sheet 10 by reflective sheet 41. Ray segment 303 re-enters the body of light extraction feature 8 and is further propagated back into sheet 10, undergoing additional interactions with light scattering particles 33. Similarly, ray segment 303 enters onto sheet 10 at a below-TIR angle, allowing for decoupling ray segment 303 from light guide 800.

According to an aspect, ray segment 302 exemplifies light that is back-scattered towards surface 11 and that eventually re-enters back into light guiding sheet 10 and can be emitted from opposing surface 12 (not shown), contributing to the total emission from system 900. Ray segment 303 exemplifies light that is initially forward-scattered away from surface 11 and that contributes to the emission from surface 11. Accordingly, in the absence of reflective sheet 41, the total light emission from sheet 10 would be distributed between surfaces 11 and 12 according to a certain ratio. This ratio can be determined and controlled, at least in part, by the opacity of light extraction feature(s) 8. In the illustrated example, however, ray segment 303 is intercepted by highly reflective sheet 41 and reflected back towards light guiding sheet 10. Ray segment 303 further passes through the semi-opaque layer of light extraction feature 8 for the second time, undergoing some additional scattering, so that it can be ultimately emitted from opposite surface 12 of light guiding sheet 10.

It is noted that individual light rays being extracted by semi-opaque light extraction features 8 may undergo multiple back-scattering and forward-scattering reflections within the light-scattering layer, e.g., as schematically illustrated by various segments of ray 301 in FIG. 9. Additionally, the extracted light rays may further undergo multiple passages through the same light extraction feature 8 or even different light extraction features 8. The number of interactions of the extracted light ray with light-scattering particles 33 may depend on the size of such particles, their distribution density within the semi-opaque layer, height $H_8$, spacing between light extraction features 8, and other factors. The thickness, opacity, light transmittance and the size of particles 33 may be selected such that the light scattering is maximized (for example, by maximizing light diffraction by particles 33 and providing for at least double or multiple passage of light through the material of light extraction features 8) while light absorption within the body of light extraction features 8 is minimized.

According to one embodiment, the light scattering provided by semi-opaque, semi-transmissive light extraction features 8 with or without the aid of reflective sheet 41 is such that light emitted from light guiding sheet 10 has a Lambertian or quasi-Lambertian angular distribution. In other words, the luminous intensity observed from surface 12 of light guiding sheet 10 can be approximately proportional to the cosine of the observation angle (an angle between the observation direction and a surface normal). According to one embodiment, the angular emission distribution can be approximated by a Lambertian cosine law at least in the YZ plane. According to one embodiment, the angular emission distribution can be approximated by a Lambertian cosine law at least in the XZ plane. According to one embodiment, the angular emission distribution can be approximated by a Lambertian cosine law in both XZ and YZ planes.

According to some embodiments, light guide illumination system 900 of FIG. 9 may be used without reflective sheet 41 and can still be configured for providing a Lambertian or quasi-Lambertian angular distribution of light emission, e.g., from surface 11, surface 12 or both surfaces 11 and 12. According to some embodiments, light extraction features 8 may be configured to provide a "bat-wing" angular distribution of light emission from either one or both surfaces 11 and 12.

The average thickness of the semi-opaque layer of each micro-printed light extraction feature 8 may be selected to provide a prescribed ratio between forward-scattering and back-scattering. In order to maintain a minimum prescribed level of light transmittance for light extraction features 8, height $H_8$ (maximum thickness) or the average thickness of the respective semi-opaque layer may be limited to certain values. In some embodiments, height $H_8$ or the average thickness may be equal to or less than 15 micrometers, equal to or less than 10 micrometers, less than 8 micrometers, equal to or less than 6 micrometers, equal to or less than 5, equal to or less than 3 micrometers, equal to or less than 2, between 1 and 2 micrometers, between 1 and 1.5 micrometers, about 1 micrometer, or between 0.5 and 1 micrometers. At the same time, the characteristic size (e.g., dimension $L_8$ or diameter d) of features 8 may range from 30 micrometers to 150-200 micrometers and more preferably from 30 micrometers to 80 micrometers. According to different embodiments, a prevalent size or diameter of light extraction features 8 is about 50 micrometers, 60 micrometers, 70 micrometers, 80 micrometers, 90 micrometers, or 100 micrometers. According to one embodiment, the prevalent size or diameter of light extraction features 8 is between 50 micrometers and 80 micrometers. According to one embodiment, the maximum thickness of the semi-opaque layer of light extraction feature 8 may be greater or equal to 1 micrometer and less than or equal to 10 micrometers. According to one embodiment, the maximum thickness may have values from 1 micrometer to 8 micrometers, from 1 micrometer to 6, from 2 micrometer to 6, or from 2 micrometer to 4 micrometers.

According to at least some embodiments, the ratios between $L_8$ and $H_8$ may be as low as 3 or as high as 100 or so. According to some embodiments, the ratio between $L_8$ and $H_8$ may be between 5 and 100, between 10 and 200, between 10 and 100, between 20 and 100, between 40 and 100, and between 40 and 80.

According to one embodiment, highly reflective sheet 41 is configured to reflect primarily by a specular reflection (causing angles of reflection being equal to the angles of incidence). According to one embodiment, highly reflective sheet 41 is configured to reflect primarily in a diffuse regime and thus provide additional scattering to the extracted light compared to scattering/deflecting light using light extraction features 8 only.

The opacity of individual light extraction features 8 and the density of such light extraction features on surface 11 and/or 12 may be configured to control the opacity of light guiding sheet 10 in different areas. In an extreme exemplary case, the density of light extraction features 8 can be made very high, such that there is practically no spacing between individual light extraction features 8 (e.g., separation distances SED are about zero or less than zero) and that light guiding sheet 10 or its portions are substantially opaque. In a further example, by selecting an even higher packing density (with separation distances SED being significantly less than zero but greater than −d/2) the opacity of light guiding sheet 10 may be made similar to that of individual light extraction features 8.

According to one embodiment, light extraction features 8 may be formed by stretchable inks. In different implementations, the fully cured ink material should allow for its reversible stretching without cracking in the elastic or plastic mode by at least 10%, 30%, 50%, 10%, 150%, or 200% elongation.

Example 1

Figure 11:
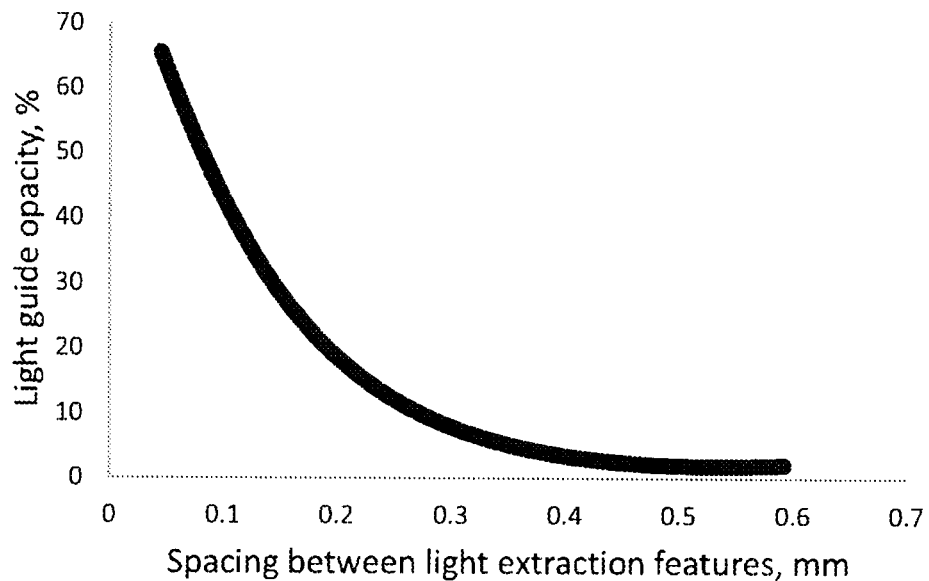
FIG. 11 is a schematic graph showing a measured dependency of the opacity of a light guiding sheet on spacing between light extraction features, according to at least one embodiment of the present invention.

FIG. 11 shows an exemplary measured dependence of the opacity of light guiding sheet 10 on spacing between light extraction features 8. In the illustrated example, light guiding sheet 10 was formed by an optically clear acrylic sheet having a 0.75-mm thickness. Light extraction features 8 were formed by depositing microdrops of UV-curable white ink on a surface of the acrylic sheet using a commercial flatbed UV printer with instant curing of the respective micro-droplets.

The individual printed light extraction features 8 had sizes around 120-130 micrometers along the longest dimensions and an average total thickness of about 6-8 micrometers. In each sample pattern, light extraction features 8 were arranged in a two-dimensional array having a fixed spacing (pitch) in the X and Y dimensions (fixed spacing distance SPD).

The patterns having microdrop spacing below 100 micrometers completely covered the surface with the ink (reaching a 100% fill factor) due to overlapping of adjacent microdrops, which corresponded to the case of near-zero or slightly negative separation distances SED. At a microdrop pitch of 84 micrometers, the pattern produced a continuous layer of white ink with a measured average thickness of 7-8 micrometers (substantially overlapping microdrops with separation distances SED being significantly less than zero). At an even lower microdrop pitch, the thickness of the resulting layer was measured at about 30 micrometers.

Referring further to FIG. 11, relatively sparsely populated, discrete light extraction features 8 (e.g., spaced by distances SPD of 0.3 mm to 0.6 mm) produced fairly low levels of opacity for light guiding sheet 10. On the other hand, densely populated light extraction features 8 (e.g., spaced by distances SPD of 0.1 mm and below) produced moderate to relatively high levels of opacity for the light guiding sheet.

At a pitch (or spacing distance SDD) of about 42 micrometers, the opacity of sheet 10 reached a maximum at about 66%. Accordingly, at this opacity level, light guiding sheet diffusely reflected about two thirds of the incident light and diffusely transmitted around one third of the incident light. The absorption within the layer of white ink was found to be less than 3-5% (less than or comparable to the measurement errors).

End of Example 1

The graph of FIG. 11 can be approximated by a polynomial function and interpolated or extrapolated to calculate areal pattern coverage to achieve a prescribed level of opacity. In view of such results, it is noted that, according to at least some embodiments, the opacity of semi-opaque light extraction features 8 may also be approximately determined by measuring the opacity of light guiding sheet 8, particularly in the areas of relatively high density of light extraction features 8 and extrapolating the results to the 100% coverage of the surface with the respective semi-opaque layer, at the appropriate layer thickness.

The term "surface coverage" may be defined as the ratio between a cumulative area of light extraction features 8 within a sampling region and the total area of the sampling region. The area of the sampling region should be at least 100 times greater than the average or typical area of individual light extraction features 8. According to one embodiment, light guiding sheet 10 includes at least one region having a surface coverage of at least one of the following: 10% or more, 20% or more, 30% or more, 40% or more, 50% or more, 60% or more, 70% or more, 80% or more, and 90% or more. According to some embodiments, spacing areas between light extraction features 8 cumulatively occupy less than 50% of the total light guide area within a sampling region, less than 30%, less than 20%, or less than 10%. According to one embodiment, light guiding sheet 10 includes at least one region having the surface coverage of at least one of the following: less than 10%, less than 7%, less than 5%, and less than 2%.

Light-scattering particles 33 may be randomly varied in size within a single light extraction feature 8. Furthermore, any individual light extraction feature 8 may include a number of randomly formed agglomerates 35 that represent localized regions of increased density of light-scattering particles compared to surrounding areas.

According to one embodiment, at least some of light scattering particles 33 include one or more fluorescent materials. Fluorescent materials may also be mixed with non-fluorescent (e.g., color filtering or light scattering) materials in various proportions, e.g., 10%: 90%, 50%:50%, or 90%:10%.

Light guiding sheet 10 may be configured such that a first light extraction pattern of light extraction features 8 formed in surface 11 and a second light extraction pattern of light extraction features 9 is formed in surface 12. The second pattern of light extraction features 9 may cover the same area of sheet 10 as the first pattern of light extraction features 8. The first and second patterns may superimpose on one another in terms of X and Y coordinates of the respective individual light extraction features 8 and 9. The second pattern may also be a rotated and/or translated copy of the first pattern. According to one embodiment, the first and second patterns may have different pitch or different surface distributions of the respective light extraction features 8 and 9, for example, for the purpose of reducing the chance of the so-called moiré effect when the light emitting surface of system 900 is observed by a viewer.

The shapes, sizes, distribution densities and orientations of light extraction features 8 and/or 9 may vary in a broad range. According to one embodiment, light extraction features 8 and/or 9 may have random shapes, sizes and/or orientations across respective surfaces 11 and/or 12. This may also be useful, for example, for reducing the conspicuity of the patterns and providing a perceptibly uniform light output from illumination system 900.

Figure 12:
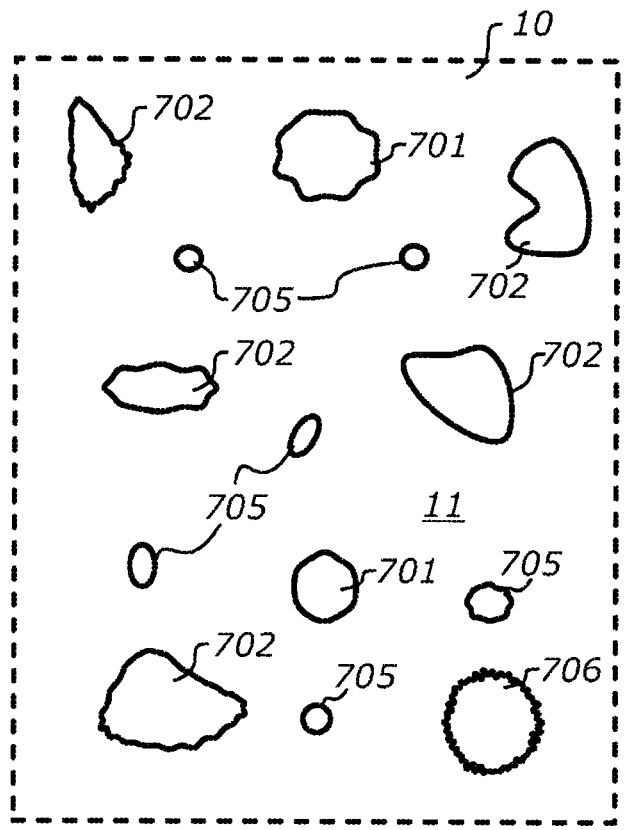
FIG. 12 is a schematic view of a surface portion of a light guiding sheet having a plurality of light extraction features having various shapes and sizes, according to at least one embodiment of the present invention.

FIG. 12 schematically shows various exemplary shapes, densities and orientations of various light extraction features that can be formed in or on surfaces 11 and 12 of light guiding sheet 10. Light extraction features 701, 702, 705, and 706 exemplify various-shape microdots of white UV-curable ink printed on surface 11. According to an aspect, such microdots form discrete surface relief features on surface 11. At least some of these discrete surface relief features may be separated from each other by smooth portions of surface 11 that are generally free from other surface structures (e.g., other light extraction features).

More particularly, light extraction features 701 exemplify regular or quasi-regular shapes of the microdots which may be have some small-scale shape irregularities. Light extraction features 702 exemplify printed microdots having irregular or highly irregular shapes. Light extraction feature 706 exemplifies regular or quasi-regular shapes of microdots that have a somewhat fussy outline. Light extraction features 705 exemplify printed microdots that have much smaller sizes compared to larger light extraction features 701, 702, and 706. The smaller-sized light extraction features 705 are provided in spaces between the large-sized light extraction features and can have a generally different distribution pattern than the larger light extraction features.

According to one embodiment, light extraction features 701, 702, and 706 may have volumes between 30,000 and 100,000 cubic micrometers while each of light extraction features 705 can have a volume below 10,000 cubic micrometers, below 5,000 cubic micrometers, between 1,000 cubic micrometers and 5,000 cubic micrometers, or less than 1,000 cubic micrometers.

Referring to FIG. 10, a fully cured micro-drop of UV-curable ink may be characterized by a contact angle which is defined, by an analogy from the wettability characterization of liquid drops on a solid substrate, as the angle between a curved surface of the micro-drop and the substrate surface (e.g., surface 11) where the respective surfaces meet. When the micro-drop has a rough, microstructured surface, the surface roughness should subtracted from the surface profile before measuring the contact angle. For example, a suitable waviness profile (see FIG. 10 and the above discussion in reference to FIG. 10) may be used as a representation of the shape of the micro-drop and the contact angle may be measured using such waviness profile.

According to one embodiment, at least some of light extraction features 8 and/or 9 are formed by UV-cured micro-drops having a contact angle of about 10 degrees. According to one embodiment, the contact angle is about 5 degrees. According to one embodiment, the contact angle is about 15 degrees. According to one embodiment, the contact angle is about 20 degrees. According to one embodiment, the contact angle is between 2 degrees and 5 degrees. According to one embodiment, the contact angle is greater or equal to 1 degree and less than or equal to 2 degrees. According to one embodiment, the contact angle is less than 1 degree. According to one embodiment, the contact angle is greater than 0.1 degree and less than 1 degree. According to one embodiment, the contact angle is between 5 degrees and 25 degrees. According to one embodiment, the contact angle is between 5 degrees and 20 degrees. According to one embodiment, the contact angle is between 10 degrees and 20 degrees. According to one embodiment, the contact angle is less than 5 degrees. According to one embodiment, the contact angle is greater than 25 degrees.

It is noted that the contact angle of liquid (uncured) micro-drops, may be about the same but may also be generally different from that of the fully-cured, solidified micro-drops. Furthermore, at least some embodiments may include printed light extraction features that are formed by solvent-based micro-drops in which case the contact angles of the liquid and fully-cured micro-drops may differ significantly due to the evaporation of the solvent during the curing process. According to one embodiment, light extraction features 8 are formed by microdrops of either radiation-curable or solvent-based materials which are deposited to the respective surfaces using known methods other than printing. For example, such materials may be deposited to surface 11 in the form of liquid microdrops using tightly controlled pressure spraying, ultrasonic spraying, or a combination thereof.

According to one embodiment, a method of making wide-area illumination system 900 may include a step of generating a two-dimensional pattern of discrete locations (e.g., X, Y coordinates) of light extraction features 8 where spacing distances between the discrete locations gradually increase or decrease with a distance from an edge of the pattern. The two-dimensional pattern may be generated, for example, using computer-based modeling, such as raytracing. The optical modeling may be constrained to provide a substantially uniform expected light output from light guide 800.

The method of making wide-area illumination system 900 may further include a step of converting the pattern of discrete locations to a computer readable raster bitmap having a two-dimensional array of pixels. Suitable examples of computer readable raster bitmaps that can be used to store coordinates of light extraction features 8 include, but are not limited to bitmap image file format (e.g., the BMP file format), device independent bitmap (e.g., DIB), tagged image file format (TIFF), portable document format (PDF), JPEG file format, portable network graphics (PNG) file format, graphics interchange format (GIF), and the like. According to one embodiment, it may be preferred that the raster bitmap is stored in a bitonal (e.g., black-and-white) form. For example, in a black-and-white bitmap, pixels corresponding to the locations light extraction features 8 may be white and pixels corresponding to spacing areas can be black, or vice versa.

The method of making wide-area illumination system 900 may further include steps of providing a UV printing machine (a UV printer), providing a light guide substrate (e.g., highly transparent acrylic sheet), loading UV-curable inks of a preselected color (e.g. white UV-curable inks) into the UV printing machine, loading the bitmap containing information on locations of light extraction features 8 into a software that is used to control the UV printing machine, printing the bitmap on the light guide substrate using the UV printing machine, and curing the droplets deposited onto the surface of the light guide substrate (e.g., using UV light from UV LED sources). The curing process can be performed simultaneously with the printing process or as a separate post-printing step.

The method of making wide-area illumination system 900 may further include various software and/or printer configuration steps, such as, for example, specifying the print resolution, target print area dimensions, and target size of the printed dots/microdots. According to one embodiment, printing can be performed at a resolution of 600 dots per inch (DPI). According to one embodiment, printing can be performed at a resolution of 1200 DPI, 1800 DPI, 2400 DPI or a higher DPI. According to one embodiment, printing can be performed at a resolution of 300 DPI or lower. The DPI resolution of the bitmap associated with the print may be selected to match that of the printing resolution. The size of printed dots may be specified directly, e.g., via appropriate software settings, or indirectly, e.g., by selecting appropriate printing regimes that result in a prescribed size of the individual microdots.

The formation of individual microdrops within the printer may ordinarily be performed using a drop-on-demand head that electrically actuates a piezoelectric crystal to produce ink drops of a prescribed size in response to voltage pulses. According to one embodiment, it can be preferred that each actuation of the piezoelectric crystal results in depositing a single drop of ink to each prescribed location of the light extraction features 8 (e.g., the locations corresponding to a "white" pixels on a "black" background in the raster bitmap).

According to one embodiment, the method of making wide-area illumination system 900 includes a continuous or at least intermittent recirculation of the ink during the printing process. Including this step or process can be especially important for white ink compositions that include heavy particles suspended in a much lighter liquid material (e.g., light-scattering nanoparticles of $TiO_2$ suspended in a clear binder material). Without the recirculation, the heavy particles may cause various issues such as, for example, ink sedimentation in the fluid paths, clogging the jetting nozzles, and creating non-uniformities of volumetric particle loading in the ink. This, in turn, may impact ink discharge and severely affect or even prevent the formation of single-droplet microdots (individual light extraction features 8) of the prescribed size and volume. The continuous recirculation can be performed continuously or intermittently by agitating the dispersion or suspension of the heavy particles within a closed-path independent fluid circuit using a recirculation pump. The closed-path fluid recirculation circuit can be located anywhere along the ink supply line, e. g, between a reservoir containing the ink and the printing head. According to one embodiment, the closed-path fluid recirculation circuit may also be built into the printhead.

According to one embodiment of the method of making wide-area illumination system 900, depositing of different microdots within a relative small area (e.g., within a band hawing a width from several millimeters to several centimeters) may be performed using two or more consecutive printing passes of the print head over the same area. According to one embodiment, the method of making wide-area illumination system 900 includes setting a prescribed number of individual drops to be deposited to the same location. This regime can be advantageously selected for building the prescribed thickness of light extraction features using a finite pre-defined number of relatively small microdots.

According to one embodiment, the method of making wide-area illumination system 900 may further include bending the light guide substrate to a curved shape and making it operable for distributing light while being in a bent or curved state. According to one embodiment, the light guiding substrate may be sandwiched between a flexible back-sheet reflector and a flexible, film-thickness transmissive diffuser sheet (e.g., for a single-sided diffuse emission), both of which can be bent and flexed together with the light guiding substrate. The back-sheet reflector may specular or diffuse and may conventionally have a film thickness for enhanced flexibility. According to one embodiment, the back-sheet reflector may be replaced with another flexible, film-thickness transmissive diffuser sheet (e.g., for a two-sided diffuse emission).

Figure 13:
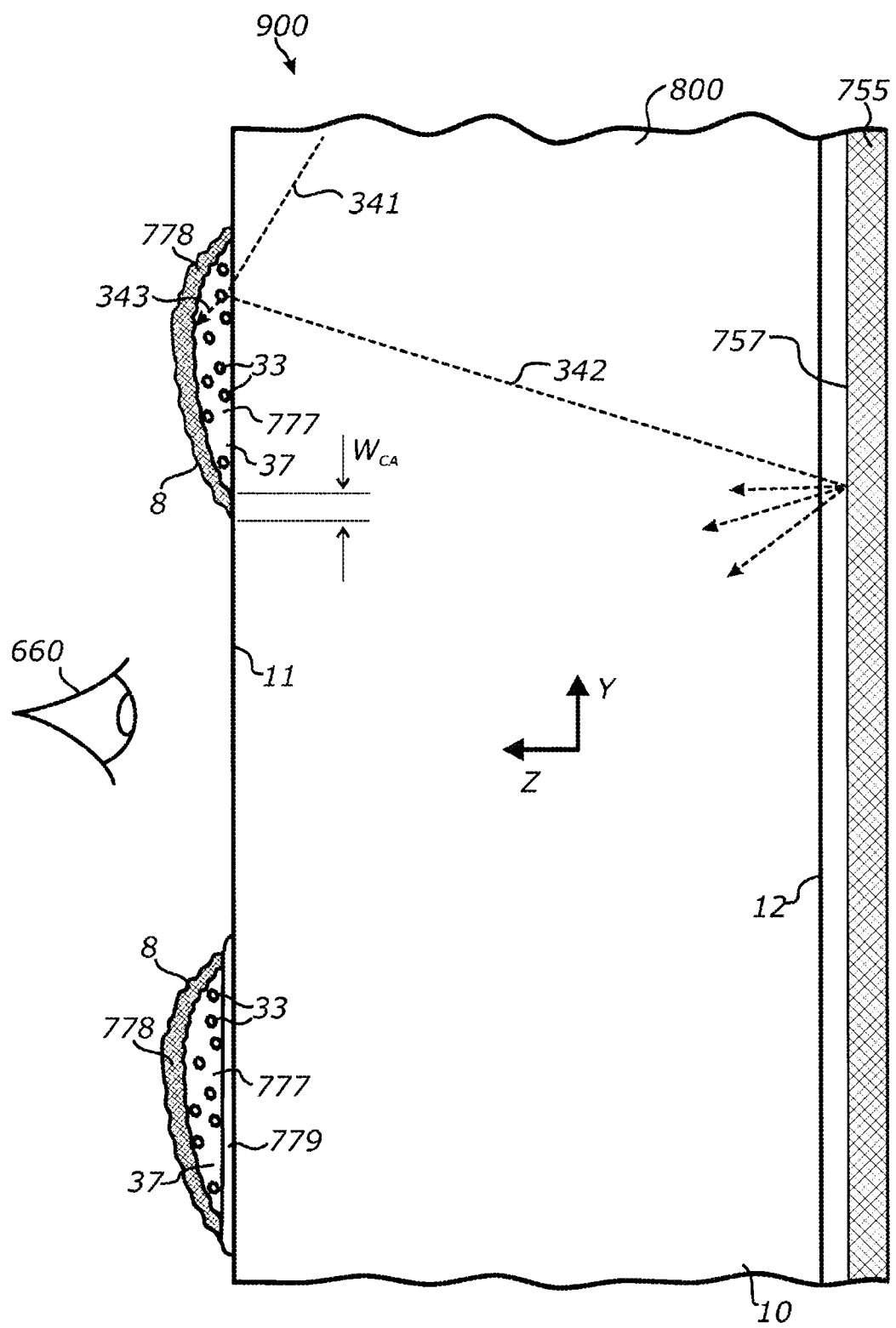
FIG. 13 is a schematic section view and raytracing of a portion of a wide-area light guide illumination system, showing light extraction features including at least two layers of different materials, according to at least one embodiment of the present invention.

FIG. 13 schematically illustrates an embodiment of wide-area illumination system 900 in a front light configuration with substantially single-sided emission. Referring to FIG. 13, there is provided an image print 755 having a full-color viewable surface 757. Light extraction features 8 are configured for illuminating surface 757 in a reflective mode of operation. Surface 11 is facing away from image print 755 and configured as a front viewing surface for image print 755. Surface 12 is facing towards image print 755 and configured for illuminating the image print.

It is noted the front light implementation of illumination system 900 is not limited to illuminating an image print and may be used for illuminating space in front of surface 12 or illuminating any types of objects or surfaces. In different embodiments, image print 755 may be replaced with a non-textured surface, graphics, indicia, logo, sign, letters, background surface (white, monochrome or colored), fabric, conventional image, stereoscopic image, photograph, LCD display, logo or pattern. According to one embodiment, a three-dimensional object or surface may be used in place of image print 755. According to one embodiment, a layer of fluorescent material may be used in place of or in conjunction with image print 755.

Each light extraction feature 8 of FIG. 13 is formed by an inner reflective layer 777 and an opaque outer layer 778. The inner layer 777 is formed by a semi-opaque, highly reflective material which includes transparent binder material 37 and high-refractive-index light scattering particles 33 distributed throughout the volume of binder material 37. Outer layer 778 is formed by a highly opaque material having a sufficient thickness to block at least a substantial portion of light that may be escaping from inner layer 777. According to one embodiment, the highly opaque material may include a light absorbing material. The opacity of outer layer 778 is preferably greater than 75%, more preferably greater than 80%, even more preferably greater than 85%, even more preferably greater than 90%, even more preferably greater than 95%, and still even more preferably greater than 97%. According to one embodiment, the opacity of layer 778 is substantially 100%. Suitable materials for light absorbing outer layer 778 include, for example, black inks including a carbon black pigment.

The inner light-reflecting layer 777 is facing towards image print 755 and the outer absorptive layer 778 is facing towards a viewer 660. It may be appreciated that, by utilizing the inner layer which is highly reflective, light scattering and semi-opaque (also preferably being bright-white in color) and the outer layer which is light-absorbing and highly opaque, illumination system 900 may be configured to suppress or even completely eliminate glare associated with a light emission from light extraction features 8 towards viewer 660. Accordingly, this configuration may be advantageously used as a front light for illuminating image print 755 with a high contrast and without unwanted glare.

For example, it can be shown that, if the opacity of the inner layer 777 is 70% and the opacity of the outer layer 778 is 90%, the combined opacity can be about 97% (resulting in only 3% of light being emitted towards viewer 660). According to different embodiments, the total (combined) opacity of layered light extraction features 8 is one of the following: 90%, 92%, 94%, 96%, 98%, and 99%.

Opaque layer 778 of light absorbing material is conformably coating the surface of the semi-opaque inner layer 777 such that minimum or virtually no light is emitted from the respective light extraction feature 8 directly towards viewer 660, even when illumination system 900 is fully lit by LEDs 2 coupled the respective edges of light guiding sheet 10. According to one embodiment, light extraction features 8 are configured to be essentially invisible to viewer 660 when illumination system 900 is in the "on" (illuminated) state. This can be achieved, for example, by making the size of individual features 8 sufficiently small and by making the opacity of respective outer layers sufficiently high. According to one embodiment, light extraction features 8 are also made essentially invisible to a viewer 660 when illumination system 900 is in the "off" state (i.e., when not illuminated by LEDs 2). According to one embodiment, light extraction feature 9 are also essentially invisible to a viewer 660 when illumination system 900 is either in the "off" or "on" state. According to one embodiment, light extraction features 8 are made essentially invisible to viewer 660 at a normal viewing distance when illumination system 900 is a non-illuminated state but visible at the same distance when system 900 is in an illuminated state.

It is preferred that opaque layer 778 is formed on top of the three-dimensional structure of semi-opaque inner layer 777 as a conformable coating. The term "conformable" with respect to a coating refers to a layer that generally conforms in shape to the underlying three-dimensional surface, layer and/or structure, such as a curved outer surface of the inner layer 777 of light extraction feature 8 of FIG. 13, for example.

Outer opaque layer 778 preferably has the dimensions and shape approximating those of the inner semi-opaque layer 777 so as to completely cover inner layer 777. According to different embodiments, outer layer 778 covers at least 80%, at least 90%, or at least 95% of the surface of inner layer 777. According to one embodiment, outer layer 778 covers 100% of the surface of inner layer 777.

According to one embodiment, outer opaque layer 778 has slightly larger dimensions or slightly larger area (e.g., by 5-10%) than those of inner layer 777, for example, to ensure that no perceptible amount of stray light can escape from light extraction feature 8 towards the viewer. According to one embodiment, at least outermost portions of outer layer 778 of light absorbing material are disposed in contact with surface 11 such that outer layer 778 completely encapsulates inner layer 777. On the other hand, the size of layer 778 should be limited to reduce unwanted extraction and absorption of light propagating in light guide 800. According to different embodiments, it is preferred that a width $W_{CA}$ of optical contact area of outer layer 778 with surface 11 on either side of inner layer 777 is less than 30%, less than 20% or less than 10% of the diameter of the surface structure formed by inner layer 777.

The operation of wide-area illumination system 900 in a glare-suppressing front-light configuration is further illustrated by the example of a path of a light ray 341. Ray 341 propagating in light guiding sheet 10 in a waveguide mode enters binder material 37 where it optically interacts with one or more light scattering particles 33. A light ray segment 343 exemplifies a portion of light ray 341 that is forward-scattered upon such interaction. A light ray segment 342 exemplifies a portion of light ray 341 that is back-scattered (diffusely reflected towards sheet 10).

Ray segment 343 propagates further towards outer layer 778 where it can be substantially absorbed (according to embodiments in which layer 778 is configured for absorbing light). In contrast, ray segment 342 propagates back to light guiding sheet 10 where it overcomes TIR at surface 12 and illuminates surface 757 of image print 755. Surface 757 further reflects and scatters light exemplified by ray segment 342 and directs the reflected light towards viewer 660. Accordingly, viewer 660 can see image print 755 being illuminated with high contrast and without glare that could be otherwise caused by stray light emanated from light extraction feature 8 in the absence of opaque layer 778.

To prevent the visibility of individual light extraction features 8 at relatively short viewing distances (50 cm or less), the light extraction features should preferably be smaller than 150-200 micrometers, more preferably smaller than 100-150 micrometers, even more preferably smaller than 100 micrometers, and still even more preferably smaller than 80 micrometers. In some instances, however, e.g., when the viewing distances are one meter, several meters or more, the size of light extraction features 8 may be selected to be 300 micrometers or more, 0.5 millimeter or more, 1 millimeter or more, and up to several millimeters or more.

The opacity of the material forming outer layer 778 should preferably be significantly greater than the opacity of the material forming the inner layer of light extraction features 8. According to one embodiment, layer 778 in a light absorbing configuration may include a color pigment. It may also include highly reflective (e.g., metallic) particles in concentrations sufficient to provide enhanced opacity for the layer. According to one embodiment, opaque outer layer 778 may have reflective properties and provide enhanced opacity due to reflection rather than absorption. According to one embodiment, opaque outer layer 778 maybe replaced with a highly reflective layer that likewise provides enhanced opacity (e.g., a layer of metallic ink or foil). In this case, light rays striking the respective opaque layer (e.g., ray segment 343 of FIG. 13) may be recycled by reflecting such rays back towards light guiding sheet 10 and image print 755. This configuration may be advantageously selected to enhance system efficiency and the apparent brightness of illuminated image print 755 compared to the case of employing a light-absorbing configuration of outer layer 778.

Light extraction features 8 and/or 9 may include other layers having different functions. According to one embodiment, a layer of highly transparent material 779 may be provided between particle-loaded binder material 37 and surface 11, as further illustrated in FIG. 13. Transparent layer 779 may be provided, for example, for enhancing light extraction from light guiding sheet 10 or to promote adhesion of inner layer 777 to surface 11. Transparent layer 779 should preferably have a refractive index that is about the same or greater than that of light guiding sheet 10. Transparent layer 779 may also include a material that has enhanced adhesion to surface 11 compared to the material of layer 777. According to one embodiment, the adhesion of the material of transparent layer 779 to surface 11 is greater than the adhesion of the material of binder material 37 to surface 11.

According to one embodiment of a method of making wide-area illumination system 900 in a front light configuration, layered light extraction features 8 may be formed by a sequential deposition or reflective and opaque materials to the same discrete X and Y locations of surface 11. For example, light extraction features 8 may be formed by initially printing a suitable pattern of microdots of a UV-curable white ink on surface 11 in a first pass followed by printing the same pattern of microdots of a UV-curable black ink on top of the white microdots in a second pass. According to one embodiment, such overprinting may be performed in succession without repositioning the substrate (light guiding sheet 10) between the first and second passes. This can be done, for example, using a commercial inkjet printer that is capable of printing with different types/colors of ink simultaneously. Similarly, triple-layer light-extraction features 8 (bottom of FIG. 13) may be printed sequentially in three passes of a print head, without substrate repositioning between the printing passes.

Figure 14:
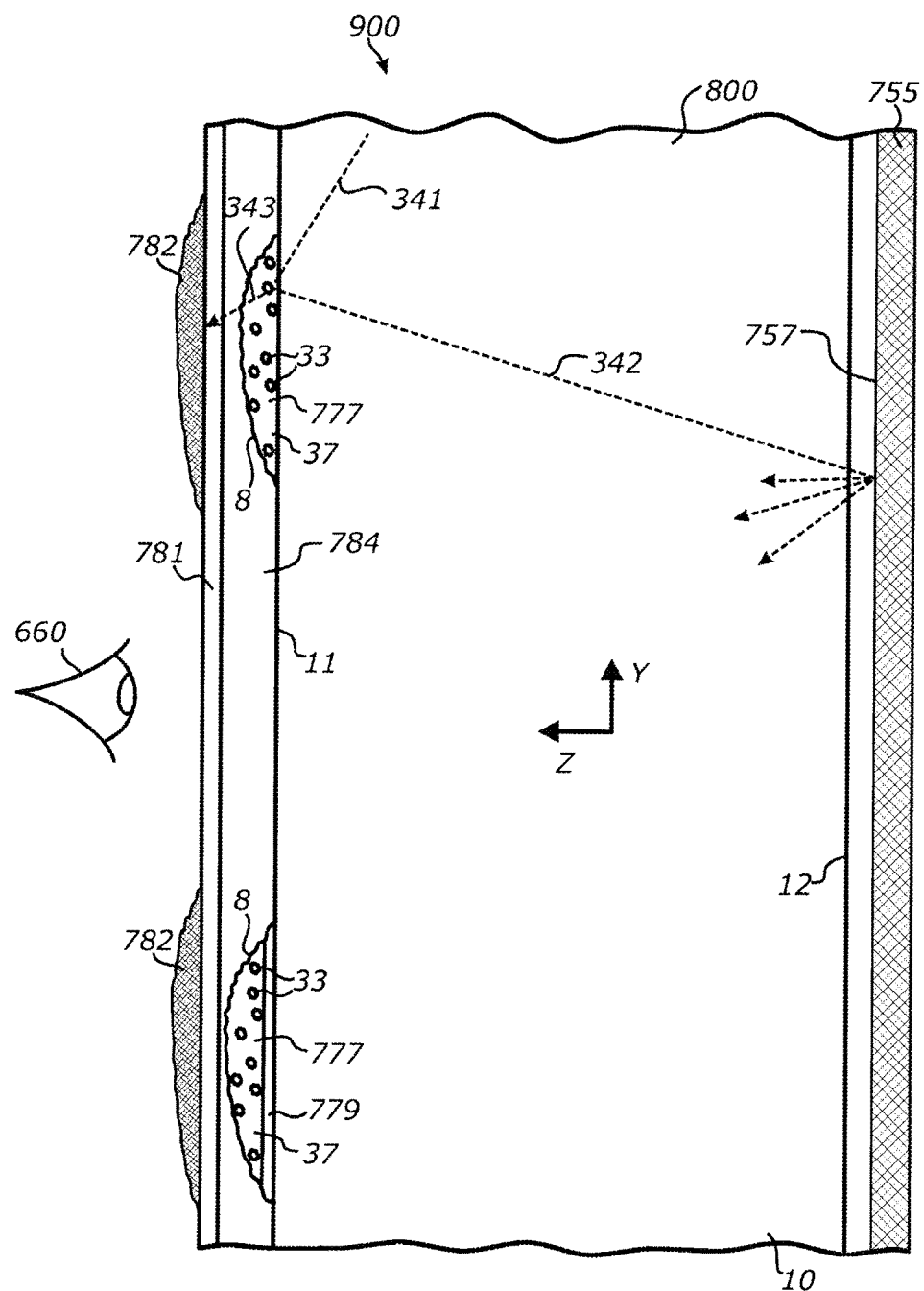
FIG. 14 is a schematic section view and raytracing of a portion of a front light including light blocking areas provided on a transparent substrate, according to at least one embodiment of the present invention.

FIG. 14 schematically depicts an embodiment of wide-area illumination system 900 in a front-light configuration which is similar to that of FIG. 13 except that light absorbing outer layers 778 conformably coating an inner layer of light extraction features 8 are replaced with detached light blocking features 782 disposed in registration with reflective layers 777. Light blocking features 782 are formed on a thin transparent substrate sheet 781 covering surface 11.

Light blocking features 782 are distributed over substrate sheet 781 according to the same two dimensional pattern as light extraction features 8. Furthermore, the patterns of light blocking features 782 and light extraction features 8 are precisely aligned relatively to each other so that each light blocking feature 782 provides a discrete opaque cover for the respective light extraction feature 8.

Substrate sheet 781 may be advantageously separated from light guiding sheet 10 by a thin spacing layer 784 to accommodate the thickness of light extraction features 8 and to provide an air gap sufficient to maintain TIR in sheet 10. Substrate sheet 781 may conventionally have a film thickness which can be much less than the thickness of light guiding sheet 10, e.g., by at least 2 times, 3 times, 5 times, 10 times or more.

Each light blocking feature 782 is formed by an opaque material which can be light absorptive or reflective. According to one embodiment, light blocking features 782 may be deposited to a surface of substrate sheet 781 that is facing light guiding sheet 10. According to one embodiment, light blocking features 782 are deposited to a surface of substrate sheet 781 that is facing away from light guiding sheet 10. Each light blocking feature 782 should be disposed in registration with the respective light extraction feature 8 and should preferably cover the entire area of light extraction feature 8 from the viewer.

According to one embodiment, the size of each light blocking feature 782 is at least the same or larger than the size of the respective light extraction feature 8. According to different embodiments, the size of light blocking features 782 may be greater than the size of the respective light extraction features 8 by at least 10%, 20%, 30%, 50%, or 100%. According to different embodiments, the area of light blocking features 782 may be greater than the area of the respective light extraction features 8 by at least 10%, 20%, 30%, 50%, 2 times, 3 times and 4 times.

According to one embodiment of a method of making wide-area illumination system 900 in a front light configuration, the method includes a step of depositing a predetermined pattern of microdots of white or fluorescent UV-curable ink (light extraction features 8) to a surface of a light guiding substrate (e.g., surface 11 of light guiding sheet 10), a step of covering the surface of the light guiding substrate with a thin transparent substrate (substrate sheet 781) and a step of depositing the same pattern of microdots of a highly opaque (preferably black or reflective) ink to a surface of the thin transparent substrate (e.g., to form light blocking features 782).

In operation, the embodiment of wide-area illumination system 900 of FIG. 14 is similar to that of FIG. 13 except that forward-scattered light (as exemplified by ray segment 343) can escape from light extraction features 8 and can propagate a relatively short distance away from surface 11 and towards viewer 660 before it is blocked from further propagation towards viewer 660 by light blocking features 782. Depending on the type of the opaque material used for making light blocking features 782 (e.g., absorbing or reflective), ray segment 343 may be absorbed or reflected and recycled, similarly to some embodiments described above in reference to FIG. 13.

According to an aspect, transparent substrate sheet 781 and a pattern of light blocking features 782 form an opaque mask or overlay that selectively blocks light emitted from areas of light guiding sheet 10 corresponding to light extraction features 8. At the same time, the transparent spacing areas between light blocking features 782 allow for a general unimpeded transverse light passage from light guide 800 to viewer 660 and thus allow for a generally unimpeded viewing of image print 755. It may be appreciated that, with a proper alignment of the mask or overlay and with the proper sizing of light blocking features 782, the glare associated with individual semi-opaque light extraction features 8 may be suppressed or even eliminated such that the apparent contrast for illuminated image print 755 may be significantly enhanced compared to the case where no such mask or overlay is used.

FIG. 15 schematically shows an embodiment of wide-area light guide illumination system 900 that has three planar light guides stacked on one another along the Z axis. Light guiding sheet 10 represents a first planar light guide, a light guiding sheet 20 represents a second planar light guide, and a light guiding sheet 30 represents a third planar light guide.

According to one embodiment, sheets 20 and 30 may be made from the same material as sheet 10. Sheets 20 and 30 may also have similar or identical dimensions and structure as sheet 10. According to one embodiment, each of the sheets 10, 20 and 30 may differ from the other two sheets in one or more of the following: material, structure, composition, thickness, length and/or width dimensions, color, surface texture, and light extraction patterns.

Sheets 10, 20 and 30 are disposed in a close proximity to each other but are also separated from each other by a small air gap of the order of several micrometers. The air gap may be provided, for example, to accommodate the height of light extraction features and also to prevent optical contact between the surfaces of the sheets.

Sheet 10 has light extraction features 8 formed in surface 11 and light extraction features 9 formed in surface 12. Sheet 20 has light extraction features 91 formed in a broad-area surface 21 and light extraction features 92 formed in an opposing broad-area surface 22. Sheet 30 has light extraction features 93 formed in a broad-area surface 31 and light extraction features 94 formed in an opposing broad-area surface 32.

According to one embodiment, all of light extraction features 8, 9, 91, 92, 93 and 94 are formed by microdots of a UV-curable ink, such as white-color ink, or fluorescent ink. The light guiding sheets are patterned such that, when all three sheets are pressed against each other, the extraction features formed in one sheet can touch the respective surface of an adjacent sheet. For example, light extraction features 9 can be disposed in contact with surface 21 and light extraction features 91 can be disposed in contact with surface 12. In this case, the air gap between sheets 10 and 20 may be primarily defined by the height (or thickness) of light extraction features 9, 91, 92 and/or 93. As shown in FIG. 15, at least some light extraction features 9 may be disposed in spaces between light extraction features 91 and at least some light extraction features 92 may be disposed in spaces between light extraction features 93.

Three different arrays of LEDs are provided to independently illuminate light guiding sheets 10, 20 and 30. Sheet 10 is illuminated by an array of LEDs 2 optically coupled to light input edge surface 13, sheet 20 is illuminated by an array of LEDs 2' optically coupled to a light input edge surface 96, and sheet 30 is illuminated by an array of LEDs 2" optically coupled to a light input edge surface 97.

According to one embodiment, LEDs 2, 2' and 2" may be configured to emit light in different colors (e.g., LEDs 2 can be red, LEDs 2' can be green, and LEDs 2" can be blue) such that the respective patterns of sheets 10, 20 and 30 can emit light in the respective colors. Light guide illumination system 900 of FIG. 15 can be configured independently emit light in three different colors simultaneously or in a succession. For example, according to one embodiment, light extraction features 8 and 9 may cumulatively form a first pattern configured to display a first image when illuminated, light extraction features 91 and 92 may cumulatively form a different second pattern configured to display a different second image when illuminated, and light extraction features 93 and 94 may cumulatively form a different third pattern configured to display a different third image when illuminated. LEDs 2, 2' and/or 2" may be independently controlled and selectively turned on and off to illuminate and display the first, second and/or third pattern or image, respectively. The relative intensity of light emitted from the respective patterns may be controlled by selectively controlling the brightness of the arrays of LEDs 2, 2' and/or 2" (e.g., by individual dimming).

According to one embodiment, light guide illumination system 900 of FIG. 15 may be configured to emit light from both outermost surfaces 11 and 32 and to be viewable from both sides. According to one embodiment, a reflective sheet or surface can be provided on either side (e.g., at surface 11) to limit light emission to one side only (e.g., surface 32). According to one embodiment, light extraction features 8, 9, 91, 92, 93 and/or 94 may have different optical properties (e.g., different colors). Accordingly, when illuminated by LEDs 2, 2' and/or 2", system 900 may be configured to display two, three or more different patterns in different colors or intensity.

According to one embodiment, a single LED source (e.g., LED 2) may be used to illuminate all of the three light guiding sheets 10, 20 and 30. In this case, the LED source should preferably have a light emitting aperture that is equal to or slightly less than the combined thickness of light guiding sheets 10, 20 and 30 but greater than a combined thickness of any two of the sheets. According to one embodiment, the LED source may be configured to emit light in a single narrow color range (e.g., in blue color) and the light extraction patterns of different light guiding sheets 10, 20 and 30 may be configured to extract light with different optical effects, e.g., convert light to different colors.

For example, referring to FIG. 15, light extraction features 8 and/or 9 may be configured to scatter a blue light without conversion, light extraction features 91 and/or 92 may include a first fluorescent material configured to convert the blue light into a first color, and light extraction features 93 and/or 94 may include a second fluorescent material configured to convert the blue light into a second color which is different than the first color. Accordingly, wide-area light guide illumination system of FIG. 15 may be configured to display different illuminated patters in different colors from the same wide area even when single-color LED light sources are used.

According to an alternative embodiment, the LED source illuminating all three light emitting sheets 10, 20 and 30 may be configured to emit a generally white light and the emission in different colors may be provided by incorporating various color pigments into the respective light extraction features of different sheets. For example, light extraction features 8 and/or 9 may include a blue or cyan pigment, light extraction features 91 and/or 92 may include a red or magenta pigment, and light extraction features 93 and/or 94 may include a green or yellow pigment.

According to one embodiment, sheets 10, 20 and 30 may be positioned slightly father apart and optical sheets 71 may be inserted in the spaces between the spaced-apart sheets (FIG. 16). According to one embodiment, each optical sheet 71 is a transmissive light diffusing sheet. The transmissive light diffusing sheets may be configured, for example, to mask individual light extraction features or blur the outlines or optical irregularities of the light extraction patterns. According to one embodiment, additional sheets 71 may also be provided on the sides of surfaces 11 and 32 and configured to diffuse light emitted from those surfaces. Alternatively, or in addition to that, a reflective surface may be provided on either side to recycle light emitted from the respective surface (11 or 32) and cause emitting substantially all of the light extracted from sheets 10, 20 and 30 through the opposite surface (32 or 11, respectively).

FIG. 17 schematically illustrates an embodiment of light guide 800 including several different types of light extraction features formed in both opposing broad-area surface 11 and 12. Light extraction features 402 exemplify round dome-shaped, fully cured microdots of a UV ink formed on surfaces 11 and 12 of light guiding sheet 10. Light extraction features 404 exemplify flat-top microdots of a UV ink. Each flat-top microdot may have a rounded trapezoidal shape having a constant or near-constant thickness for at least 50%, 60%, 70%, 80% or 90% of its area. Light extraction features 406 exemplify small spherically shaped bumps, protrusions or microlenses formed in surfaces 11 and 12. Light extraction features 408 exemplify rounded dimples formed in surfaces 11 and 12. Light extraction features 410 exemplify conical dimples or triangular prismatic grooves formed in surfaces 11 and 12. Light extraction features 412 exemplify conical or triangular prismatic protrusions formed in surfaces 11 and 12. Light extraction features 414 exemplify high-aspect-ratio cavities of grooves formed in surfaces 11 and 12. By way of example and not limitation, the cavities, dimples or grooves may be formed by any of the following methods: molding (e.g., compression or injection molding), embossing (e.g., hot embossing), etching (e.g., chemical or ion bombardment), or laser ablation (e.g., using a $CO_2$ laser, especially when sheet 10 is made from an acrylic material).

It is noted that FIG. 17, illustrating a cross-section of light guide 800, also exemplifies highly elongated (linear) geometrical configurations of light extraction features 402, 404, 406, 408, 410, 412, and 414, which have a longitudinal axis perpendicular to the YZ plane (or parallel to the X axis). The longitudinal lengths of the light extraction features 402, 404, 406, 408, 410, 412, and 414 (in a linear configuration), as measured along the X axis, may vary in a broad range. According to one embodiment, the lengths of the respective light extraction features may be at least two or three times of their width measured along the Y axis but much less than the respective dimension of sheet 10, as measured along the X axis. According to one embodiment, at least some of linear light extraction features 402, 404, 406, 408, 410, 412, and 414 may have lengths that approximates the respective dimension of sheet 10, as measured along the X axis. According to one embodiment, linear light extraction features 402, 404, 406, 408, 410, 412, and 414 may be oriented along a perpendicular direction, e.g., parallel to the Y axis. According to one embodiment, linear light extraction features 402, 404, 406, 408, 410, 412, and 414 may be oriented at an oblique angle with respect to the X axis and/or Y axis.

It should be understood that the above teachings in reference to light extraction features 402, 404, 406, 408, 410, 412, and 414 may be applied, without limitations, to configuring any of light extraction features 8, 9, 91, 92, 93, and 94 described in the preceding embodiments. Furthermore, the different types or configurations of light extraction features described above can be combined within the same light guiding sheets (e.g., sheets 10, 20 and/or 30), for example, to achieve different visual effects (e.g., displaying different illuminated patterns and/or colors, statically or in succession) or to obtain different predefined luminance distributions. For example, surface 11 of light guiding sheet 10 may have micro-dots of white UV-curable ink having one composition (e.g., a first volumetric density of light scattering particles within a transparent binder), micro-dots of white UV-curable ink having a different composition (e.g., a second volumetric density of light scattering particles within the transparent binder), and micro-cavities, dimples or micro-bumps distributed across the surface according to a two-dimensional pattern. According to one embodiment, light extraction features of one type or composition may be formed in surface 11 and light extraction features of a different type or composition may be formed in opposite surface 12.

FIG. 18 through FIG. 21 schematically show polar luminous intensity distribution graphs calculated using optical raytracing for different configurations and combinations of light extraction features formed in broad-area surfaces of a thin planar light guide illuminated from two opposite edges by arrays of LED sources, e.g., as illustrated by the example of LEDs 2 optically coupled to edge surfaces 13 and 14 in FIG. 1. The sampling plane selected for each graph is perpendicular to the prevalent plane of the planar light guide and to both light input edges. In other words, the sampling plane illustratively corresponds to a plane parallel to the YZ plane in FIG. 1 when light input through edge surfaces 13 and 14 only. Assuming a horizontal orientation of the planar light guide, the upper half of each graph corresponds to an upward emission from the top surface of the light guide and the lower half of each graph corresponds to a downward emission from the bottom surface of the light guide.

Figure 18:
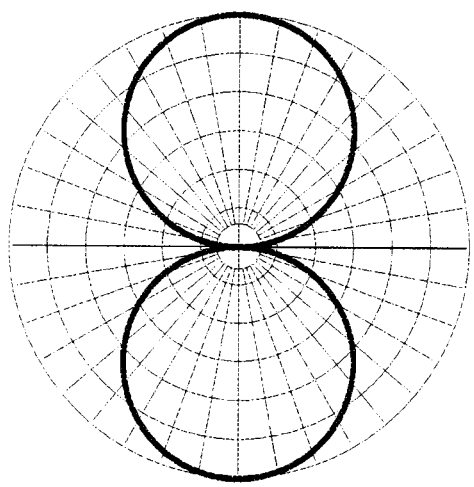
FIG. 18 is a calculated polar luminous intensity distribution graph for an exemplary configuration of light extraction features, showing a symmetrical Lambertian emission from opposing broad-area surfaces of a planar light guide with equal top/bottom light output, according to at least one embodiment of the present invention.
Figure 19:
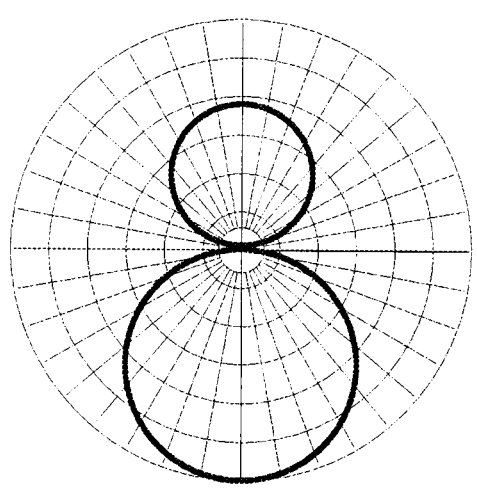
FIG. 19 is a calculated polar luminous intensity distribution graph for an alternative exemplary configuration of light extraction features, showing a Lambertian emission from opposing broad-area surfaces of a planar light guide with unequal top/bottom light output, according to at least one embodiment of the present invention.
Figure 20:
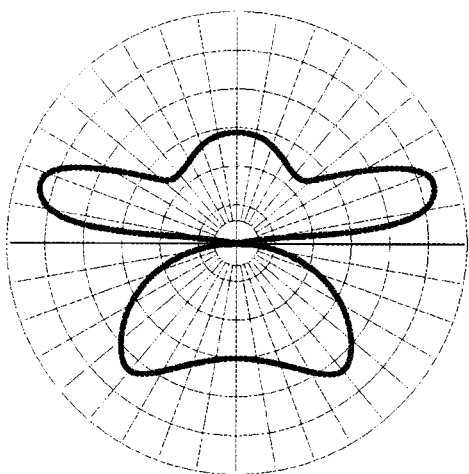
FIG. 20 is a calculated polar luminous intensity distribution graph for a further alternative exemplary configuration of light extraction features, showing different types of "batwing" emission from opposing top and bottom broad-area surfaces of a planar light guide, according to at least one embodiment of the present invention.
Figure 21:
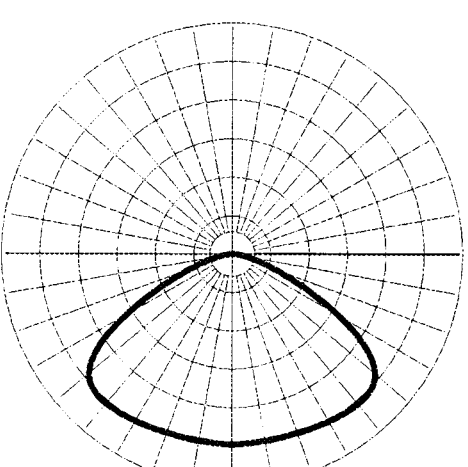
FIG. 21 is a calculated polar luminous intensity distribution graph for a yet further alternative exemplary configuration of light extraction features, showing a directional emission from a broad-area surface of a planar light guide, according to at least one embodiment of the present invention.

By way of example and not limitation, the optical configurations of wide-area light guide illuminations systems which angular emission distributions are illustrated in FIG. 18 through FIG. 20 may be advantageously selected for direct/indirect illumination (e.g., incorporated into a suspended lighting fixture) while the configuration corresponding to FIG. 21 may be advantageously selected for direct-only illumination (e.g., incorporated into a recessed or surface-mount downlight troffer).

FIG. 18 shows a symmetrical luminous intensity distribution in which light output from opposite top and bottom broad-area surfaces of the light guide is near identical in terms of both the angular dependence and the total energy of emitted light. The angular distribution patterns for each side (e.g., top and bottom) of the light guide closely approximate that of a Lambertian (cosine) emission having an equivalent overall light output.

FIG. 19 is a calculated polar luminous intensity distribution graph for an alternative exemplary configuration of light extraction features which produce a substantially Lambertian emission from both the top and bottom surfaces with the overall light output from the bottom surface being significantly greater than the overall light output from the top surface.

FIG. 20 is a calculated polar luminous intensity distribution graph for a further alternative exemplary configuration of light extraction features that produces two different angular emission distributions of a "batwing" type. The top surface produces a "batwing" angular emission with a wide throw and a small on-axis "bulge". The bottom surface produces a "batwing" angular emission with a much narrower throw and with a reduced on-axis intensity.

FIG. 21 is a calculated polar luminous intensity distribution graph for a yet further alternative exemplary configuration of light extraction features and for the case where a semi-specular reflective sheet is placed on top of the top surface of the edge-lit light guide such that the light is emitted in a downward direction only. The resulting angular intensity distribution is directional with the intensity being near constant within a range of angles between about −50° to about +50° from a surface normal.

Example 2

A wide-area light guide illumination system was made using an edge-lit planar acrylic light guide having a thickness of about 1.5 mm and major dimensions of about 600 mm by 600 mm. The light guide was patterned on one side using microdots of a UV-cured white ink. The light guide was illuminated from two opposing edges using two strips of white SMD LEDs positioned in a close proximity to the respective edge surfaces. The total light output of the two bare LED strips (without the light guide) was measured at 4,500 lumens.

The dimensions of the light emitting aperture of each LED were about 1.2 mm by 1.2 mm. The light extraction pattern was produced by a randomized two-dimensional array of microdots deposited to the light guide surface using a commercial flatbed UV printing machine (a UV printer). The density of the pattern was made gradually increasing from the light input edges towards the center of the light guide. Each light extraction feature was represented by an individual microdot produced by a single droplet of the UV ink. Each microdot had a size of approximately 100-130 micrometers and a maximum thickness of about 6 micrometers in the center. The volume of each microdot was about 40,000 cubic micrometers. No light diffusing or reflective sheets were included into the wide-area light guide illumination system of this example.

The luminous intensity distributions of the emission from the top and bottom surfaces were measured using a Type C Goniophotometer System. The light guide was oriented horizontally with the surface patterned with light extraction features facing up. The results of the goniophotometric measurements are summarized in the annotated polar luminous intensity distribution graph shown in FIG. 22. The intensity units on the graph are candelas.

Figure 22:
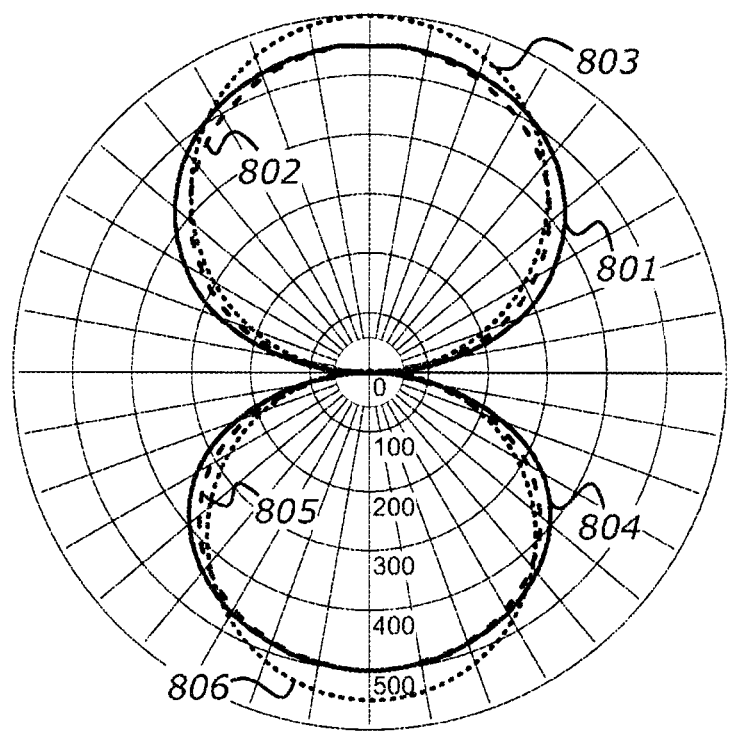
FIG. 22 is a measured polar luminous intensity distribution graph for an exemplary configuration of a wide-area illumination system, showing a quasi-Lambertian emission from opposing top and bottom broad-area surfaces of a planar light guide, according to at least one embodiment of the present invention.

Referring to FIG. 22, a curve 801 represents a measured angular dependence of the luminous intensity of the emission from the top surface of the light guide in a first vertical plane (through horizontal angles of 0°-180°). A curve 802 represents a measured angular dependence of the luminous intensity of the emission from the top surface in a second (orthogonal) vertical plane (through horizontal angles of 90°-270°). A curve 803 represents a calculated reference angular dependence of the luminous intensity for a Lambertian emitter of a similar total light output compared to the top surface.

Referring further to FIG. 22, a curve 804 represents a measured angular dependence of the luminous intensity of the emission from the bottom surface of the light guide in a first vertical plane (through horizontal angles 0°-180°). A curve 805 represents a measured angular dependence of the luminous intensity of the emission from the bottom surface in a second (orthogonal) vertical plane (through horizontal angles 90°-270°). A curve 806 represents a calculated reference angular dependence of the luminous intensity for a Lambertian emitter of a similar total light output compared to the bottom surface.

As it can be seen from the graph, both the top and bottom surfaces produced near-Lambertian angular intensity distributions with the deviations from the "ideal" Lambertian being about 10% or less for most observation angles. The total light output from the patterned top surface was about 10% greater than that from the non-patterned bottom surface.

Example 3

Figure 23:
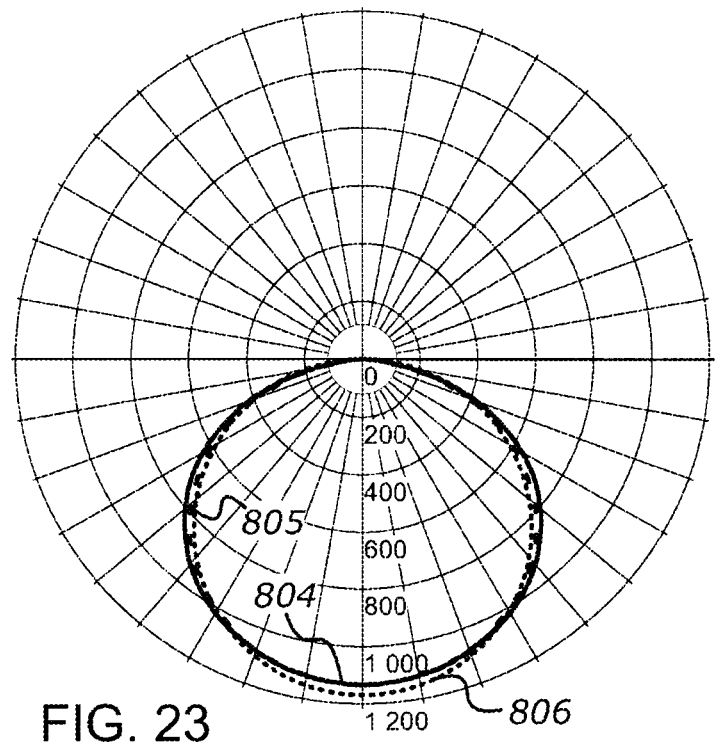
FIG. 23 is a measured polar luminous intensity distribution graph for an exemplary configuration of a wide-area illumination system, showing a near-Lambertian emission from a single broad-area surface of a planar light guide, according to at least one embodiment of the present invention.

The wide-area light guide illumination system described the Example 2 was modified by adding an opaque diffuse reflector to the top surface of the planar light guide and measured using the same procedure. The measurement results are summarized in the annotated polar luminous intensity distribution graph shown in FIG. 23. Referring to FIG. 23, the total light output from the bottom surface approximately doubled compared to the Example 2. Furthermore, the measured emission in both orthogonal planes became even more closely resembling the "ideal" Lambertian emission normalized to the same total light output. The deviation between the measured intensity and the calculated intensity based on the Lambertian law constituted 5% or less for most measured angles. Due to the high opacity of the top reflector (~100%), virtually no light was emitted from the top surface of the device.

Example 4

Figure 24:
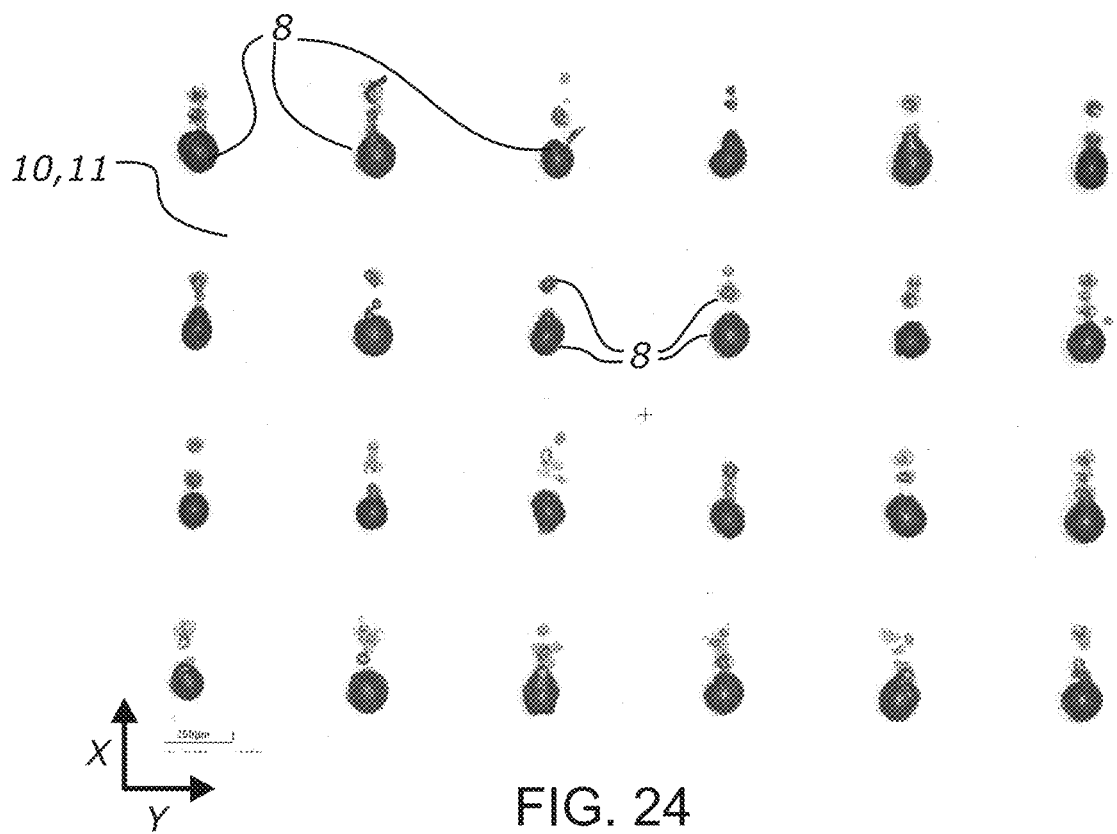
FIG. 24 is a photograph of an ordered pattern of semi-opaque light extraction features printed on a surface of a light guiding sheet, according to at least one embodiment of the present invention.

FIG. 24 shows an annotated photograph of an ordered light extraction pattern of semi-opaque microdots printed on a broad-area surface (exemplifying surface 11) of a planar acrylic sheet (exemplifying light guiding sheet 10). Each of the printed microdots forms a discrete light extraction feature on the surface (exemplifying individual light extraction feature 8). The light extraction pattern was printed using a semi-opaque UV-curable white ink containing $TiO_2$ particles in concentrations from 5% to 15% by weight. The printed pattern had a fixed pitch in both X and Y directions and included microdots of different sizes. At least some of the larger light extraction features 8 were formed by individual microdrops each having a volume of around 40,000 cubic micrometers.

Example 5

Figure 25:
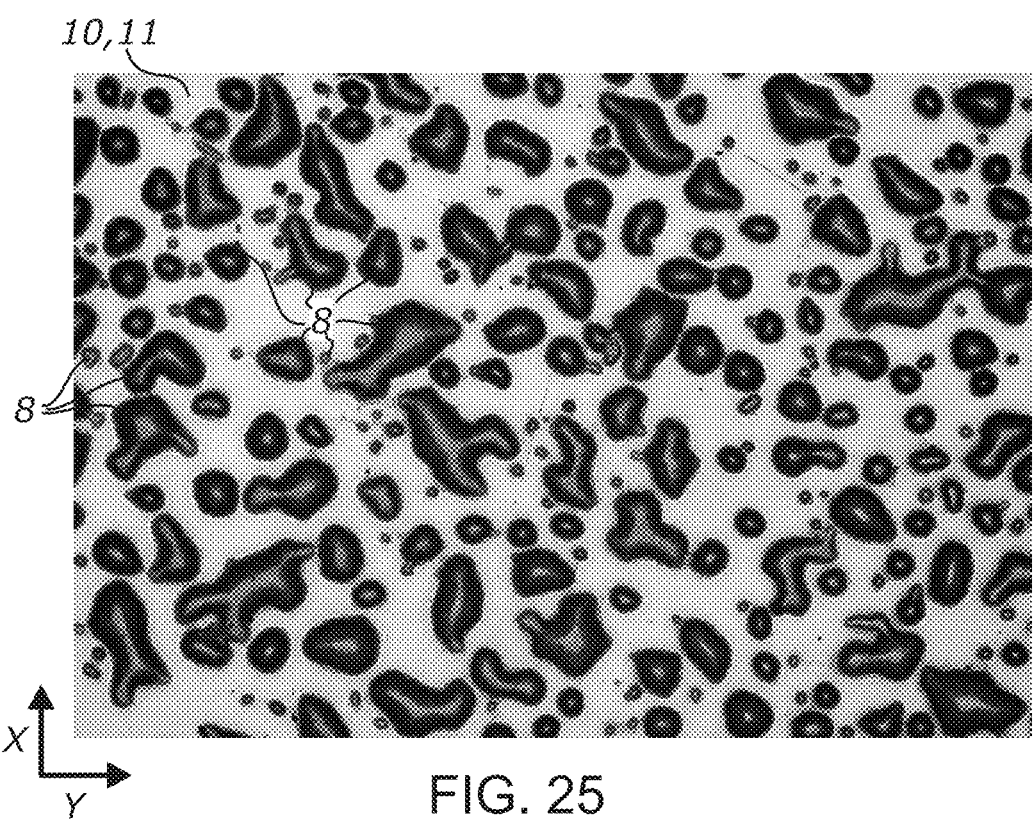
FIG. 25 is a photograph of a random pattern of semi-opaque light extraction features printed on a surface of a light guiding sheet with a relatively high areal density, according to at least one embodiment of the present invention.

FIG. 25 shows an annotated photograph exemplifying a random pattern of light extraction features 8 printed using the same type of ink and printing hardware as in the Example 4. The resulting printed pattern of FIG. 25 included a random mix of different shapes (including regular, quasi-regular, round, elongated, irregular and highly irregular shapes), orientation and sizes.

Example 6

Figure 26:
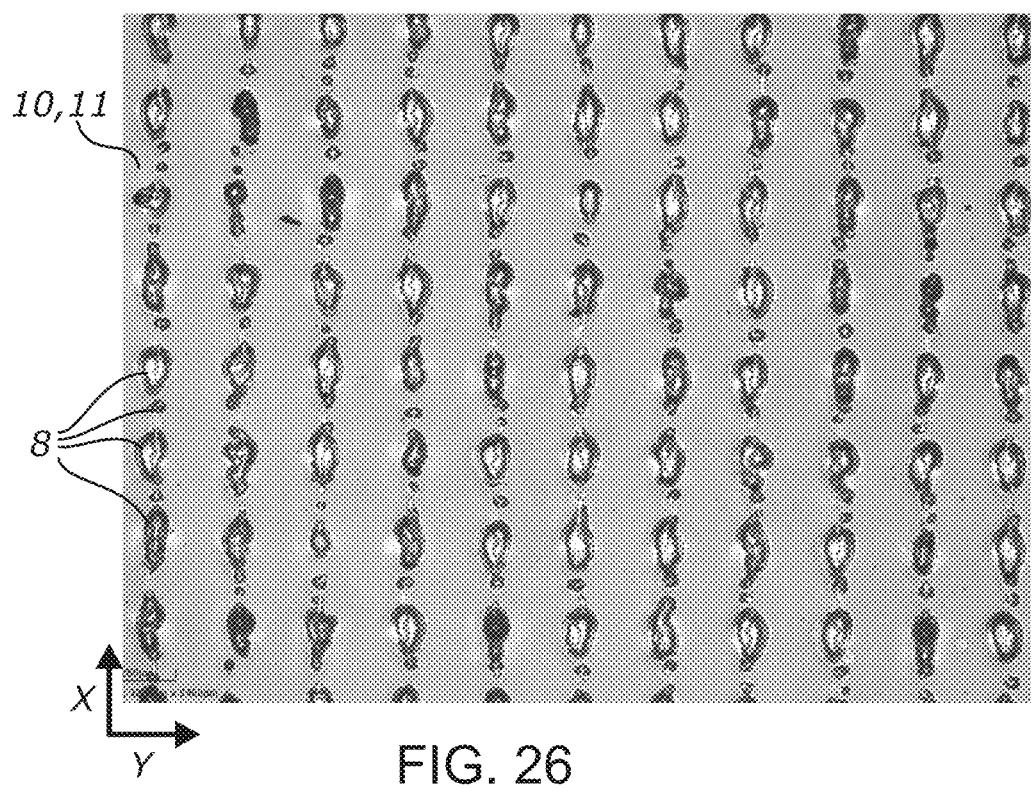
FIG. 26 is a photograph of an ordered pattern of optically clear, elongated light extraction features printed on a surface of a light guiding sheet, according to at least one embodiment of the present invention.

FIG. 26 shows an annotated photograph of an ordered pattern of optically clear microdots (transparent light extraction features 8) printed on a surface of light guiding sheet 10 using a transparent UV-curable ink. The microdots in this print had elongated shapes generally aligned parallel to the X axis.

Example 7

Figure 27:
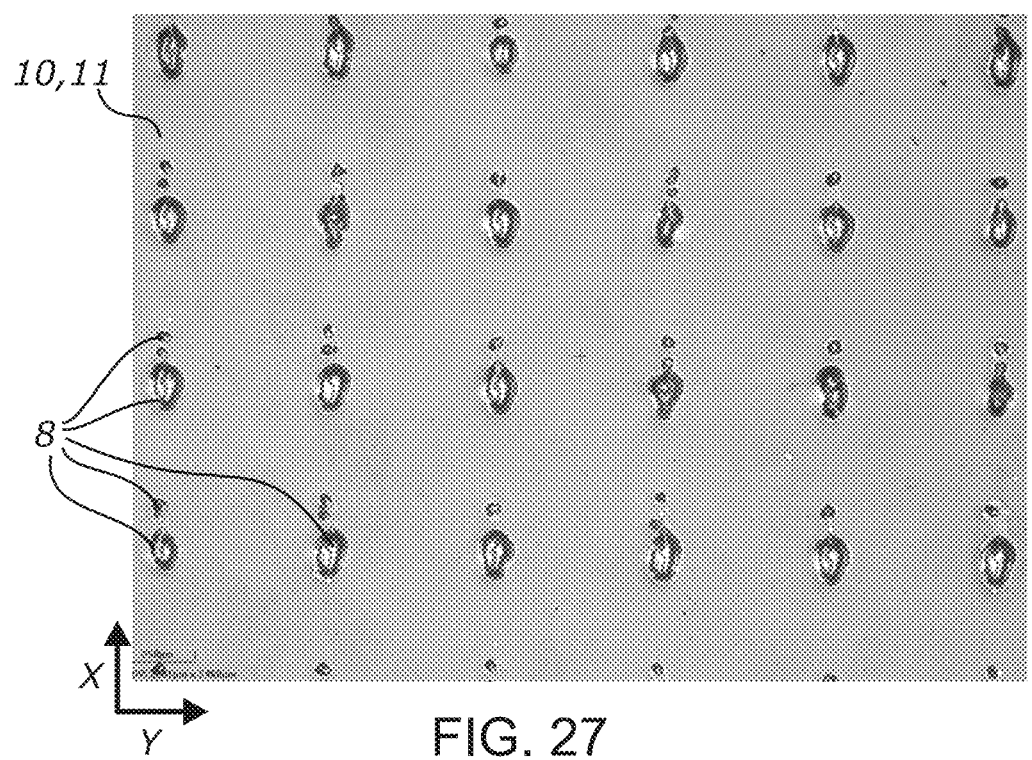
FIG. 27 is a photograph of a lower-density ordered pattern of optically clear, elongated light extraction features printed on a surface of a light guiding sheet, according to at least one embodiment of the present invention.

Similarly, FIG. 27 shows an annotated photograph of optically clear microdots (transparent light extraction features 8) that were printed using the same type of ink as in the Example 6 but also using a lower density of the pattern (greater spacing distances SPD between adjacent microdots).

Example 8

Figure 28:
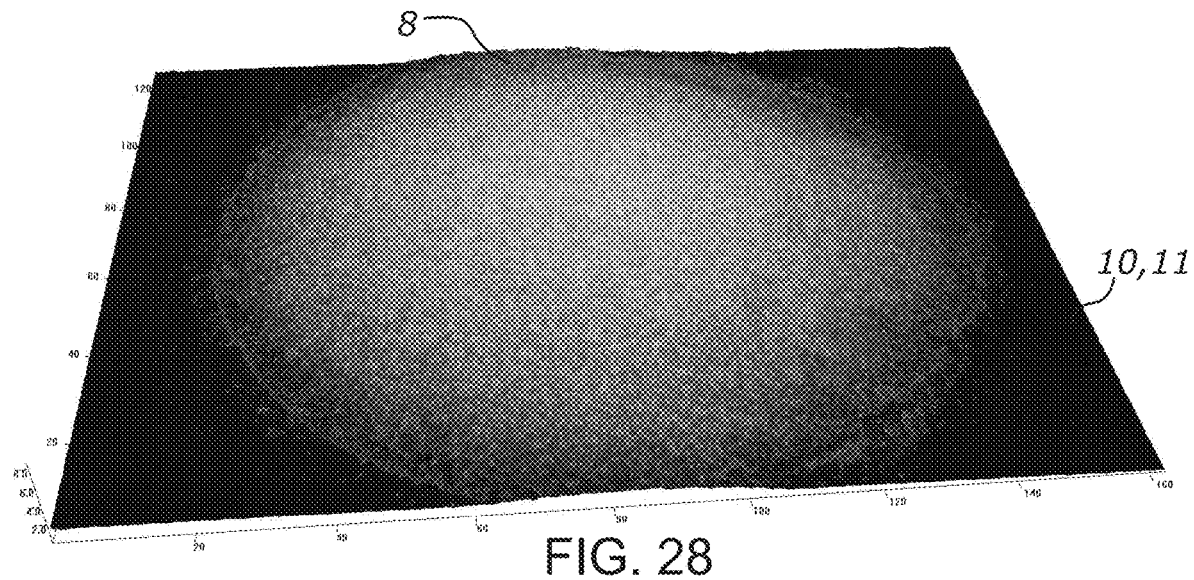
FIG. 28 is a microphotograph of an individual semi-opaque light extraction feature printed on a surface of a light guiding sheet and having a round or near-round shape at the base, according to at least one embodiment of the present invention.

FIG. 28 shows an annotated photograph of individual light extraction feature 8 formed by a microdot of semi-opaque, UV-curable white ink. The microdot had a thin spherical shape with a substantially round, regular outline. The diameter of the thin dome-shaped microdot was about 130 micrometers and the maximum thickness at the center was about 8 micrometers.

Example 9

Figure 29:
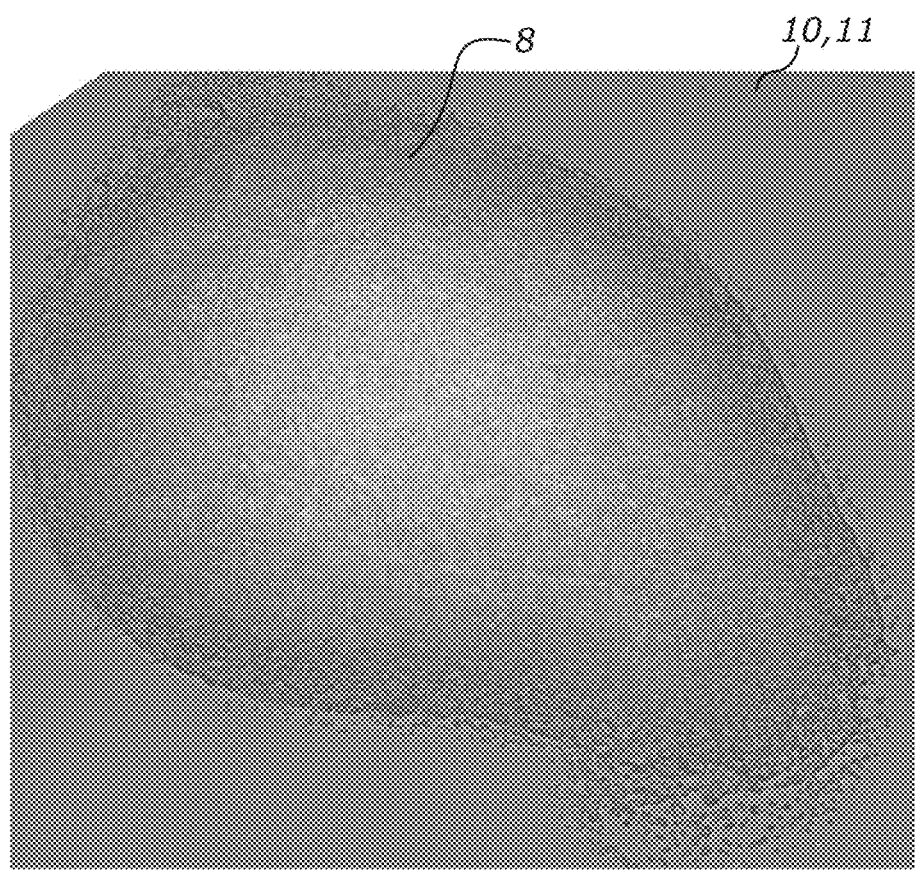
FIG. 29 is a microphotograph of an individual semi-opaque light extraction feature printed on a surface of a light guiding sheet and having an irregular elongated shape at the base, according to at least one embodiment of the present invention.

FIG. 29 illustrates an individual printed microdot (light extraction feature 8) which is similar in size and composition to that of the Example 8, except that is has an irregular, elongated shape with somewhat fuzzy borders at the longitudinal ends of the elongated shape.

Example 10

Figure 30:
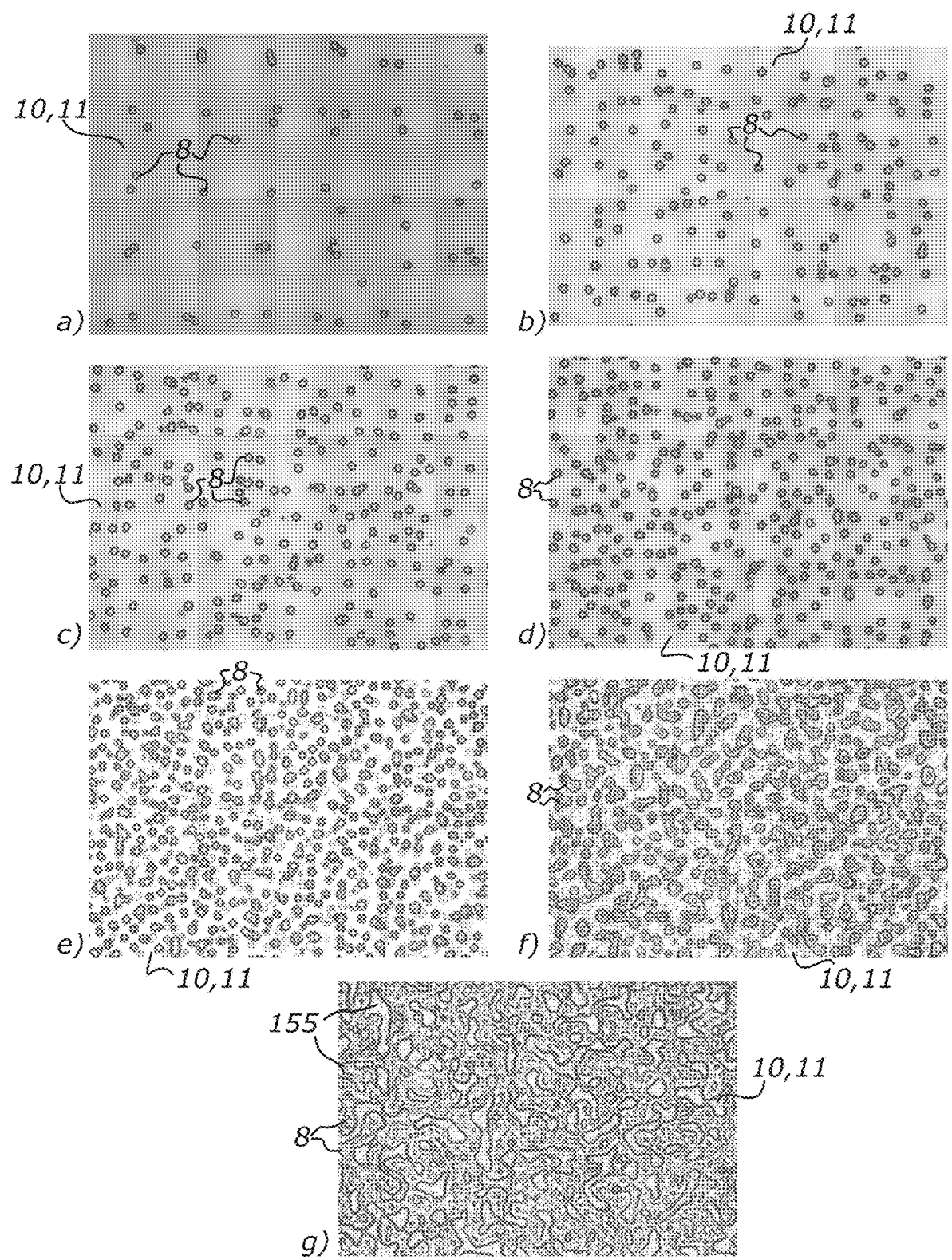
FIG. 30 is a series of photographs of portions of a surface of a planar light guide, showing different patterns and distribution densities of microdots of a light scattering material, according to at least one embodiment of the present invention.

A planar acrylic light guide was patterned for light extraction using a two-dimensional randomized pattern of microdots formed by a white-color UV-curable ink including light-scattering nanoparticles suspended in a clear binder material. The microdots were deposited to one of the broad-area surfaces of the light guide using a different commercial UV printing machine and using a different printing regime compared to the previous Examples. The overall light extraction pattern included areas of different distribution density of the microdots (sub-patterns). A series of photographs of different sampling areas of the patterned surface corresponding to different distribution densities of the microdots was taken using a microscope camera. The resulting photographs, enumerated a) through g), are shown in FIG. 30. The field of view of each photograph is approximately 3.3 mm by 2.5 mm.

Photograph a) shows relatively sparsely populated microdots (representing individual light extraction features 8) that correspond to an area of surface 11 that is relatively close to a light input edge (not shown). The microdot patterns within same-sized sampling areas gradually become denser with the increase of the distance from the light input edge, as shown in photographs b) through d), but still without significant overlaps of individual microdots.

Photograph e) illustrates a sampling area that is even further away from light input edge and has an even greater density of the microdots (with lower spacing distances SPD) compared to the sampling areas depicted on photographs a) through d). As it can be seen from photograph e), at least some of the adjacent microdots partially overlap one another.

Photograph f) illustrates a sampling area having an even greater distribution density of the microdots. There is also a substantial amount of overlap between adjacent microdots (having less-than-zero separation distances SED), including groups of 2, 3 or more overlapping microdots. Photograph g) depicts a sampling area characterized by yet even greater density of the microdots which overlap in large groups and create a continuous, randomly textured three-dimensional light extraction surface with occasional random voids 155. Voids 155 were substantially free from the light scattering material or contained a substantially reduced amount of the light scattering material compared to the adjacent surface textures produced by the fully loaded light scattering ink material.

Figure 31:
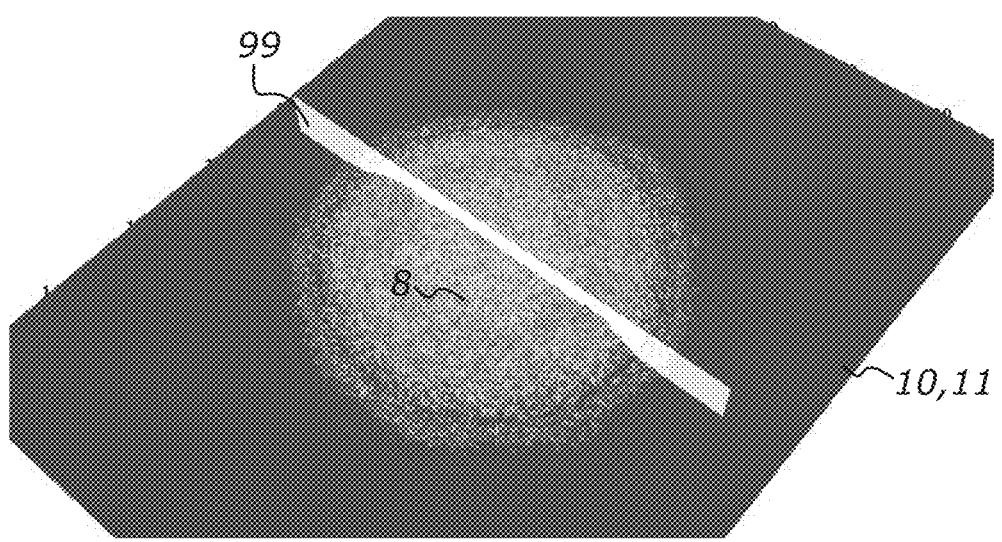
FIG. 31 is a three-dimensional composite image of an exemplary individual microdot of a light scattering material on a surface of a planar light guide, according to at least one embodiment of the present invention.
Figure 32:
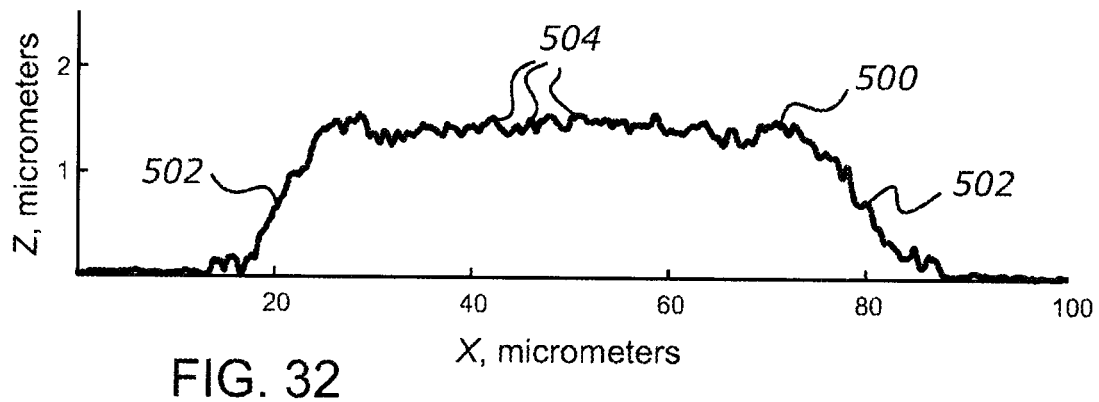
FIG. 32 is a graph showing a measured cross-sectional height profile of the microdot depicted in FIG. 31.

FIG. 31 shows a composite three-dimensional image of an individual printed microdot (exemplifying individual light extraction feature 8) which shape and dimensions were typical for at least some portions of the light extraction pattern produced in this Example. The image was obtained using an imaging 3D surface profiler/microscope from Zeta Instruments (model Zeta-200). FIG. 32 shows a cross-sectional surface profile (a curve 500) of the printed microdot taken along a cutting plane 99 passing through a mid-section of the microdot.

As can be seen from FIG. 31 and FIG. 32, the exemplary printed microdot had a generally round shape with a "flat-top" (truncated cone) 3D geometry, a narrow (<5 micrometers) outer rim with a very low (<0.2-0.3 microns) thickness, sloped side walls (visualized as walls 502 of curve 500), a diameter between 70 and 80 micrometers, and a near-constant thickness between 1.2 and 1.5 micrometers in the area between the sloped side walls. The volume of the exemplary printed microdot (in the fully cured, solid state) was measured at about 4,000 cubic micrometers.

As demonstrated by surface profile curve 500, the surface of the exemplary microdot had random surface irregularities 504 on a scale of the order of 0.1 micrometer. The random surface irregularities can also be seen in the form of a visible matte-finish surface texture on the microphotograph of FIG. 31. According to an aspect, the exemplary printed microdot represented a thin, semi-opaque layer of a light scattering material (a white ink) having a near-constant thickness of the order of one micrometer and occupying a round area having a diameter of less than 80 micrometers.

End of Example 10

Figure 33:
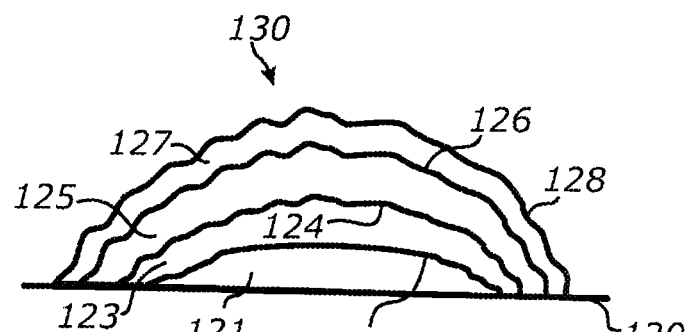
FIG. 33 is a schematic section view of an individual light extraction feature having a layered structure, according to at least one embodiment of the present invention.

FIG. 33 schematically shows an embodiment of a light extraction feature 130 formed in a surface 120 of a waveguide. The teachings described below in reference to light extraction feature 130 may be applied, without limitations, to any other light extraction featured described herein (e.g., light extraction features 8 and/or 9). Similarly, surface 120 may be exemplified by surfaces 11 or 12 of light guiding sheet 10 or any other surface features provided for extracting light from a waveguide.

Referring to FIG. 33, light extraction feature 130 is formed by four distinct layers of different materials deposited on top of each other, including a bottom light extraction layer 121 having an outer surface 122, a first intermediate layer 123 having an outer surface 124, a second intermediate layer 125 having an outer surface 126, and an outer layer 127 having an outer surface 128 which also form an outer surface of light extraction feature 130. According to a preferred embodiment of a method of making light extraction features 130, all of the layers of each individual light extraction feature 130 are formed by sequential inkjet printing of the respective materials in a liquid form with the subsequent curing to a solid form.

According to one embodiment, layer 121 is formed by a light scattering (e.g., white-pigmented ink material containing light scattering particles suspended in a clear binder), layer 123 is formed by a colored or color-converting (e.g. luminescent) ink, layer 125 is formed by a reflective ink material, and layer 127 is formed by a clear ink that protects the reflective ink from the environment. According to one embodiment, layer 121 is formed by a colored or color-converting ink material, layer 123 is formed by a light scattering ink material, layer 125 is formed by a reflective ink material, and layer 127 is formed by a protective clear ink material. Light extraction feature 130 may also include one or more adhesive layers (e.g., formed by an adhesion promoting ink material) provided between layers 121, 123, 125, and/or 127. The adhesive layer can be printed on top of each layer before printing a next optical or protective layer. According to one embodiment, an adhesive layer can only be provided for selected interfaces to promote the adhesion between materials that have insufficient adhesion t each other (e.g., between intermediate layer 123 and reflective layer 125). According to one embodiment, layer 121 is formed by light scattering ink, layer 123 is formed by adhesion promoting clear ink, layer 125 is formed by reflective ink, and layer 127 is formed by clear ink or lacquer.

According to one embodiment, reflective ink may be formed by a clear solvent-based or UV-curable binder material including a suspension of microscopic metallic flakes or slivers. Such microscopic flakes or slivers can be formed, for example, from a larger piece of metallic foil (e.g., aluminum foil or protected silver foil). The thickness of the flakes or slivers can be, for example, from 10 nm to 1 μm, from 50 nm to 0.5 μm, or from 100 nm to 0.5 μm. The size of the flakes or slivers may vary in a broad range, for example, from less than one micrometer to several hundred micrometers or from one micrometer to 100 μm. It is also preferred that the ratio between a longer dimension of the flakes or slivers and their thickness is at least 10, more preferably greater than 10, and even more preferably greater than 20. According to one embodiment, metallic flakes or slivers may be replaced by similarly dimensioned reflective structures formed from metallized plastic film.

Figure 34:
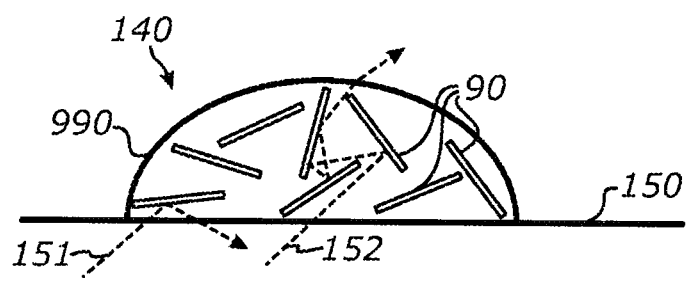
FIG. 34 is a schematic section view of a microdrop of a reflective ink material in a liquid form, according to at least one embodiment of the present invention.
Figure 35:
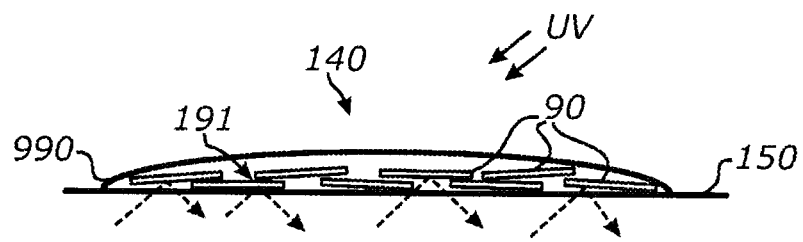
FIG. 35 is a schematic section view of a cured microdrop of a reflective ink material forming an individual light extraction feature on a surface of a light guide, according to at least one embodiment of the present invention.

FIG. 34 and FIG. 35 schematically illustrate a method of forming an individual light extraction feature 140 on a surface 150 of a waveguide using a reflective ink material including suspended reflective metallic flakes 90. While FIG. 34 and FIG. 35 depict an exemplary light extraction feature formed by a single layer of ink, the basic principles of this method can also be applied, without limitation, for forming light blocking/reflective surface structures (e.g., light blocking features 782 of FIG. 13 or opaque layers 778 and FIG. 14) or forming individual reflective layers in a multilayer structure of light extraction features (e.g., reflective layer 125 of light extraction feature 140 of FIG. 33).

Referring to FIG. 34, a drop 990 of a UV-curable reflective ink material containing metallic flakes 90 is deposited to surface 150 in a liquid form, representing a step of forming light extraction feature 140. According to one embodiment, drop 990 may be deposited using an inkjet printer with a piezoelectric printhead.

Flakes 90 may be generally randomly or quasi-randomly oriented within the bulk of reflective ink material, as supplied. Furthermore, the reflective ink can be additionally agitated within the printer's ink delivery circuit prior to printing, e.g., to ensure than flakes 90 are properly mixed within a clear binder resin of the ink and to prevent clogging of printing nozzles. As a result, flakes 90 of drop 990 may have a similar (random) orientation upon contact with surface 150.

This random orientation may be suboptimal for providing sufficiently high reflectance for light extraction feature 140, which is illustrated by exemplary light rays 151 and 152 being extracted from surface 150 of the respective waveguide. For example, while ray 151 is reflected from one of flakes 90 (which is oriented near-parallel to surface 150) back towards surface 150 and into the waveguide, ray 152 encounters several flakes 90 that are oriented at high angles with respect to surface 150 and exits from the opposite side of drop 990 through gaps between the flakes. Ray 152 may also loose energy at each interaction with flakes 90 (e.g., up to 10-30% at each interaction, depending on the reflectance of the material of flakes 90) which may further degrade the useful light output from the system.

Referring to FIG. 35, which schematically illustrates a further step of the method of making light extraction feature 140. In order to enhance the desired reflective operation and system efficiency, drop 990 is allowed to spread over surface 150 and flatten prior to curing. Drop 990 can be allowed to flatten to a sufficiently low thickness such that flakes 90 become aligned generally parallel or near-parallel to surface 150 and form an opaque reflective layer 191 configured to reflect at least a significant portion of a parallel beam of light in a specular or near-specular regime (e.g., in which the angle of reflection is about equal to or within a relatively narrow range from the angle of incidence). FIG. 35 further illustrates a step of curing drop 990 to a solid state using UV light so as to form finished light extraction feature 140.

The loading of flakes 90 in the ink can be selected such that the cumulative area of all flakes in drop 990 is greater than the surface area occupied by light extraction feature 140, preferably by at least 20%, at least 1.5 times, at least 2 times, or at least 4 times. For example, when fully cured drop 990 has a diameter of about 100 μm and an area of about 8,000 μm$^2$, the cumulative area of flakes 90 in that drop should preferably be in the range of 10,000 to 30,000 μm$^2$ or greater.

Drop 990 should also include a sufficient number of flakes 90 to entirely cover the area light extraction features 140 and make it substantially opaque. It is also preferred that at least some flakes 90 stack on one another and form two, three or more layers of the flakes (e.g., to ensure complete area coverage), with at least some of the flakes overlapping on one another.

According to one embodiment, the viscosity of the ink material can be made sufficiently low and the printing process may be configured to allow sufficient time to allow flakes 90 (which can be much heavier than the ink binder material) to settle on the bottom of drop 990 under the force of gravity.

According to a more preferred embodiment, the viscosity, per-drop volume and surface energy of the ink material and the dimensions of flakes 90 may be selected to quickly actuate the horizontal alignment of flakes 90 under the force of surface tension. A general condition for the alignment of flakes 90 using the forces of surface tension may be achieved, for example, by making drop 990 to form an ink layer with a thickness which is significantly less than the shortest dimension of flakes 90. According to different embodiments, a maximum thickness of fully cured individual drop 990 is less than the smallest dimension of individual flake 90 by at least 2 times, at least 5 times, or at least 10 times. For example, individual drop 990 may have a thickness of about 1-2 μm while flakes 90 can have a prevalent diameter of 5-10 μm or more. It may also be preferred that the size of flakes 90 is several times greater than the intended wavelength(s) of device operation (e.g., to minimize light diffraction). According to one embodiment, flakes 90 can have sizes from 1 μm to 5 μm. According to one embodiment, flakes 90 can have sizes from 5 μm to 20 μm.

According to an aspect, flakes 90 can be characterized by a size $D_F$ in a longest dimension. According to one embodiment, size $D_F$ is bounded by the following relationship:

$$D_F < 1.2\sqrt[3]{V},$$

where V is a total volume of individual drop 990. According to different embodiments, size $D_F$ is less that the diameter of fully cured individual drop 990 (light extraction feature 140) by at least 2 times, at least 3 times, at least 4 times, at least 5 times, or at least 10 times.

It is noted that, at least according to one embodiment, flakes 90 do not have to be required to lay totally flat on surface 150 and may form different dihedral angles with respect to surface 150 so as to cause some scattering for light extracted from the respective waveguide. Yet, the dihedral angles should preferably be limited (e.g., to ±5° or less, ±10° or less, or ±15° or less) so as to provide sufficient opacity (e.g., at least 80% or more or, more preferably, at least 90%) to the reflective layer formed by flakes 90. According to one embodiment, such scattering may be configured to deflect light at sufficiently high deflection angles such that the deflected light can enter back into the waveguide at below-TIR angles (with respect to a surface normal) and subsequently exit from a waveguide's surface that is opposite to surface 150.

Figure 36:
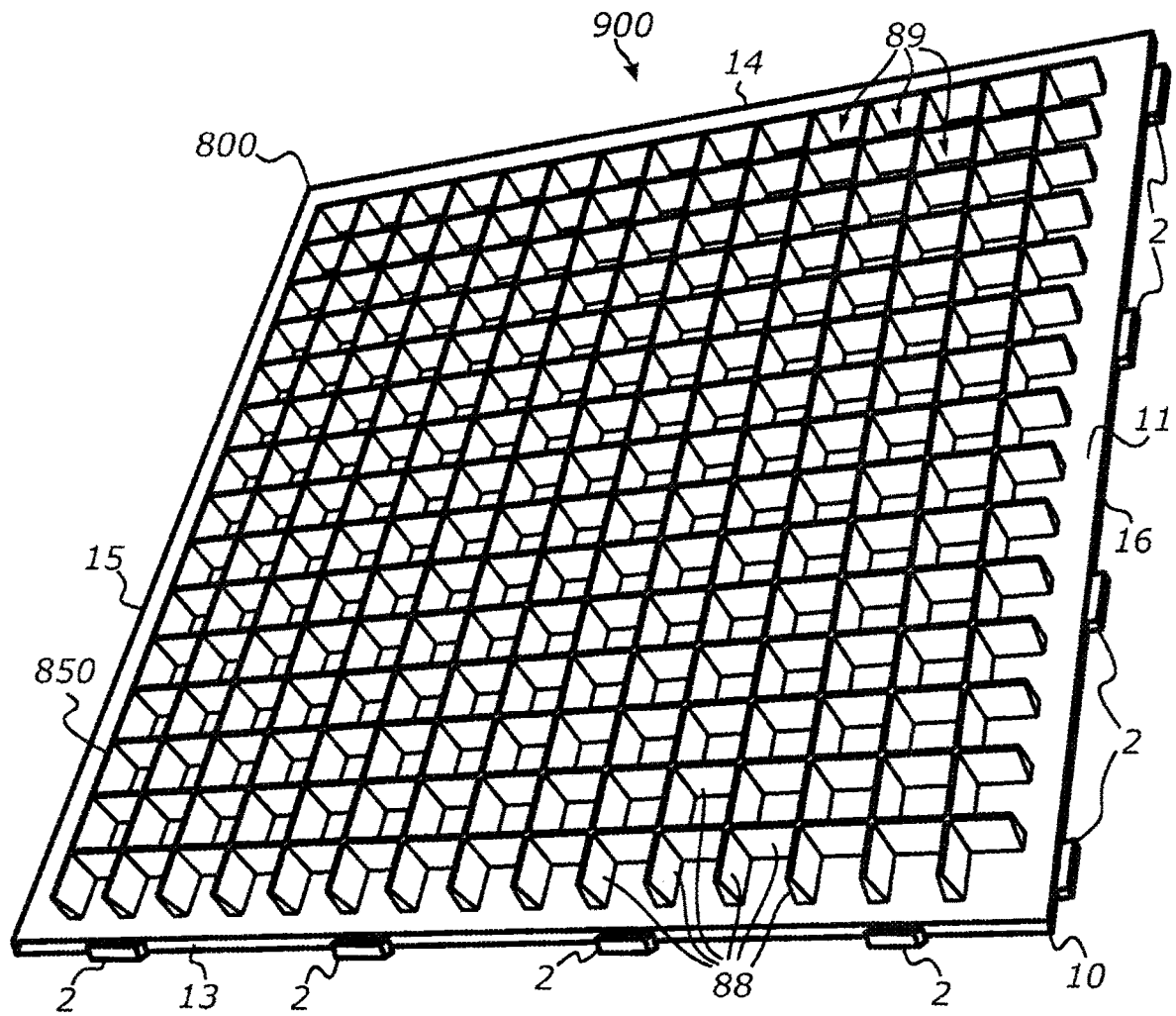
FIG. 36 is a schematic perspective view of a wide-area solid-state light guide illumination system including a reflective grid disposed adjacent and in energy receiving relationship with respect to a light guiding sheet, according to at least one embodiment of the present invention.

FIG. 36 schematically shows an embodiment of wide-area light guide illumination system 900 in which a reflective grid 850 is positioned over light guiding sheet 10 which forms light guide 800 and disposed in energy receiving relationship with respect to sheet 10.

Reflective grid 850 is formed by two parallel arrays of linear reflective members 88 crossed at a right angle with respect to each other. Reflective grid 850 forms a rigid, planar reflective grid panel that has a rectangular shape and a relatively small thickness compared to its length and width dimensions. For example, in different implementations, a thickness of the reflective grid panel can be at least four times, at least five times or at least ten times less than a with or length of the panel.

According to one embodiment, reflective grid 850 is positioned adjacent to light guiding sheet 10. Depending on the orientation of illumination system 900 and intended direction of light emission, reflective grid 850 may be positioned on top of light guiding sheet 10, with a physical contact, and rested on the light guiding sheet. Conversely, light guiding sheet 10 may be positioned on top of reflective grid 850 and rested on the reflective grid 850 with a physical contact.

According to some embodiments, reflective members 88 may be exemplified by louvers, micro-louvers, baffles of similar structures, commonly found in lighting fixtures, particularly including but not limited to troffers, suspended and architectural linear fixtures. Each louver or baffle can have a pair of opposing walls that have a reflective (e.g., specularly mirrored or diffuse) finish such that reflective grid 850 can incorporate a number of reflective walls oriented transversely with respect to a prevalent plane of reflective grid 850 and can further define a number of openings in the respective reflective grid panel. The openings can be arranged into a one-dimensional or two-dimensional array and can be configured to transmit light through reflective grid 850.

According to one embodiment, reflective grid 850 may be formed by a single parallel array of elongated reflective baffles or louvers. These baffles or louvers may be connected together by cross members, which may also be reflective. According to one implementation, the cross members may connect the respective terminal ends of the baffles or louvers, e.g., formed along the perimeter of the reflective array of the baffles or louvers. According to one implementation, the cross members may connect longitudinal ends of the baffles or louvers, e.g., connecting them at mid-points.

According to one embodiment, reflective grid 850 may be exemplified by an eggcrate louver lighting diffuser having a planar panel configuration and a rectangular grid of reflective members 88 defining rectangular of square open cells (openings 89). According to one embodiment, reflective members 88 may be arranged according to a different pattern and define open cells (openings 89) of other shapes. For example, openings 89 can be hexagonal or round. Suitable examples of products which can be used for forming reflective grid 850 include but are not limited to reflective egg-crate diffusers or louver panels products commercially available from SLP Lighting or others. Other suitable examples of light direction control products that can be used for forming reflective grid 850 include aluminum parabolic louvers of various configurations commonly found in linear-type lighting fixtures employing fluorescent tubes. U.S. Pat. No. 9,194,552, the disclosure of which is incorporated herein by reference in its entirety, disclose various useful exemplary configurations of reflective grids that can be used, without limitations, for making reflective grid 850 of the instant invention.

According to one embodiment, reflective members 88 may have a mirrored finish configured to reflect light primarily in a specular or semi-specular regime. The reflective coating may also have different color or tints (e.g., "silver", "bronze", etc.). The reflective coating may also have low-iridescence properties. According to one embodiment, reflective members 88 may have a matte finish or textured surface configured to reflect light primarily in a diffuse regime (e.g., "brushed aluminum" finish). According to one embodiment, reflective members 88 are formed from a sheet metal material (e.g., aluminum).

According to one embodiment, reflective members 88 may be replaced with non-reflective (e.g., light absorbing), optically opaque baffles or louvers, for example for rejecting off-axis light rays emitted from light guiding sheet 10. According to one embodiment, reflective members 88 may be formed from an optically opaque plastic material which can have different colors and optical properties. For example, the plastic material can have a white color with light diffusing properties. The plastic material can also be dark colored and configured to absorb light.

As further schematically illustrated in FIG. 36, each reflective member 88 may have a tapered (wedge-shaped) configuration in a transverse cross-section, with a wider portion of the tapered shape facing light guiding sheet 10 and the narrower tips facing away from light guiding sheet 10. In the illustrated case, surface 11 of light guiding sheet 10 is facing reflective grid 850. According to one embodiment, each reflective member 88 may have a planar or curved sheet-form configuration (e.g., being formed by a strip of sheet metal or plastic). According to one embodiment, each reflective member 88 has a planar shape and is aligned perpendicular to a prevalent plane of reflective grid 850 (and also perpendicular to light guiding sheet 10). According to one embodiment, each reflective member 88 has a concave or convex shape, e.g., being circular or parabolic in a cross-section)

According to one embodiment, surface 11 of light guiding sheet 10 may be disposed in contact with reflective grid 850. According to one embodiment, within an exemplary lighting fixture, in which reflective grid 850 may be facing downwards, light guiding sheet 10 may be laid on top of reflective grid 850 such that the reflective grid can provide support for the light guiding sheet. Light guiding sheet 10 may be illuminated by LEDs 2 optically coupled to edge surfaces 13, 14, 15, and/or 16. Light guiding sheet 10 with the associated LEDs 2 may further be attached to reflective grid 850 (e.g. using fasteners) to form a single rigid illumination panel assembly.

In operation, light guide 800 redistributes light emitted by LEDs 2 over the entire area of light guiding sheet 10 and emits a soft, uniform glow from surface 11 of sheet 10. Reflective grid partially transmits and partially redirects light emanated from surface 11 further improving the angular control of the light emitted by system 900.

The light extraction pattern(s) of light guiding sheet (not shown in FIG. 36 for clarity) may be configured to extract light only in the areas corresponding to openings 89 in reflective grid 850 (e.g., spacing areas between reflective members 88). This configuration may be advantageously selected for an embodiment of wide-area light guide illumination system 900 for the purpose of minimizing light losses due to light rays being absorbed or improperly redirected by the top (wide) portions of reflective members 88. It may be appreciated that, in this configuration, reflective members 88 may have a considerable width (e.g., covering 10% to 60% or more area of the total area of the resulting lighting panel) without significantly impacting the overall efficiency, compared to a case where light is emitted from the entire area of surface 11 of light guiding sheet 10, since practically all of the light can be emitted through openings 89 without being partially blocked by reflective members 88.

FIG. 37 through FIG. 40 schematically illustrate a method of making illumination system 900 using reflective grid 850 and light guide 800 formed by selectively patterned light guiding sheet 10.

Figure 37:
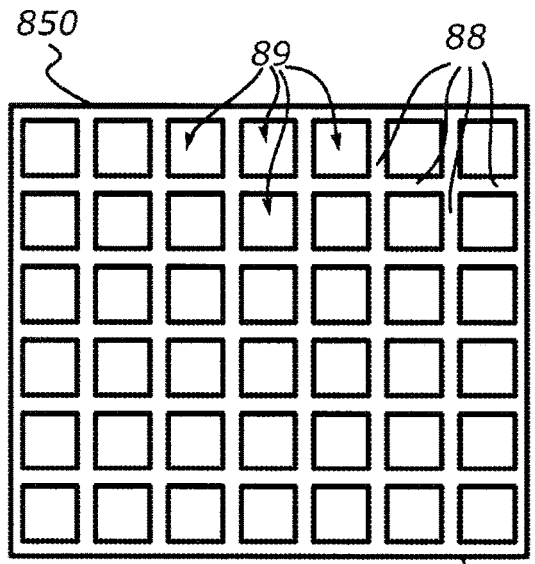
FIG. 37 is a schematic view of a rectangular reflective grid panel, illustrating a step of a method of making of a wide-area solid-state light guide illumination system, according to at least one embodiment of the present invention.
Figure 38:
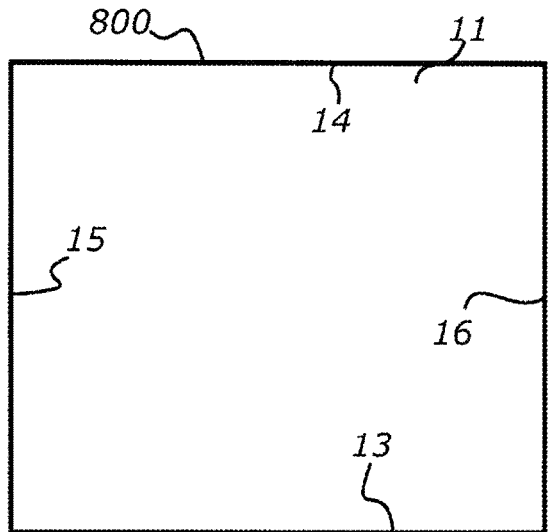
FIG. 38 is a schematic view of a rectangular light guiding sheet having length and width dimensions approximating length and width dimensions of the reflective grid panel of FIG. 37, illustrating a step of a method of making of a wide-area solid-state light guide illumination system, according to at least one embodiment of the present invention.

FIG. 37 schematically depicts a step of providing reflective grid 850 which has the form of a planar rectangular reflective panel. Reflective grid 850 includes opaque reflective members 88 having a non-negligible thickness and defining openings 89 between reflective members 88. According to a one embodiment, a width of at least some reflective members is greater than 5% of a width of openings 89 along the same direction of the measurement. According to different embodiments, a width of at least some reflective members is equal to or greater than 10%, equal to or greater than 15%, equal to or greater than 20%, equal to or greater than 25%, equal to or greater than 30%, equal to or greater than 35%, or equal to or greater than 50% of a width of openings 89 along the same direction of the measurement.

Reflective members 88 that form the perimeter of reflective grid 850 have a reflective finish on the side walls that are facing the inside of the reflective panel. Each reflective member 88 within that perimeter can have a pair of opposing reflective walls that extend transversely through the panel. According to one embodiment, the reflective walls can extend perpendicular to a prevalent plane of the panel (reflective grid 850). According to one embodiment, the reflective walls can extend at a relatively low angle (e.g., generally less than 5°, less than 10°, less than 15°, less than 20°, or less than or equal to 30°) with respect to a normal to that plane. According to one embodiment, the reflective walls can extend at an angle between 35° and 55° with respect to that normal. According to one embodiment, the reflective walls can extend at an angle of about 45° with respect to a prevalent plane of the reflective panel (reflective grid 850). According to one embodiment, the reflective walls can be planar or have one or more planar portions. According to one embodiment, the reflective walls can have one or more curved surfaces. The reflective wall surfaces may be curved in a plane perpendicular to the prevalent plane of the reflective panel. The reflective wall surfaces may also be curved in a plane parallel to the prevalent plane of the reflective panel.

Referring to FIG. 37, the method further includes a step of providing a rectangular sheet of optically transparent material and forming light guiding sheet 10 and light guide 800. The rectangular sheet (light guiding sheet 10) can have broad-area surface 11 configured for light output and four edge surfaces 13, 14, 15, and 16 defining a perimeter and edges of the rectangular sheet and configured for light input.

Light guiding sheet 10 can be dimensioned to approximate the respective length and width dimensions of reflective grid 850. According to different embodiments, the length and width dimensions of light guiding sheet 10 approximate the respective length and width dimensions of reflective grid 850 within ±5%, within ±10%, within 15%, within 20%, or within ±25%, According to one embodiment, at least one of the length or width dimensions of light guiding sheet 10 can be made slightly larger (e.g., by up to 5-15%) than the respective dimension of reflective grid 850 (e.g., in order to allow for a space to facilitate optical coupling of LEDs to its edges).

Figure 39:
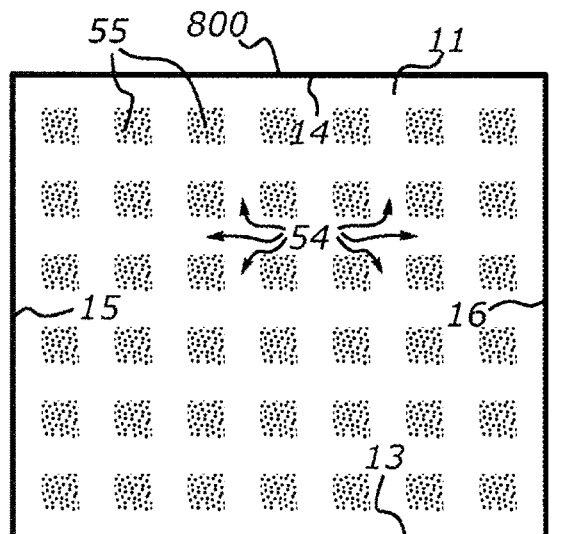
FIG. 39 is a schematic view illustrating a step of patterning a light guiding sheet using a light extraction pattern having discrete light extraction areas alternating with spacing areas, according to at least one embodiment of the present invention.

Referring to FIG. 39, the method further includes a step of selective patterning of surface 11 for light extraction in discrete areas 55. Areas 55 form light extraction areas which are configured to extract light from light guiding sheet and cause light emission from respective light extraction areas 55. The selective patterning can be done such that light extraction areas 55 alternate with non-extracting separation areas 54 such that almost no light exits from such separation areas.

The selecting patterning of surface 11 can be performed using any suitable methods for disrupting TIR in light guiding sheet 10. According to one embodiment, such patterning for light extraction can be done by roughening surface 11 in areas 55. According to one embodiment, areas 55 can be patterned by forming light extraction features 8 in or on surface 11, e.g., using inkjet printing with light scattering ink, as discussed above, or using laser etching. According to one embodiment, one or more individual areas 55 may be patterned to produce a continuous light extraction surface (e.g., by entirely coating the respective areas 55 with a layer of light scattering ink or by producing a uniformly etched surface in those areas). Similarly, according to one embodiment, opposing surface 12 (not shown) may also be selectively patterned in areas 55 according to the same principles described for surface 11.

Separation areas 54 should preferably form spacing areas in which either practically no light is extracted or the light extraction rate is much less than that of areas 55. According to a preferred embodiment, separation areas 54 are generally free from light extraction features or pattern. However, it should be understood that one or more separation areas 54 may include light extraction features, e.g., as a result of ink "overspray" from patterning areas 55 using inkjet printing or as a result of ablated material being deposited on surface 11 from laser etching of areas 55, without disrupting the intended operation of illumination system 900. According to one embodiment, more than 85% of light emitted from light guide 800 is emitted from light extraction areas 55 and less than 15% of light is emitted from separation areas.

According to one embodiment, the locations, shapes and dimensions of light extraction areas 55 formed in light guiding sheet 10 correspond to the locations, shapes and dimensions of openings 89 formed in reflective grid 850. The spacing between separation areas 54 can be about the same the spacing between reflective members 88 and the spacing between light extraction areas 55 can be about the same as the spacing between openings 89. Furthermore, a thickness of reflective members 88 can be about the same or less than a width of separation areas 54 such that openings 89 have apertures that are about equal to or greater than the respective apertures of light extraction areas 55.

By way of example and not limitation, openings 89 can have a square shape with rounded corners and the length and width of 10 mm while each of light extraction areas 55 can also have a square shape (with or without rounded corners) with the length and width of about 10 mm. According to one embodiment, the length and/or width dimensions of light extraction areas 55 may be somewhat reduced (e.g., by 5-10%, 10-15%, 15-20%, 20-30%, or up to 50%) compared to the respective dimensions of openings. This can be advantageous, for example, to allow for slight misalignments of light guiding sheet 10 relatively to reflective grid 850 and to ensure that blocking the extracted light by reflective members 88 is minimized.

Referring to FIG. 40, the method of making illumination system 900 further includes a step of positioning reflective grid 850 over light guide 800 (light guiding sheet 10) such that openings 89 are aligned and disposed in registration with respective light extraction areas 55 and such that reflective members 88 cover respective separation (or spacing) areas 54. FIG. 40 further illustrates a step of positioning LEDs 2 near the edges defined by edge surfaces 13, 14, 15, and 16 of light guiding sheet 10 and optically coupling the LEDs to the edges so that light emitted by the LEDs 2 can enter into light guiding sheet 10.

In operation, light guide 800 distributes light emitted by LEDs 2 over the entire area of light guiding sheet 10 using optical transmission and a total internal reflection and emits that light from light extraction areas 55 (which effectively become emission areas of light guide 800) of surface 11 through openings 89 of reflective grid 850. Reflective grid 850 further alters the light emission pattern, e.g., by collimating the emitted light and/or generally preventing light propagation at angles above a predefined cut-off angle with respect to a normal to surface 11. As a result, illumination panel 900 may have a much lower apparent brightness when viewed from a side (especially from directions above the cut-off angle) compared to when it is viewed from a normal direction. It may be appreciated that configuring illumination panel 900 for emitting light predominantly from light extraction areas 55 and through openings 89 in reflective grid 850, e.g., as described above, may allow for enhanced control of the directionality of light emission without significantly sacrificing the optical and electrical efficiency of the panel and without wasting light compared, for example, to a case when light is emitted from the entire area of light guide 800 and a part of that light is blocked by reflective members 88.

It is noted that, the exact length and width dimensions of reflective grid 850 may be different from those of light guiding sheet 10. For example, reflective grid 850 may have length and/or width dimensions that are slightly less than the respective length and/or width dimensions of light guiding sheet 10 or vice versa. According to one embodiment, at least one of the length or width dimensions of reflective grid 850 can be made slightly larger (e.g., by up to 5-15%) than the respective dimension of light guiding sheet 10. In the latter embodiment, reflective grid 850 can be used, for example, as a structural frame for attaching light guiding sheet and holding it in place and in a planar form when in use (even though sheet 10 can be thin and highly flexible by itself).

FIG. 41 schematically depicts an embodiment of system 900 in which light extraction features 8 and 9 are formed only in areas 55 which are located directly above the openings in reflective grid 850 (between reflective members 88) and in which separation areas 54 are generally void of the light extraction features. As further illustrated in FIG. 41, reflective grid 850 transmits at least a first portion of light emitted from light guiding sheet 10 without redirection (a group of light rays 241) and further transmits at least a second portion of light emitted from light guiding sheet 10 with redirection by reflections from the surfaces of reflective members 88 (as exemplified by light rays 242 and 244). The angles and/or shapes of reflective (e.g., having a specular or semi-specular mirror finish or diffuse reflective coating) surfaces of reflective members 88 may be selected to adjust the angular distribution of the emitted light. For example, the reflective surfaces of members 88 may be oriented to reject the uttermost off-normal-axis rays or redirect those light rays towards a perpendicular direction to result.

According to one embodiment, reflective surfaces of members 88 have curved parabolic or circular shapes configured to intercept high-angle rays and redirect them towards directions making lower angles with respect to a normal 44, effectively collimating light emitted from light guiding sheet 10. According to an aspect, normal 44 represents a normal to surfaces 11 and 12 light guiding sheet 10 and also a normal to prevalent planes of reflective grid 850 and illumination system 900 having a panel-type configuration.

Light guiding sheet 10 may be configured to emit light from light extraction areas 55 in the form of uncollimated light having a broad angular distribution including light rays propagating at relatively high angles with respect to a normal 44 (e.g., in the range from 60° to almost 90°). For example, the angular distribution can be Lambertian (in which the luminous intensity of light emitted from sheet 10 is directly proportional to the cosine of the angle between the observation direction and normal 44) or quasi-Lambertian (in which the observed luminous intensity closely resembles the Lambertian/cosine law). In a light collimating configuration of reflective grid 850, the curvature and orientation of reflective surfaces of members 88 may be selected to redistribute the light beam emitted from light guiding sheet (e.g., by intercepting and collimating individual light beams emitted from light extraction areas 55) and forming a collimated light beam having a narrower angular distribution. According to different embodiments, the resulting angular distribution of light exiting from reflective grid 850 may be generally confined within one of the following ranges of emission angles (with respect to normal 44): ±35°, ±45°, ±55°, ±60°, ±65°, ±70°, ±75°, ±80°, and ±85°.

According to an aspect, each opening 89 has an entrance aperture 38 configured for receiving light from respective light extraction areas 55 and an exit aperture 39 configured for emitting light away from reflective grid 850 and illumination system 900. According to one embodiment, the area associated with exit aperture 39 is larger than the area associated with entrance aperture 38 (e.g., by 20% or more, by 30% or more, by 1.5 times or more, by 2 times or more, by 3 times or more, or by 4 times of more). According to one embodiment, the area associated with exit aperture 39 is about equal to the area associated with entrance aperture 38 or it can also be smaller.

Reflective grid 850 and reflective members 88 can be dimensioned such that illumination system 900 emits light within a predetermined angular range and provides angular cut-off for the emission. According to different embodiments, reflective members 88 are configured to generally reject or at least significantly reduce the emission at angles greater than 45°, greater than 50°, greater than 55°, greater than 60°, greater than 65° or greater than 70° from normal 44.

According to various embodiments, especially when it is desired to provide a sharp cut-off of off-axis light rays, reflective members 88 may be replaced with non-reflective, light absorbing members (e.g., black or dark colored). The resulting grid panel (grid 850) including light-absorbing members (e.g., louvers or baffles) should still allow for the light passage through the spaces between the light-absorbing members.

The embodiment illustrated in FIG. 41 further includes a reflector 881 which is configured to intercept light emerging from the top surface of light guiding sheet 10 (surface 12 in the illustrated case) and redirect, by means of reflection, the light back towards light guiding sheet 10 and reflective grid 850. According to one embodiment, reflector 881 may have a specular finish/surface. According to one embodiment, reflector 881 may have a semi-specular finish/surface. According to one embodiment, reflector 881 may have a diffuse finish/surface (e.g., white powder coated or metallized and textured to form a matte surface finish).

It is noted that, according to one embodiment, illumination system 900 of FIG. 41 may also be provided and operated without reflector 881 for both direct and indirect illumination. For example, illumination system 900 may be positioned horizontally with surface 12 facing up and configured to emit light upwards (from surface 12) and downwards (from surface 11 and through reflective grid 850). Illumination system 900 of this configuration may also be positioned below a high-reflectance ceiling which preferably has a hemispherical reflectance of at least 75%, more preferably at least 80%, or even more preferably at least 85%, such that at least a substantial part of the upward-emitted light can be reflected from the ceiling downwards. Likewise, illumination system 900 may be oriented vertically and positioned with surface 12 facing a high-reflectance wall and reflective grid 850 facing towards interior space to provide a similar operation in direct/indirect lighting mode.

According to one embodiment, light guiding sheet 10 may be selectively patterned such that light extraction areas 55 can have a variable size across the area of light guiding sheet 10. For example, the size of light extraction areas may progressively increase with a distance from a light input edge (or edges). According to one embodiment, light extraction areas 55 in a central portion of light guiding sheet may be generally larger than light extraction areas 55 near one or more edges defined by edge surfaces 13, 14, 15 and 16. Alternatively, the size of light extraction areas 55 can be made constant across the entire area of light guiding sheet 10, but the areal coverage (or density) of light extraction features within such areas 55 can be made variable (e.g., increasing with a distance from light input edge(s).

Such selective patterning may be advantageously selected, for example, to compensate for the depletion of light within light guiding sheet 10 with a distance from light input edge(s) and to allow for emitting approximately equal amounts of light from each area 55 (and respective opening 89) despite that depletion of light. According to one embodiment, the amount of light emitted from one of openings 89 located in or near a center of reflective grid 850 is approximately equal to the amount of light emitted from one of peripheral openings 89 of the reflective grid (e.g., near a light input edge of light guiding sheet 10 or near a perimeter of reflective grid 850). According to different embodiments, the difference in light output from one or more centrally located openings 89 and one or more peripherally located openings 89 is less than 10%, less than 20%, less than 30% or less than 50%.

According to one embodiment, at least some of the light extraction areas 55 may have a size/area that is considerably smaller than the size/area of the respective openings 89. For example, one or more individual areas 55 may have areas that are less than the apertures of respective openings 89 by at least 1.5 times, at least 2 times, at least 2.5 times, at least 3 times, at least 4 times or at least 10 times or more. At the same time, reflective (or light blocking) members 88 may be configured to obscure the direct view of light extraction areas 55 at angles above a predefined cut-off angle (e.g., 10°, 15°, 30°, 45° or 60° from normal 44). This can be useful, for example, to prevent glare (or reduce a chance of it) for an observer which is viewing illumination system 900 from a distance. For instance, when illumination system 900 is incorporated into a lighting fixture illuminating a space below, reflective (or light blocking) members 88 can be configured to generally prevent a direct view of light extraction areas 55 by building occupant viewing the lighting fixture at angles above the cut-off angle.

According to one embodiment, the shape light emitting areas 55 may be generally different from the shape of openings 89 (or its entrance and/or exit apertures 38 and 39). For example, entrance aperture 38 may have the shape of a rectangle or square with rounded edges while respective light extraction area 55 may have a round shape, and vice versa. According to one embodiment, the size and shape of light extraction area 55 may be made to approximate those of respective entrance aperture 38.

FIG. 42 schematically depicts an embodiment of wide-area light guide illumination system 900 which is similar to that of FIG. 41 except that an optically transmissive light diffuser 882 is added and positioned below reflective grid 850. According to one embodiment, diffuser 882 may be exemplified by any type of lighting diffuser or "diffuser lens" that are found in lighting fixtures, which can be made from acrylic, polycarbonate, polystyrene or any other suitable plastic material. It may also be made from glass, which can also be patterned or coated to provide light diffusion.

According to one embodiment, diffuser 882 may also be designed and configured to take the advantage of the preliminary light diffusion and wide-angle distribution provided by light guiding sheet 10 and/or reflective grid 850. For example, diffuser 882 may have a much lighter/shallower texture and/or greater transparency compared to conventional diffusers and thus can be configured for maximizing the light transmission and enhancing light output from illumination system 900, also improving the energy efficiency of the device.

According to one embodiment, diffuser 882 may be configured for recycling light within the space defined by reflector 881 and diffuser 882, causing multiple transverse passage of at least some light rays through the space (e.g., for angularly redistributing light extracted from light guide 800). Diffuser 882 may be further configured to at least partially suppress light emission from illumination system 900 at sufficiently angles (e.g., above 45°, above 55°, above 65°, or above 75°) from normal 44 (hence reducing the brightness at those angles) and increasing the emission along normal 44 (hence enhancing the on-axis brightness). By way of example and not limitation, diffuser 882 may incorporate a brightness enhancement film or a lighting diffuser having a similar function. The brightness enhancement film may have a structured surface with a plurality of linear isosceles prisms each having 90 degree included angles at the peaks of the prisms.

In operation, diffuser 882 intercepts light emerging from the openings (light channeling cells) in reflective grid 850 and further redistributes and diffused s light. According to one embodiment, diffuser 882 may also be combined with or configured as a color filter or color converter (e.g., by adding fluorescent materials such as yellow or red phosphors into the material of the diffuser) to further condition the spectrum and/or angular distribution of the emitted light. According to one embodiment, diffuser 882 and any associated color filters or converters may be positioned between light guiding sheet 10 and reflective grid 850 and configured to diffuse, filter and/or convert the color of light extracted from light guiding sheet 10.

FIG. 43 schematically depicts an embodiment of a wide-area lighting fixture 970 which includes light guiding sheet 10 (which forms light guide 800), LEDs 2, reflective grid 850, reflector 881, an LED power supply (driver) 980, and a housing (enclosure) 902. Housing 902 may be configured in the form of a rectangular pan, shallow enclosure or flat box with a wide area opening in at least one side. The term "shallow" in reference to a three-dimensional housing or enclosure is directed to mean the configurations in which one of the dimensions (e.g., depth) of the interior space of the housing or enclosure is less than each of its other two dimensions (e.g., length and width) by at least 2.5 times.

According to one open side along its length and width dimensions. The opening in housing 902 may ordinarily have a rectangular shape and span along the most part of the length and width dimensions of the housing. According to one embodiment, the length and width of the rectangular opening approximate the length and width dimensions of housing 902. For example, housing 902 may have length and width dimensions of about 120 cm and the rectangular opening may have length and width dimensions between 100 cm and 120 cm. According to one embodiment, housing 902 may have one of its entire sides open to define the wide area opening.

According to one embodiment, housing 902 may also include one more other wide area opening in its other sides (e.g., including a back wall 940 and/or side walls). According to one embodiment, back wall 940 may have a large second opening configured to transmit light emitted from illumination panel 900. The second opening may also be configured to provide free convective airflow from illumination panel 900, e.g., in order to provide additional means for cooling LEDs 2. According to one embodiment, back wall 940 may also be entirely replaced with an opening. These additional openings may serve different purposes.

Housing 902 is encasing, flanking or at least partially enclosing light guiding sheet 10, LEDs 2, reflective grid 850, reflector 881, power supply 980 (e.g., an LED driver), and associated hardware and internal wiring, to form a complete lighting luminaire, such as a troffer (surface-mount or recessed), a suspended lighting fixture, a wide-area illumination panel mounted to a ceiling, and the like. According to one embodiment, reflective grid 850 may be positioned within the opening of housing 902 (e.g., flush-mounted). According to one embodiment, LED power supply (driver) 980 may be mounted to back wall 940 using fasteners or using other means (e.g., magnetically for which LED power supply 980 may be provided with a magnetic plate).

FIG. 43 also schematically illustrates an implementation of wide-area light guide illumination system 900 in the form of an LED retrofit of a linear fluorescent lighting fixture conventionally employing one or more tubular fluorescent lamps 890 (e.g., such as T12 lamps or T8 lamps). Suitable examples of such linear fluorescent lighting fixtures include but are not limited to 1×4 ft (about 30×120 cm), 2×2 ft (about 60×60 cm) and 2×4 ft (about 60×120 cm) surface-mount or recessed troffers or suspended/architectural linear light fixtures, such as pendants.

According to one embodiment, housing 902 and/or reflective grid 850 may be formed by the original housing and reflective-grid lighting diffuser (e.g., a panel having parabolic louvers or baffles) of the respective fluorescent lighting fixtures being retrofitted. According to one implementation, the retrofit can be advantageously used for upgrading an existing fluorescent lighting fixture to a more efficient and/or environmentally friendly LED technology (provided by LEDs 2 coupled to light guiding sheet 10), without replacing the entire fixture. In the case of such a retrofit, LEDs 2 can be interconnected together to form one or more linear LED strips. Each of the LED strips can be connected to the existing power circuitry of the respective lighting fixture, as illustrated by pairs of wires 66. Depending on the implementation of the LED driver used to power LEDs 2, the existing ballast can be included into the retrofit circuit or electrically bypassed (e.g., for better overall energy efficiency).

According to one embodiment, housing 902 has a depth (defined as a distance between a top wall and a bottom opening) that is at least 5 cm or more. According to one embodiment, the depth of housing 902 is about 10 cm or more. According to one embodiment, the depth of housing 902 is greater than 10 cm. Suitable width and length dimensions of housing 902 include but are not limited to 1×1 ft (about 0.3×0.3 m), 1×4 ft (about 0.3×1.2 m), 2×2 ft (about 0.6×0.6 m), 2×4 ft (about 0.6×1.2 m), and 4×4 ft (about 1.2×1.2 m). Housing 902 may be formed from a sheet metal material. The interior of housing 902 (or at least a large portion of it, e.g., at least 50%, 60%, 70%, 80% or more its interior area) may be made reflective (e.g., white-painted, aluminum-coated, white powder coated or polished to specular or semi-specular finish).

The retrofit schematically illustrated in FIG. 43 may be configured to allow for keeping the existing fluorescent lamps within the fixture, if desired. According to one embodiment, wide-area light guide illumination system 900, particularly including light guiding sheet 10 with edge-coupled LEDs 2 and reflector 881, can be removably positioned within lighting fixture 970. For example, system 900 can be implemented in the form of a thin and highly flexible sheet-form lighting panel that has a thickness between 0.5 mm and 2.5 mm (across the light emitting area of light guiding sheet 10) and is laid on top of reflective grid 850 as an overlay. Reflective grid 850 can be used or specially configured to provide structural support for the panel and prevent it from excessive bending or warping, allowing the panel to be maintained in a planar form despite its low thickness and flexibility.

In operation, as illustrated by exemplary light rays 246 and 248 and explained in the preceding disclosure, light emitted by LEDs 2 is redistributed by light guiding sheet 10 over the entire area of lighting fixture 970 and progressively extracted from sheet 10 using light extraction features 8 and/or 9 (not shown), causing a highly uniform surface emission from sheet 10. With the aid of reflector 881, substantially all of that emission can be directed downwards toward reflective grid 850. Reflective grid 850 further homogenizes and angularly redistributes the emitted light, resulting in a highly uniform light output from lighting fixture 970.

The opaque sheet-form body of wide-area light guide illumination system 900 can be configured to completely blocks the view of the interior of housing 902, including lamp(s) 890 and associated components (e.g. posts 892 used to hold and power the lamp(s)), which can enhance the aesthetic appearance of the lighting fixture. For comparison, in a typical louvered light fixture, such as a 1×4 ft (about 30×120 cm), 2×2 ft (about 60×60 cm) or 2×4 ft (about 60×120 cm) troffer, the interior of the housing and the fluorescent tubes can be seen through the louvered grid at least at some viewing angles. In addition, when illuminated, fluorescent tubes typically create a highly non-uniform emission from a louvered light fixture and may also be a source of excessive glare.

Furthermore, the illustrated structure of system 900 can be configured to completely prevent light to enter the upper portions of housing 902, thus eliminating any energy losses associated with light absorption by the interior of the housing and further enhancing the efficiency of lighting fixture 970. According to one embodiment, the sheet-form structure of system 900 is positioned within housing 902 such that there is a spacing distance of at least 5 centimeters between the upper surface of light guiding sheet 10 and the topmost wall of housing 902, defining a voluminous hollow space 910 above the light guiding sheet. This hollow space 910 may be used, for example, for positioning wiring and an LED driver used to power LEDs 2 and/or keeping the original components provided with lighting fixture 970 (e.g., holders/sockets of tubular fluorescent lamp and/or the lamps themselves). In addition, it may also be configured to provide convective heat removal from LEDs 2.

According to at least some embodiments and as explained above (e.g., in reference to FIG. 41), the light extraction pattern associated with light guiding sheet 10 can be configured to extract light only in areas 55 located between reflective members 88, which may result in a further reduction of light losses compared to the base configuration of lighting fixture 970 (e.g., before the retrofit). Using these features, along with the use of LEDs (which can have a greater lm/W efficacy compared to fluorescent tubes), the retrofit of lighting fixture 970 using the wide-area light guide illumination system 900 may thus be configured to significantly enhance the overall energy efficiency of the lighting fixture without having to replace its housing 902.

According to one embodiment, wide-area light guide illumination system 900 of FIG. 43 can be used without reflector 881. In this case, as schematically illustrated in FIG. 44, wide-area light guide illumination system 900 may be configured to emit light both downwards and upwards (into voluminous hollow space 910 defined by housing 902 and located above light guiding sheet 10).

Alternatively, reflector 881 may be replaced with a semi-opaque light diffusing sheet 884 (FIG. 44) configured to transmit light to and from hollow space 910 and, at the same time, at least partially obscure the view of the interior of housing 902 above light guiding sheet 10. According to one embodiment, one or more additional light sources may be provided within hollow space 910, and light guiding sheet 10 may be configured to both distribute light emitted by LEDs 2 and to transmit light emitted by those light sources. According to one embodiment, the additional light sources may include one or more fluorescent lamps 890 of FIG. 43. According to one embodiment, the additional light sources may include one or more tubular LED (T-LED) lamps 891, e.g., such as those commonly used for retrofitting linear fluorescent luminaires. According to one embodiment, the additional light sources may include one or more compact inorganic LEDs 29 located within hollow space 910 and distributed over a broad area of lighting fixture 970 in one- or two-dimensional array. According to one embodiment, LEDs 29 may be attached (e.g., magnetically) or otherwise mounted to a top wall of housing 902, e.g., as illustrated in FIG. 44. According to one embodiment, LEDs 29 may be arranged on one or more printed circuit boards which, in turn, can be positioned within housing 902 and oriented such that their light emitting sides are facing light guiding sheet 10.

FIG. 45 schematically depicts an embodiment of wide-area lighting fixture 970 which is similar to that of FIG. 43 except that the reflective grid is replaced with optically transmissive diffuser 882 of FIG. 42. This configuration may exemplify retrofitting fluorescent troffers originally outfitted with a diffuser lens. According to one embodiment, optically transmissive diffuser 882 may be exemplified by an existing diffuser lens originally provided with the lighting fixture (e.g., before the retrofit using wide-area light guide illumination system 900). According to one embodiment, optically transmissive diffuser 882 may be represented by a thin, light diffusing sheet provided with wide-area light guide illumination system 900, in which case, the original diffuser (e.g., a prismatic lens) may be discarded.

According to one embodiment of a method of retrofitting a fluorescent lighting fixture having a louvered grid panel (e.g., having parabolic louvers or baffles), the method may include: (1) providing a broad-area light emitting sheet-form panel (e.g., as exemplified by wide-area light guide illumination system 900) which is sized to approximate the dimensions of the louvered grid panel, (2) a step of opening or removing the louvered grid panel, (3) a step of installing the broad-area light emitting sheet-form panel into the housing of the lighting fixture, (4) a step of wiring the broad-area light emitting sheet-form panel to the existing power circuit provided with the lighting fixture, optionally electrically bypassing an existing ballast (e.g., the fluorescent ballast which is used to regulate the electric current to the lamps), and (5) a step of repositioning or closing the louvered grid panel while allowing the broad-area light emitting sheet-form panel to rest upon the louvered grid panel.

For fluorescent lighting fixtures incorporating a plastic diffuser (commonly referred to as a diffuser lens) instead of (or in addition to) a louvered grid or baffle, a method of retrofitting such lighting fixtures may include: (1) providing a broad-area light emitting sheet panel (e.g., as exemplified by wide-area light guide illumination system 900) which is sized to approximate the dimensions of the diffuser lens, (2) a step of removing and discarding the diffuser lens, (3) a step of wiring the broad-area light emitting sheet to the existing power circuit provided with the lighting fixture, optionally bypassing an existing ballast, and (4) a step of installing the broad-area light emitting sheet in place of the diffuser lens. According to one embodiment, wide-area light guide illumination system 900 may be installed into an existing fluorescent lighting fixture externally, as an overlay.

FIG. 46 schematically illustrates an embodiment of illumination system 900 having some common elements of the embodiment of FIG. 41 but in which light extraction features 8 are formed in surface 12 and single broad-area reflector

881 is replaced with multiple discrete reflectors 881a, 881b, 881c, and 881d covering respective light extraction areas 55. According to a preferred implementation, discrete reflectors 881a, 881b, 881c, and 881d are bonded to the surface of light guide 800. More specifically, the discrete reflectors are bonded to the textured surface formed by light extraction features 8. In operation, reflectors 881a, 881b, 881c, and 881d intercept light extracted by light extraction features 8 from surface 12 of light guiding sheet 10 and redirect that light towards reflective grid 850 where it is further redirected (with collimation) and emitted through exit apertures 39 of openings 89.

According to one embodiment, reflectors 881a, 881b, 881c, and 881d may be formed by die-cut or laser-cut pieces of highly reflective plastic film and then applied to respective light extraction areas 55 using optically transmissive adhesive. According to one embodiment, reflectors 881a, 881b, 881c, and 881d may be formed by overprinting (or otherwise coating) light extraction areas 55 with a sufficiently thick and substantially opaque layer of white paint or ink. According to one embodiment, light extraction areas may be overprinted with layer of opaque reflective ink (e.g. UV curable metallic printing ink). The reflective ink may be configured to provide a high gloss finish or highly reflective matter/textured finish to light extraction areas 55.

Further details of operation of illumination systems shown in the drawing figures as well as their possible variations will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wide-area illumination system, comprising:
    a plurality of compact solid-state light sources arranged into one or more linear arrays;
    a light guiding sheet of an optically transmissive material optically coupled to the plurality of compact solid-state light sources and configured to distribute light emitted by the light sources over an area of the light guiding sheet using optical transmission and a total internal reflection;
    a light extraction pattern formed in a surface of the light guiding sheet and configured for extracting light from the light guiding sheet, the light extraction pattern defining a plurality of light extraction areas alternating with separation areas;
    a reflective grid panel positioned adjacent to a first broad-area surface of the light guiding sheet, the reflective grid panel comprising a plurality of reflective walls oriented transversely with respect to a prevalent plane of the reflective grid panel and defining a plurality of openings in the reflective grid panel configured for transmitting light; and
    a reflective surface positioned over a second broad-area surface which is opposite to the first broad-area surface,
    wherein at least one of the plurality of light extraction areas is disposed in registration with one of the plurality of openings and wherein at least one of the separation areas is disposed in registration with one of the plurality of reflective walls.

2. The wide-area illumination system of claim 1, wherein length and width dimensions of the light guiding sheet approximate respective length and width dimensions of the reflective grid panel.

3. The wide-area illumination system of claim 1, wherein the at least one of the plurality of light extraction areas is at least 1.5 times less than an entrance aperture of at least one of the plurality of openings.

4. The wide-area illumination system of claim 1, wherein at least one of the plurality of reflective walls has a taper with a wider portion facing the light guiding sheet and a narrower portion facing away from the light guiding sheet.

5. The wide-area illumination system of claim 1, wherein at least one of the plurality of reflective walls has a specularly reflective surface finish.

6. The wide-area illumination system of claim 1, wherein at least one of the plurality of reflective walls has a diffusely reflective surface finish.

7. The wide-area illumination system of claim 1, wherein at least one of the plurality of light extraction areas is configured to direct a first portion of light towards the reflective grid panel and direct a second portion of light away from the reflective grid panel.

8. The wide-area illumination system of claim 1, wherein the light extraction pattern is configured to output at least 30% of a total light emitted from the light guiding sheet towards the reflective grid panel and output at least 30% of the total light emitted from the light guiding sheet away from the reflective grid panel.

9. The wide-area illumination system of claim 1, wherein the reflective grid panel is configured to intercept and redirect a first portion of light emitted from the light extraction areas and transmit a second portion of light emitted from the light extraction areas without redirection.

10. The wide-area illumination system of claim 1, wherein at least one of the light extraction areas comprises a reflective layer formed by a metallic ink material.

11. The wide-area illumination system of claim 1, wherein at least one of the light extraction areas comprises a plurality of metallic flakes embedded into an optically transmissive material.

12. The wide-area illumination system of claim 1, wherein at least one of the light extraction areas comprises a plurality of discrete surface relief structures configured for extracting light from the light guiding sheet, wherein at least one of the discrete surface relief structures is formed by at least one layer of an optically transmissive light scattering material.

13. The wide-area illumination system of claim 1, wherein at least one of the light extraction areas comprises a layered surface structure having an optically transmissive layer and an opaque layer conformably coating the optically transmissive layer, wherein the optically transmissive layer comprises a light scattering material, and wherein the opaque layer comprises a reflective material.

14. The wide-area illumination system of claim 1, further comprising a shallow rectangular enclosure having an opening on one side and at least partially enclosing the light guiding sheet, the plurality of compact solid-state light sources, and the reflective grid panel.

15. The wide-area illumination system of claim 1, further comprising a shallow rectangular enclosure defining an opening on at least one side and at least partially enclosing the light guiding sheet and the plurality of compact solid-state light sources, wherein the reflective grid panel is flush mounted within the opening.

16. A method of forming a wide-area illumination system, comprising:
  providing a reflective grid panel having a plurality of reflective walls oriented transversely with respect to a prevalent plane of the reflective grid panel and defining a plurality of openings in the reflective grid panel;
  providing an optically transmissive sheet configured for guiding light using optical transmission and a total internal reflection;
  providing a linear array of compact solid-state light sources;
  a step of patterning optically transmissive sheet with light extraction surface features so as to form a plurality of light extraction areas alternating with separation areas;
  a step of optical coupling the linear array of compact solid-state light sources to the optically transmissive sheet; and
  a step of positioning the optically transmissive sheet over the reflective grid panel such that at least one of the plurality of light extraction areas is disposed in registration with at least one of the plurality of openings.

17. The method of claim 16, further comprising a step of positioning a sheet of a reflective material over the optically transmissive sheet.

18. The method of claim 16, further comprising a step of mounting a structure incorporating the optically transmissive sheet, the linear array of compact solid-state light sources and the reflective grid panel within a shallow rectangular housing having at least one wide-area opening.

19. A wide-area illumination system, comprising:
  a plurality of compact solid-state light sources arranged into one or more linear arrays;
  a light guiding sheet of an optically transmissive material optically coupled to the plurality of compact solid-state light sources and configured to distribute light emitted by the light sources over an area of the light guiding sheet using optical transmission and a total internal reflection;
  a light extraction pattern formed in a surface of the light guiding sheet and configured for extracting light from the light guiding sheet, the light extraction pattern defining a plurality of light extraction areas alternating with separation areas; and
  a reflective grid panel positioned adjacent to a first broad-area surface of the light guiding sheet, the reflective grid panel comprising a plurality of reflective walls oriented transversely with respect to a prevalent plane of the reflective grid panel and defining a plurality of openings in the reflective grid panel configured for transmitting light;
  wherein at least one of the plurality of light extraction areas is disposed in registration with one of the plurality of openings, wherein at least one of the separation areas is disposed in registration with one of the plurality of reflective walls, and wherein the at least one of the plurality of light extraction areas is at least 1.5 times less than an entrance aperture of at least one of the plurality of openings.

20. The wide-area illumination system of claim 19, wherein the light extraction pattern is configured to output at least 30% of a total light emitted from the light guiding sheet towards the reflective grid panel and output at least 30% of the total light emitted from the light guiding sheet away from the reflective grid panel.

21. The wide-area illumination system of claim 19, wherein the reflective grid panel is configured to intercept and redirect a first portion of light emitted from the light extraction areas and transmit a second portion of light emitted from the light extraction areas without redirection.

22. A wide-area illumination system, comprising:
  a plurality of compact solid-state light sources arranged into one or more linear arrays;
  a light guiding sheet of an optically transmissive material optically coupled to the plurality of compact solid-state light sources and configured to distribute light emitted by the light sources over an area of the light guiding sheet using optical transmission and a total internal reflection;
  a light extraction pattern formed in a surface of the light guiding sheet and configured for extracting light from the light guiding sheet, the light extraction pattern defining a plurality of light extraction areas alternating with separation areas; and
  a reflective grid panel positioned adjacent to a first broad-area surface of the light guiding sheet, the reflective grid panel comprising a plurality of reflective walls oriented transversely with respect to a prevalent plane of the reflective grid panel and defining a plurality of openings in the reflective grid panel configured for transmitting light;
  wherein at least one of the plurality of light extraction areas is disposed in registration with one of the plurality of openings, wherein at least one of the separation areas is disposed in registration with one of the plurality of reflective walls, and wherein at least one of the plurality of light extraction areas is configured to direct a first portion of light towards the reflective grid panel and direct a second portion of light away from the reflective grid panel.

23. A wide-area illumination system, comprising:
  a plurality of compact solid-state light sources arranged into one or more linear arrays;
  a light guiding sheet of an optically transmissive material optically coupled to the plurality of compact solid-state light sources and configured to distribute light emitted by the light sources over an area of the light guiding sheet using optical transmission and a total internal reflection;
  a light extraction pattern formed in a surface of the light guiding sheet and configured for extracting light from the light guiding sheet, the light extraction pattern defining a plurality of light extraction areas alternating with separation areas; and
  a reflective grid panel positioned adjacent to a first broad-area surface of the light guiding sheet, the reflective grid panel comprising a plurality of reflective walls oriented transversely with respect to a prevalent plane of the reflective grid panel and defining a plurality of openings in the reflective grid panel configured for transmitting light;

wherein at least one of the plurality of light extraction areas is disposed in registration with one of the plurality of openings, wherein at least one of the separation areas is disposed in registration with one of the plurality of reflective walls, wherein at least one of the light extraction areas comprises a plurality of discrete surface relief structures configured for extracting light from the light guiding sheet, and wherein at least one of the discrete surface relief structures is formed by at least one layer of an optically transmissive light scattering material.

24. A wide-area illumination system, comprising:
a plurality of compact solid-state light sources arranged into one or more linear arrays;
a light guiding sheet of an optically transmissive material optically coupled to the plurality of compact solid-state light sources and configured to distribute light emitted by the light sources over an area of the light guiding sheet using optical transmission and a total internal reflection;
a light extraction pattern formed in a surface of the light guiding sheet and configured for extracting light from the light guiding sheet, the light extraction pattern defining a plurality of light extraction areas alternating with separation areas; and
a reflective grid panel positioned adjacent to a first broad-area surface of the light guiding sheet, the reflective grid panel comprising a plurality of reflective walls oriented transversely with respect to a prevalent plane of the reflective grid panel and defining a plurality of openings in the reflective grid panel configured for transmitting light;
wherein at least one of the plurality of light extraction areas is disposed in registration with one of the plurality of openings, wherein at least one of the separation areas is disposed in registration with one of the plurality of reflective walls, wherein at least one of the light extraction areas comprises a layered surface structure having an optically transmissive layer and an opaque layer conformably coating the optically transmissive layer, wherein the optically transmissive layer comprises a light scattering material, and wherein the opaque layer comprises a reflective material.

* * * * *